US008732155B2

(12) United States Patent
Vegnaduzzo et al.

(10) Patent No.: US 8,732,155 B2
(45) Date of Patent: May 20, 2014

(54) CATEGORIZATION IN A SYSTEM AND METHOD FOR CONDUCTING A SEARCH

(75) Inventors: Stefano Vegnaduzzo, Berkeley, CA (US); Yue Rona Yang, Palo Alto, CA (US); Anton V. Jouline, Sherman Oaks, CA (US); Oleg S. Kislyuk, San Ramon, CA (US)

(73) Assignee: IAC Search & Media, Inc., Oakland, CA (US)

( * ) Notice: Subject to any disclaimer, the term of this patent is extended or adjusted under 35 U.S.C. 154(b) by 2594 days.

(21) Appl. No.: 11/941,830

(22) Filed: Nov. 16, 2007

(65) Prior Publication Data
US 2009/0132504 A1 May 21, 2009

(51) Int. Cl.
G06F 17/30 (2006.01)

(52) U.S. Cl.
USPC .......................................................... 707/708

(58) Field of Classification Search
USPC .............................. 707/1–7, 100, 102, 104.1
See application file for complete search history.

(56) References Cited

U.S. PATENT DOCUMENTS

| | | | |
|---|---|---|---|
| 5,475,802 A | 12/1995 | Wescott et al. | |
| 5,555,409 A | 9/1996 | Leenstra, Sr. et al. | |
| 5,774,362 A | 6/1998 | Suzuki et al. | |
| 5,948,040 A | 9/1999 | DeLorme et al. | |
| 5,966,710 A | 10/1999 | Burrows | |
| 6,263,343 B1 | 7/2001 | Hirono | |
| 6,714,215 B1 | 3/2004 | Flora et al. | |
| 6,735,518 B2 | 5/2004 | Kim | |
| 6,772,150 B1 | 8/2004 | Whitman et al. | |
| 6,925,608 B1 | 8/2005 | Neale et al. | |
| 7,373,244 B2 | 5/2008 | Kreft | |
| 7,379,811 B2 | 5/2008 | Rasmussen et al. | |
| 7,499,946 B2 | 3/2009 | Klein | |
| 7,523,099 B1 | 4/2009 | Egnor et al. | |
| 7,555,387 B2 | 6/2009 | Sladky et al. | |
| 7,620,496 B2 | 11/2009 | Rasmussen | |
| 7,634,463 B1 | 12/2009 | Katragadda et al. | |
| 7,707,140 B2 | 4/2010 | Leishman et al. | |
| 7,788,252 B2 | 8/2010 | Delli Santi et al. | |
| 7,917,490 B2 | 3/2011 | Norris et al. | |
| 2002/0042793 A1 | 4/2002 | Choi | |
| 2002/0129014 A1 | 9/2002 | Kim et al. | |
| 2003/0033274 A1 | 2/2003 | Chow et al. | |

(Continued)

FOREIGN PATENT DOCUMENTS

GB 2378789 2/2003
WO WO 2004/114162 12/2004

OTHER PUBLICATIONS

Buykkokten, et al, "Exploiting geographic location information of web pages," Feb. 5, 2005 [retrieved Jul. 1, 2008]. http://webarchive.org/web/20050205001116/http://webdb.stanford.edu/~orkut/papers/geog.pdf, pp. 1-4.

Primary Examiner — Cam-Linh Nguyen
(74) Attorney, Agent, or Firm — Stephen M. De Klerk

(57) ABSTRACT

The invention provides a system to categorize user queries including an identification component that receives an original user query and identifies a what-component and a where-component using the original user query, a first classification component that analyzes and classifies the what-component of the original user query, a second classification component that analyzes and processes the where-component of the original user query, and a transmission component that sends the results of the first and second classification components and a processed user query to a backend search engine.

12 Claims, 45 Drawing Sheets

(56) References Cited

U.S. PATENT DOCUMENTS

| | | |
|---|---|---|
| 2003/0033301 A1 | 2/2003 | Cheng et al. |
| 2003/0217052 A1 | 11/2003 | Rubenczyk et al. |
| 2003/0233224 A1 | 12/2003 | Marchisio et al. |
| 2004/0133564 A1 | 7/2004 | Gross et al. |
| 2004/0249796 A1* | 12/2004 | Azzam ............................. 707/3 |
| 2004/0260677 A1* | 12/2004 | Malpani et al. .................... 707/3 |
| 2005/0060290 A1 | 3/2005 | Herscovici et al. |
| 2005/0071328 A1 | 3/2005 | Lawrence |
| 2005/0097089 A1 | 5/2005 | Nielsen et al. |
| 2005/0131872 A1 | 6/2005 | Calbucci et al. |
| 2005/0273346 A1 | 12/2005 | Frost |
| 2006/0026084 A1 | 2/2006 | Bonham et al. |
| 2006/0026170 A1 | 2/2006 | Kreitler et al. |
| 2006/0170565 A1 | 8/2006 | Husak et al. |
| 2006/0178869 A1 | 8/2006 | Acero et al. |
| 2006/0200308 A1 | 9/2006 | Arutunian et al. |
| 2006/0206454 A1 | 9/2006 | Forstall et al. |
| 2006/0212441 A1 | 9/2006 | Tang et al. |
| 2006/0223509 A1 | 10/2006 | Fukazawa et al. |
| 2006/0224574 A1 | 10/2006 | Dettinger et al. |
| 2006/0229899 A1 | 10/2006 | Hyder et al. |
| 2006/0265352 A1 | 11/2006 | Chen et al. |
| 2006/0271280 A1 | 11/2006 | O'Clair |
| 2006/0271281 A1 | 11/2006 | Ahn et al. |
| 2006/0271287 A1 | 11/2006 | Gold et al. |
| 2006/0271531 A1 | 11/2006 | O'Clair et al. |
| 2007/0060114 A1 | 3/2007 | Ramer et al. |
| 2007/0061487 A1 | 3/2007 | Moore et al. |
| 2007/0088616 A1 | 4/2007 | Lambert et al. |
| 2007/0096945 A1 | 5/2007 | Rasmussen et al. |
| 2007/0100802 A1 | 5/2007 | Celik |
| 2007/0106455 A1 | 5/2007 | Fuchs |
| 2007/0118512 A1 | 5/2007 | Riley et al. |
| 2007/0176796 A1 | 8/2007 | Bliss et al. |
| 2007/0179941 A1 | 8/2007 | Huang et al. |
| 2007/0214454 A1 | 9/2007 | Edwards et al. |
| 2007/0217493 A1 | 9/2007 | Rhoads |
| 2007/0260628 A1 | 11/2007 | Fuchs et al. |
| 2007/0294233 A1 | 12/2007 | Sheu et al. |
| 2008/0005104 A1 | 1/2008 | Flake et al. |
| 2008/0009268 A1 | 1/2008 | Ramer et al. |
| 2008/0028341 A1 | 1/2008 | Szeliski et al. |
| 2008/0040678 A1 | 2/2008 | Crump |
| 2008/0082528 A1 | 4/2008 | Bonzi et al. |
| 2008/0092061 A1 | 4/2008 | Bankston |
| 2008/0104530 A1 | 5/2008 | Santanche et al. |
| 2008/0140603 A1 | 6/2008 | Babikov et al. |
| 2008/0172374 A1 | 7/2008 | Wolosin et al. |
| 2008/0189257 A1 | 8/2008 | Wiseman et al. |
| 2008/0222119 A1 | 9/2008 | Dai et al. |
| 2008/0243783 A1 | 10/2008 | Santi et al. |
| 2008/0243821 A1 | 10/2008 | Delli Santi et al. |
| 2008/0270383 A1 | 10/2008 | Allen et al. |
| 2008/0281776 A1 | 11/2008 | Goradia |
| 2008/0281806 A1 | 11/2008 | Wang et al. |
| 2008/0292213 A1 | 11/2008 | Chau |
| 2009/0006169 A1 | 1/2009 | Wetzer et al. |
| 2009/0064144 A1 | 3/2009 | Abhyanker |
| 2009/0094223 A1 | 4/2009 | Berk et al. |
| 2009/0132469 A1 | 5/2009 | White et al. |
| 2009/0183097 A1 | 7/2009 | Bayiates |
| 2009/0254841 A1 | 10/2009 | Balaishis et al. |
| 2010/0082634 A1 | 4/2010 | Leban |
| 2010/0118025 A1 | 5/2010 | Smith et al. |

* cited by examiner

| | | |
|---|---|---|
| Neighborhood 1 | City 2 | Area 1 |
| Neighborhood 2 | City 1 | Area 2 |
| Neighborhood 3 | City 3 | Area 3 |
| Neighborhood 4 | City 1 | Area 4 |
| Neighborhood 5 | City 2 | Area 5 |
| Neighborhood 6 | City 1 | Area 6 |
| Neighborhood 7 | City 3 | Area 7 |
| Neighborhood 8 | City 2 | Area 8 |

FIG. 8

CATEGORIZATION IN A SYSTEM AND METHOD FOR CONDUCTING A SEARCH

BACKGROUND OF THE INVENTION

This invention relates generally to a user interface and a method of interfacing with a client computer system over a network such as the internet, and more specifically for such an interface and method for conducting local searches and obtaining geographically relevant information.

The internet is often used to obtain information regarding businesses, events, movies, etc. in a specific geographic area. A user interface is typically stored on a server computer system and transmitted over the internet to a client computer system. The user interface typically has a search box for entering text. A user can then select a search button to transmit a search request from the client computer system to the server computer system. The server computer system then compares the text with data in a database or data source and extracts information based on the text from the database or data source. The information is then transmitted from the server computer system to the client computer system for display at the client computer system.

SUMMARY OF THE INVENTION

The invention provides a system to categorize user queries including a receiving component that receives an original user query including a what-component and a where-component using the original user query, a first classification component that analyzes and classifies the what-component of the original user query, a second classification component that analyzes and processes the where-component of the original user query, and a transmission component that sends the results of the first and second classification components and a processed user query to a backend search engine.

The first classification component may classify the what-component into a classification.

The classification may be selected from the group consisting of business names, business chain names, business categories, event names, and event categories.

The processed user query may include the original user query sent to a transformation component to transform the original user query into a new query that may provide better search results than the original user query.

The processed user query may include the original user query.

The second classification component may include an ambiguity resolution component and a selection component.

The ambiguity resolution component may determine whether the where-component contains a geographical location.

The selection component may receive a where-component containing a geographical location and may determine the result location.

A means for changing the result location determined by the selection component may be provided to a user to choose a location different than the result location determined by the selection component.

The invention also provides a method for categorizing user queries including receiving an original user query and identifying a what-component and a where-component using the original user query, analyzing and classifying the what-component of the original user query, analyzing and processing the where-component of the original user query, and sending a classified what-component, a processed where-component, and a processed user query to a backend search engine.

The what-component may be classified into a classification.

The classification may be selected from the group consisting of business names, business chain names, business categories, event names, and event categories.

The processed user query may be comprised of the original user query sent to a transformation component to transform the original user query into a new query that may provide better search results than the original user query.

The processed user query may be comprised of the original user query.

The where-component may be processed by an ambiguity resolution component and a selection component.

The ambiguity resolution component may determine whether the where-component contains a geographical location.

The selection component may receive a where-component containing a geographical location and determines the result location.

A means for changing the result location determined by the selection component may be provided to a user to choose a location different than the result location determined by the selection component.

The invention further provides for a computer-readable medium having stored thereon a set of instructions which, when executed by at least one processor of at least one computer, executes a method for categorizing user queries including receiving an original user query and identifying a what-component and a where-component using the original user query, analyzing and classifying the what-component of the original user query, analyzing and processing the where-component of the original user query, and sending a classified what-component, a processed where-component, and a processed user query to a backend search engine.

BRIEF DESCRIPTION OF THE DRAWINGS

The invention is further described by way of example with reference to the accompanying drawings wherein:

FIG. 8 is a table showing a relationship between neighborhoods and cities, the relationship being used to generate a plurality of related search suggestions in the view of FIG. 7;

DETAILED DESCRIPTION OF THE INVENTION

Network and Computer Overview

Figure 1:
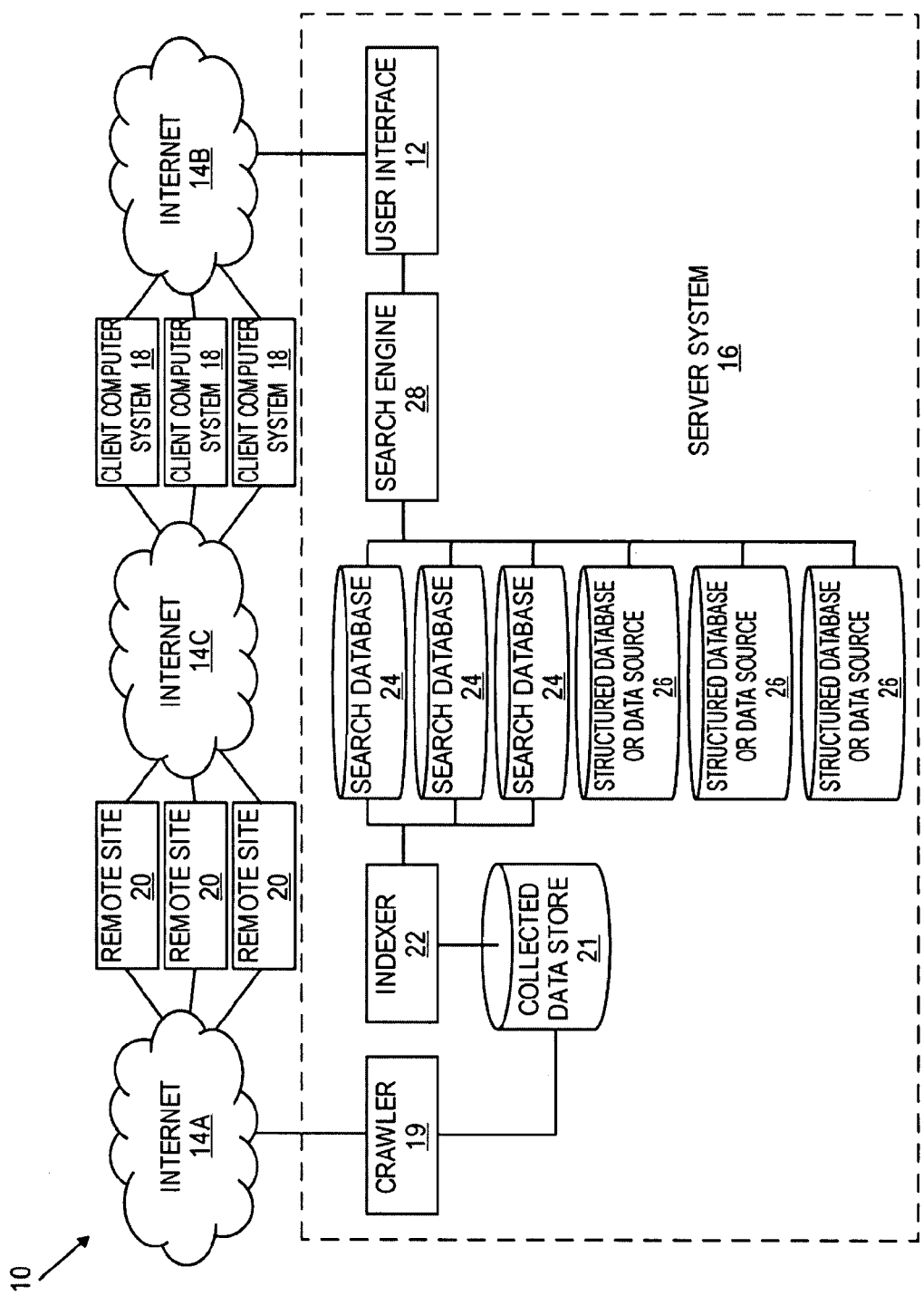
FIG. 1 is a block diagram of a network environment in which a user interface according to an embodiment of the invention may find application.

FIG. 1 of the accompanying drawings illustrates a network environment 10 that includes a user interface 12, the internet 14A, 14B and 14C, a server computer system 16, a plurality of client computer systems 18, and a plurality of remote sites 20, according to an embodiment of the invention.

The server computer system 16 has stored thereon a crawler 19, a collected data store 21, an indexer 22, a plurality of search databases 24, a plurality of structured databases and data sources 26, a search engine 28, and the user interface 12. The novelty of the present invention revolves around the user interface 12, the search engine 28 and one or more of the structured databases and data sources 26.

The crawler 19 is connected over the internet 14A to the remote sites 20. The collected data store 21 is connected to the crawler 19, and the indexer 22 is connected to the collected data store 21. The search databases 24 are connected to the indexer 22. The search engine 28 is connected to the search databases 24 and the structured databases and data sources 26. The client computer systems 18 are located at respective client sites and are connected over the internet 14B and the user interface 12 to the search engine 28.

Figure 2:
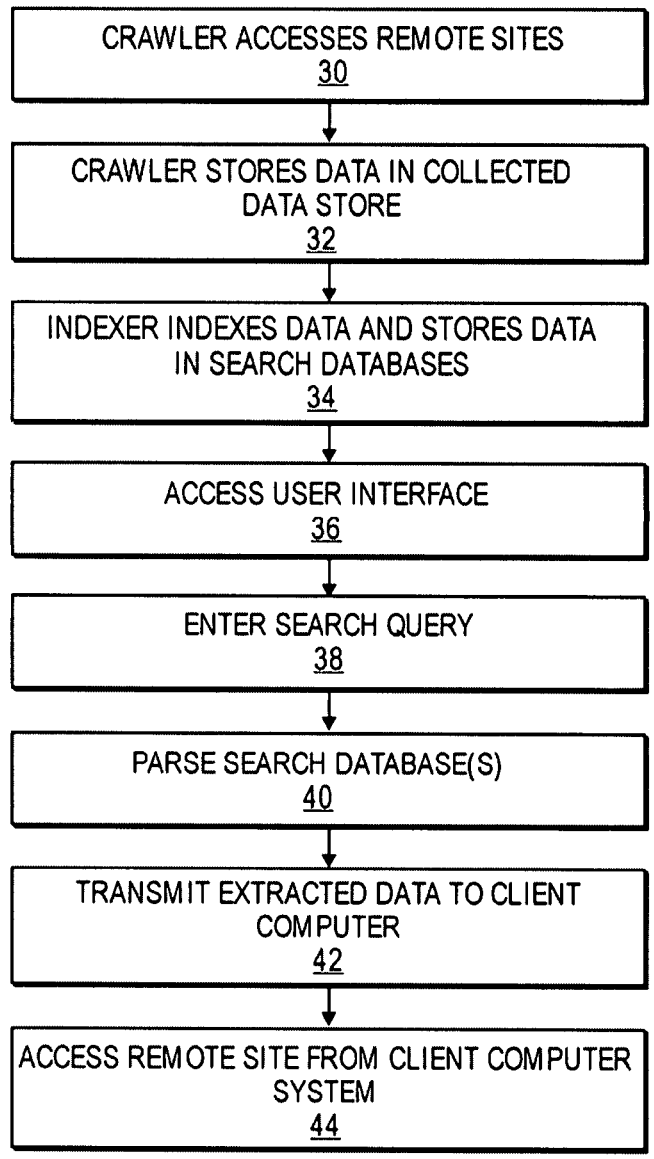
FIG. 2 is a flowchart illustrating how the network environment is used to search and find information.

Reference is now made to FIGS. 1 and 2 in combination to describe the functioning of the network environment 10. The crawler 19 periodically accesses the remote sites 20 over the internet 14A (step 30). The crawler 19 collects data from the remote sites 20 and stores the data in the collected data store 21 (step 32). The indexer 22 indexes the data in the collected data store 21 and stores the indexed data in the search databases 24 (step 34). The search databases 24 may, for example, be a "Web" database, a "News" database, a "Blogs & Feeds" database, an "Images" database, etc. Some of the structured databases or data sources 26 are licensed from third-party providers and may, for example, include an encyclopedia, a dictionary, maps, a movies database, etc.

A user at one of the client computer systems 18 accesses the user interface 12 over the internet 14B (step 36). The user can enter a search query in a search box in the user interface 12, and either hit "Enter" on a keyboard or select a "Search" button or a "Go" button of the user interface 12 (step 38). The search engine 28 then uses the "Search" query to parse the search databases 24 or the structured databases or data sources 26. In the example of where a "Web" search is conducted, the search engine 28 parses the search database 24 having general Internet Web data (step 40). Various technologies exist for comparing or using a search query to extract data from databases, as will be understood by a person skilled in the art.

The search engine 28 then transmits the extracted data over the internet 14B to the client computer system 18 (step 42). The extracted data typically includes uniform resource locator (URL) links to one or more of the remote sites 20. The user at the client computer system 18 can select one of the links to one of the remote sites 20 and access the respective remote site 20 over the internet 14C (step 44). The server computer system 16 has thus assisted the user at the respective client computer system 18 to find or select one of the remote sites 20 that have data pertaining to the query entered by the user.

Figure 3:
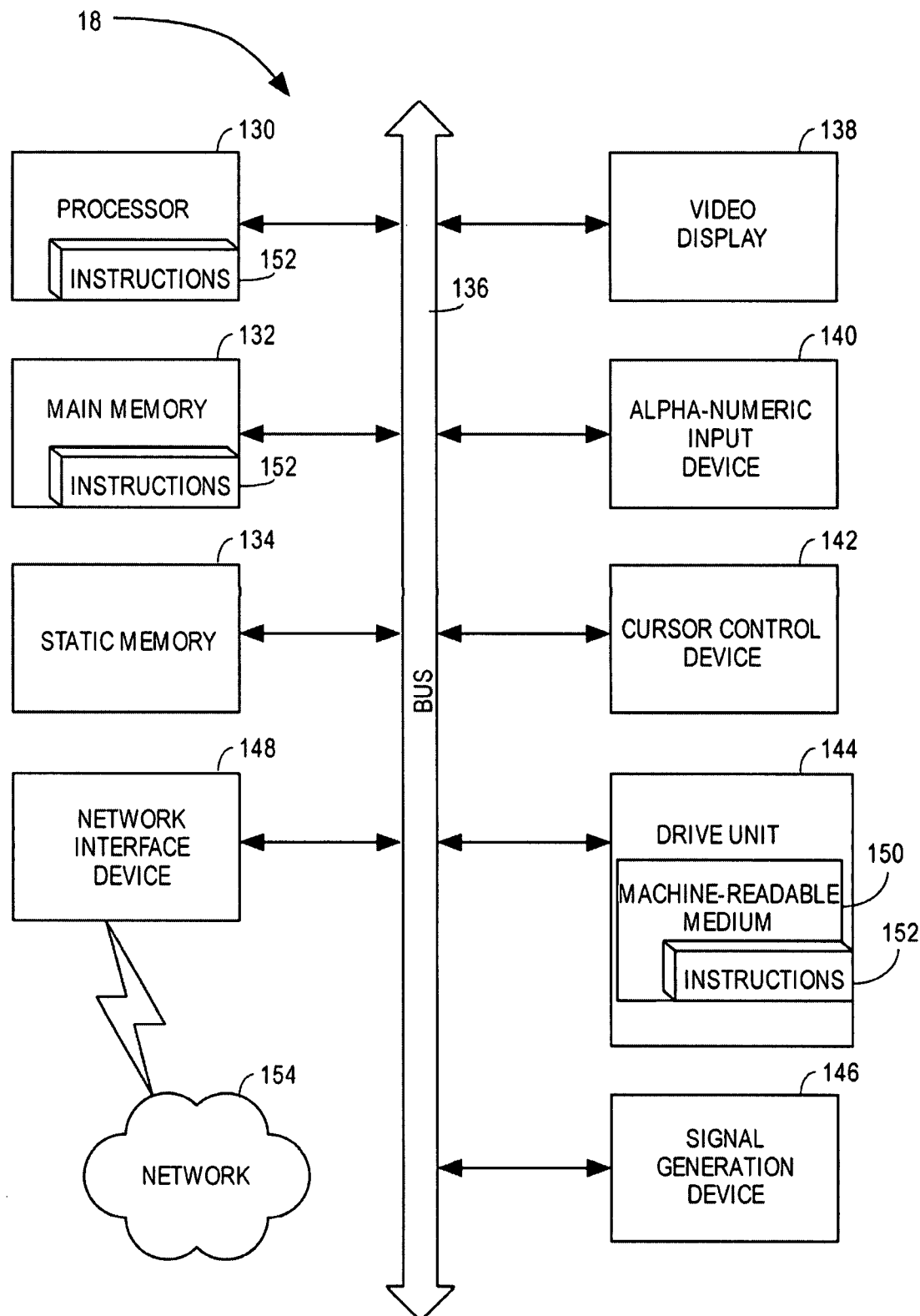
FIG. 3 is a block diagram of a client computer system forming part of the network environment, but may also be a block diagram of a computer in a server computer system forming an area of the network environment.

FIG. 3 shows a diagrammatic representation of a machine in the exemplary form of one of the client computer systems 18 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The server computer system 16 of FIG. 1 may also include one or more machines as shown in FIG. 3.

The exemplary client computer system 18 includes a processor 130 (e.g., a central processing unit (CPU), a graphics processing unit (GPU), or both), a main memory 132 (e.g., read-only memory (ROM), flash memory, dynamic random access memory (DRAM) such as synchronous DRAM (SDRAM) or Rambus DRAM (RDRAM), etc.), and a static memory 134 (e.g., flash memory, static random access memory (SRAM, etc.), which communicate with each other via a bus 136.

The client computer system 18 may further include a video display 138 (e.g., a liquid crystal display (LCD) or a cathode ray tube (CRT)). The client computer system 18 also includes an alpha-numeric input device 140 (e.g., a keyboard), a cursor control device 142 (e.g., a mouse), a disk drive unit 144, a signal generation device 146 (e.g., a speaker), and a network interface device 148.

The disk drive unit 144 includes a machine-readable medium 150 on which is stored one or more sets of instructions 152 (e.g., software) embodying any one or more of the methodologies or functions described herein. The software may also reside, completely or at least partially, within the main memory 132 and/or within the processor 130 during execution thereof by the client computer system 18, the memory 132 and the processor 130 also constituting machine readable media. The software may further be transmitted or received over a network 154 via the network interface device 148.

While the instructions 152 are shown in an exemplary embodiment to be on a single medium, the term "machine-readable medium" should be taken to understand a single medium or multiple media (e.g., a centralized or distributed database or data source and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Local Searching and Interface

Figure 4:
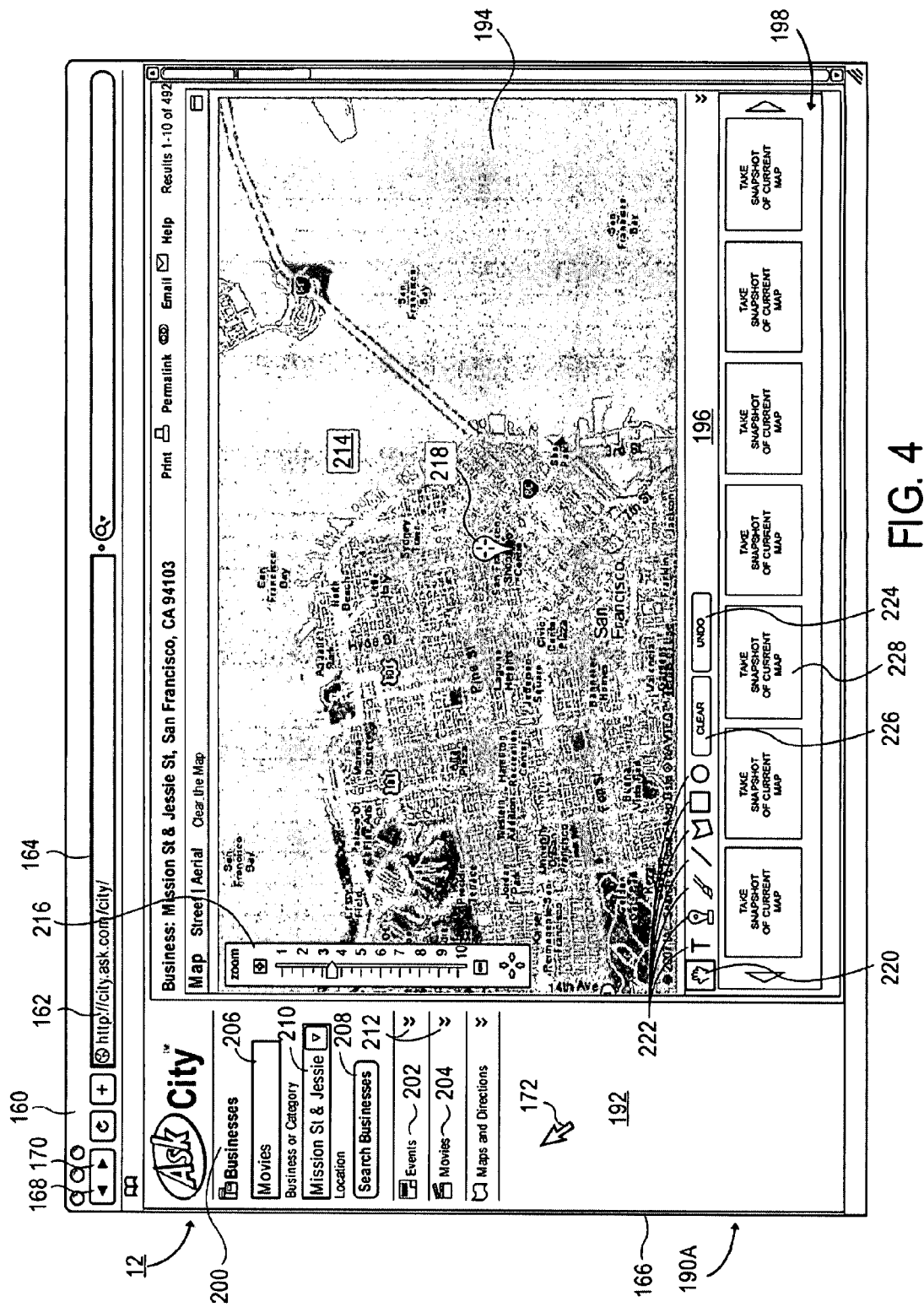
FIG. 4 is a view of a browser at a client computer system in the network environment of FIG. 1, the browser displaying a view of a user interface received from a server computer system in the network environment.

FIG. 4 of the accompanying drawings illustrates a browser 160 that displays a user interface 12 according to an embodiment of the invention. The browser 160 may, for example, be an Internet Explorer™, Firefox™, Netscape™, or any other browser. The browser 160 has an address box 164, a viewing pane 166, and various buttons such as back and forward buttons 168 and 170. The browser 160 is loaded on a computer at the client computer system 18 of FIG. 1. A user at the client computer system 18 can load the browser 160 into memory, so that the browser 160 is displayed on a screen such as the video display 138 in FIG. 3.

Figure 5:
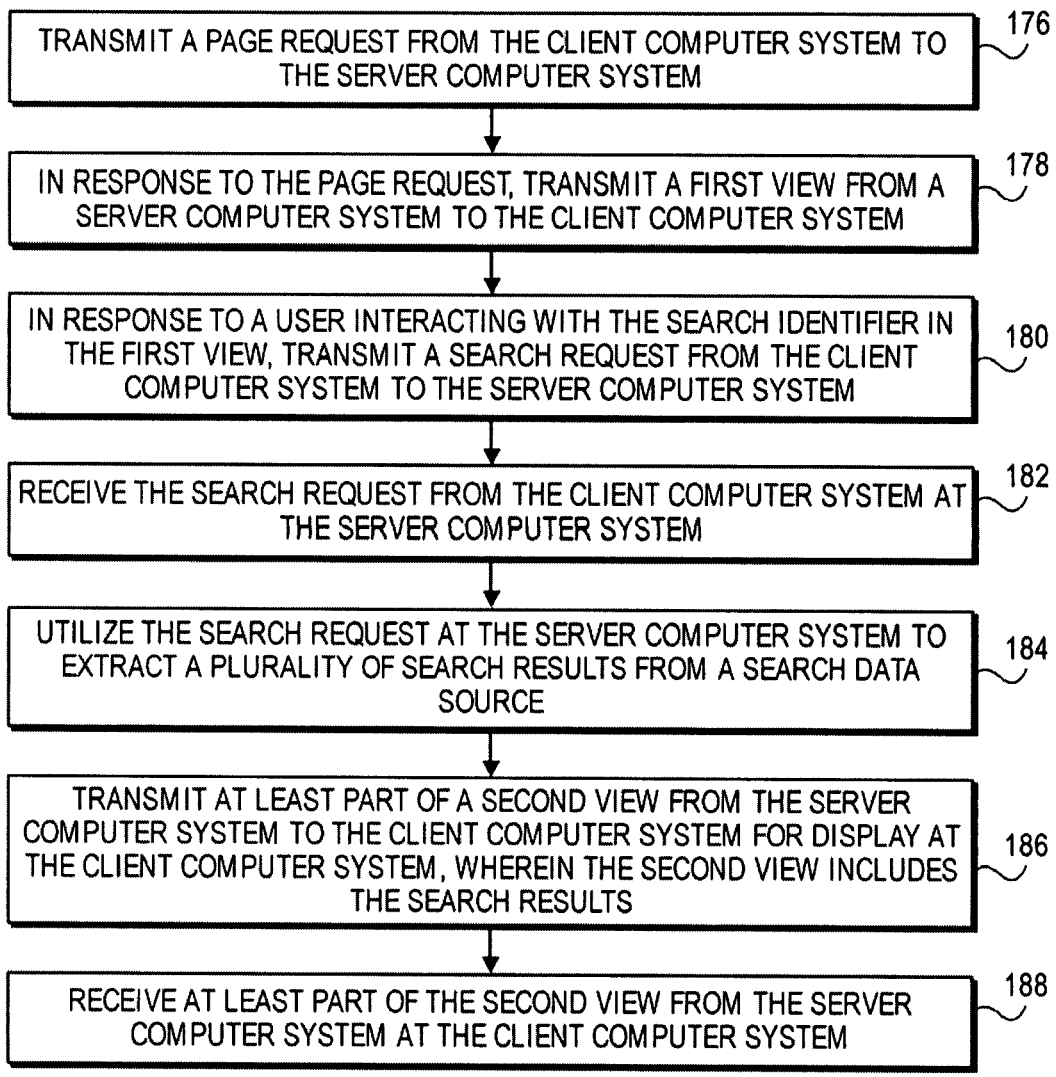
FIG. 5 is a flowchart showing how the view in FIG. 4 is obtained and how a subsequent search is conducted.

The user enters an address (in the present example, the internet address http://city.ask.com/city/) in the address box 164. A mouse (i.e., the cursor control device 142 of FIG. 3) is used to move a cursor 172 into the address box 164, and a left button is depressed or "clicked" on the mouse. After clicking on the left button of the mouse, the user can use a keyboard to enter text into the address box 164. The user then presses "Enter" on the keyboard. Referring to FIG. 5, a command is then sent over the internet requesting a page corresponding to the address that is entered into the address box 164, or a page request is transmitted from the client computer system 18 to the server computer system 16 (Step 176). The page that is retrieved at the server computer system 16 is a first view of the user interface 12 and is transmitted from the server computer system 16 to the client computer system 18 and displayed in the viewing pane 166 (Step 178).

FIG. 4 illustrates a view 190A of the user interface 12 that is received at step 178 in FIG. 5. The view 190A can also be obtained as described in U.S. patent application Ser. No. 11/611,777 filed on Dec. 15, 2006, details of which are incorporated herein by reference.

The view 190A includes a search area 192, a map area 194, a map editing area 196, and a data saving and recollecting area 198. The view 190A of user interface 12 does not, at this stage, include a results area, a details area, or a driving directions area. It should be understood that all components located on the search area 192, the map area 194, the map editing area 196, the data saving and recollecting area 198, a results area, a details area, and a driving directions area form part of the user interface 12 in FIG. 1, unless stipulated to the contrary.

The search area 192 includes vertical search determinators 200, 202, and 204 for "Businesses," "Events," and "Movies" respectively. An area below the vertical search determinator 200 is open and search identifiers in the form of a search box 206 and a search button 208 together with a location identifier 210 are included in the area below the vertical search determinator 200. Maximizer selectors 212 are located next to the vertical search determinators 202 and 204.

The map area 194 includes a map 214, a scale 216, and a default location marker 218. The map 214 covers the entire surface of the map area 194. The scale 216 is located on a left portion of the map 214. A default location, in the present example an intersection of Mission Street and Jessie Street in San Francisco, Calif., 94103, is automatically entered into the location identifier 210, and the default location marker 218 is positioned on the map 214 at a location corresponding to the default location in the location identifier 210. Different default locations may be associated with respective ones of the client computer systems 18 in FIG. 1 and the default locations may be stored in one of the structured databases or data sources 26. Details of how a location marker is positioned on a map and displayed over the internet as well as a scale of a map and other features are disclosed in U.S. patent application Ser. No. 10/677,847 filed on Feb. 22, 2007, which is incorporated herein by reference and in its entirety.

Included on the map editing area 196 are a map manipulation selector 220, seven map addition selectors 222, a clear selector 224, and an undo selector 226. The map addition selectors 222 include map addition selectors 222 for text, location markers, painting of free-form lines, drawing of straight lines, drawing of a polygon, drawing of a rectangle, and drawing of a circle.

The data saving and recollecting area 198 includes a plurality of save selectors 228. The save selectors 228 are located in a row from left to right within the data saving and recollecting area 198.

The search box 206 serves as a field for entering text. The user moves the cursor 172 into the search box 206 and then depresses the left button on the mouse to allow for entering of the text in the search box 206. In the present example, the user enters search criteria "Movies" in the search box 206. The user decides not to change the contents within the location identifier 210. The user then moves the cursor over the search button 208 and completes selection of the search button 208 by depressing the left button on the mouse.

Referring again to FIG. 5, in response to the user interfacing with the search identifiers (the search box 206 and the search button 208) in the first view 190A, a search request is transmitted from the client computer system 18 (see FIG. 1) to the server computer system 16 (step 180). The search request is received from the client computer system 18 at the server computer system 16 (step 182). The server computer system 16 then utilizes the search request to extract a plurality of search results from a search data source (step 184). The search data source may be a first of the structured databases or data sources 26 in FIG. 1. At least part of a second view is transmitted from the server computer system 16 to the client computer system 18 for display at the client computer system 18 and the second view includes the search results (step 186). At least part of the second view is received from the server computer system at the client computer system (step 188).

Figure 6:
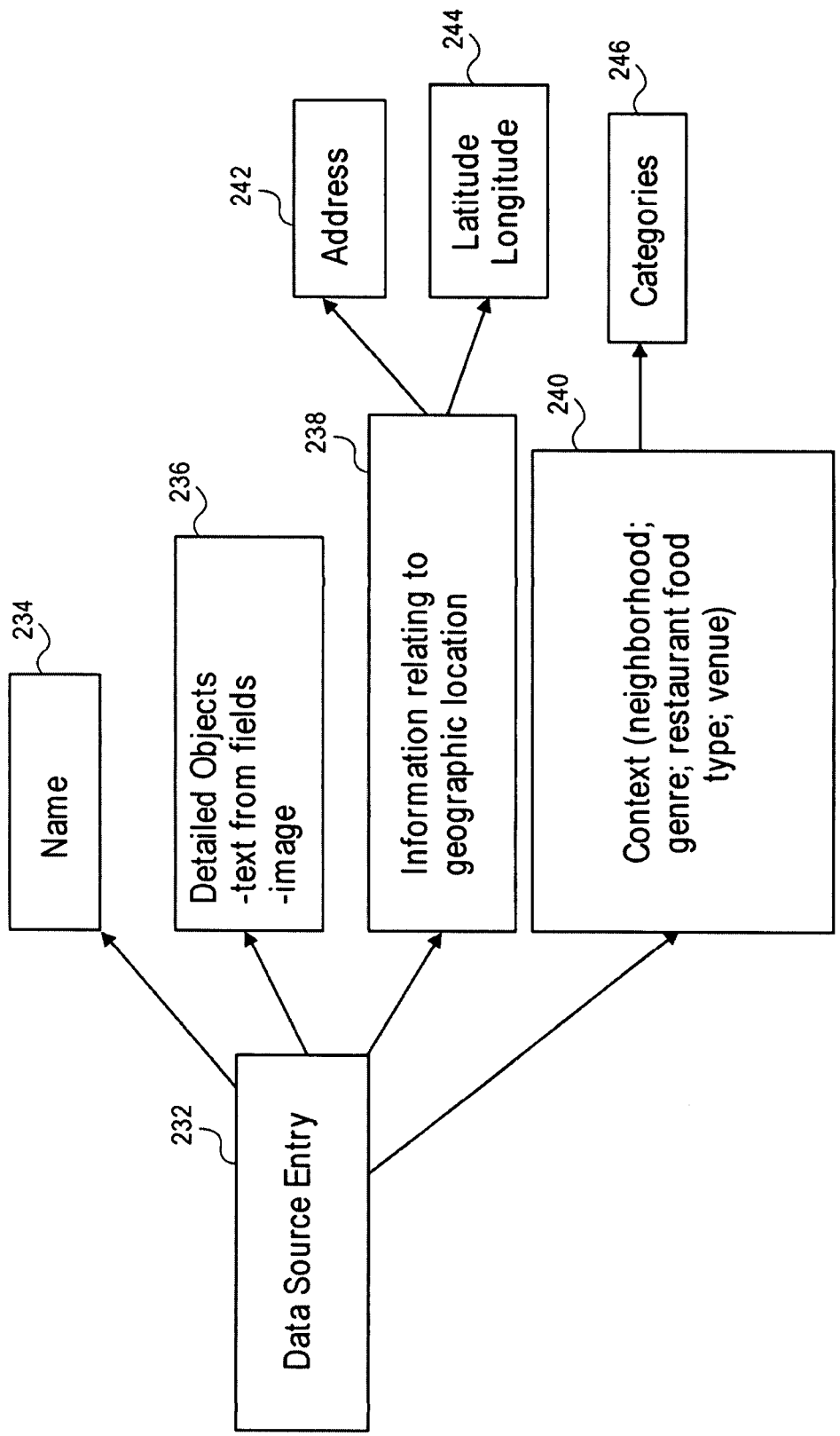
FIG. 6 is a block diagram of one of a plurality of data source entries that are searched.

FIG. 6 illustrates one data source entry 232 of a plurality of data source entries in the search data source, namely the first of the structured databases or data sources 26 in FIG. 1. The data source entry 232 is a free-form entry that generally includes a name 234, detailed objects 236 such as text from fields and one or more images, information 238 relating to a geographic location, and context 240 relating to, for example, neighborhood, genre, restaurant food type, and venue. The information 238 relating to the geographic location include an address 242, and coordinates of latitude and longitude 244. Each one of the context identifiers of the context 240, for example, "neighborhood," can have one or more categories 246 such as "Pacific Heights" or "downtown" associated therewith.

In the present example, the data source entry 232 is extracted if any one of the fields 234, 236, 238, or 240 is for a movie. In addition, the data source entry 232 is extracted only if the coordinates of latitude and longitude 244 are within a predetermined radius, for example within one mile, from coordinates of latitude and longitude of the intersection of Mission Street and Jessie Street. Should an insufficient number, for example, fewer than ten, data source entries such as the data source entry 232 for movies have coordinates of latitude and longitude 244 within a one-mile radius from the coordinates of latitude and longitude of Mission Street and Jessie Street, the threshold radius will be increased to, for example, two miles. All data source entries or movies having coordinates of latitude and longitude 244 within a two-mile radius of coordinates of latitude and longitude of Mission Street and Jessie Street are extracted for transmission to the client computer system 18.

Figure 7:
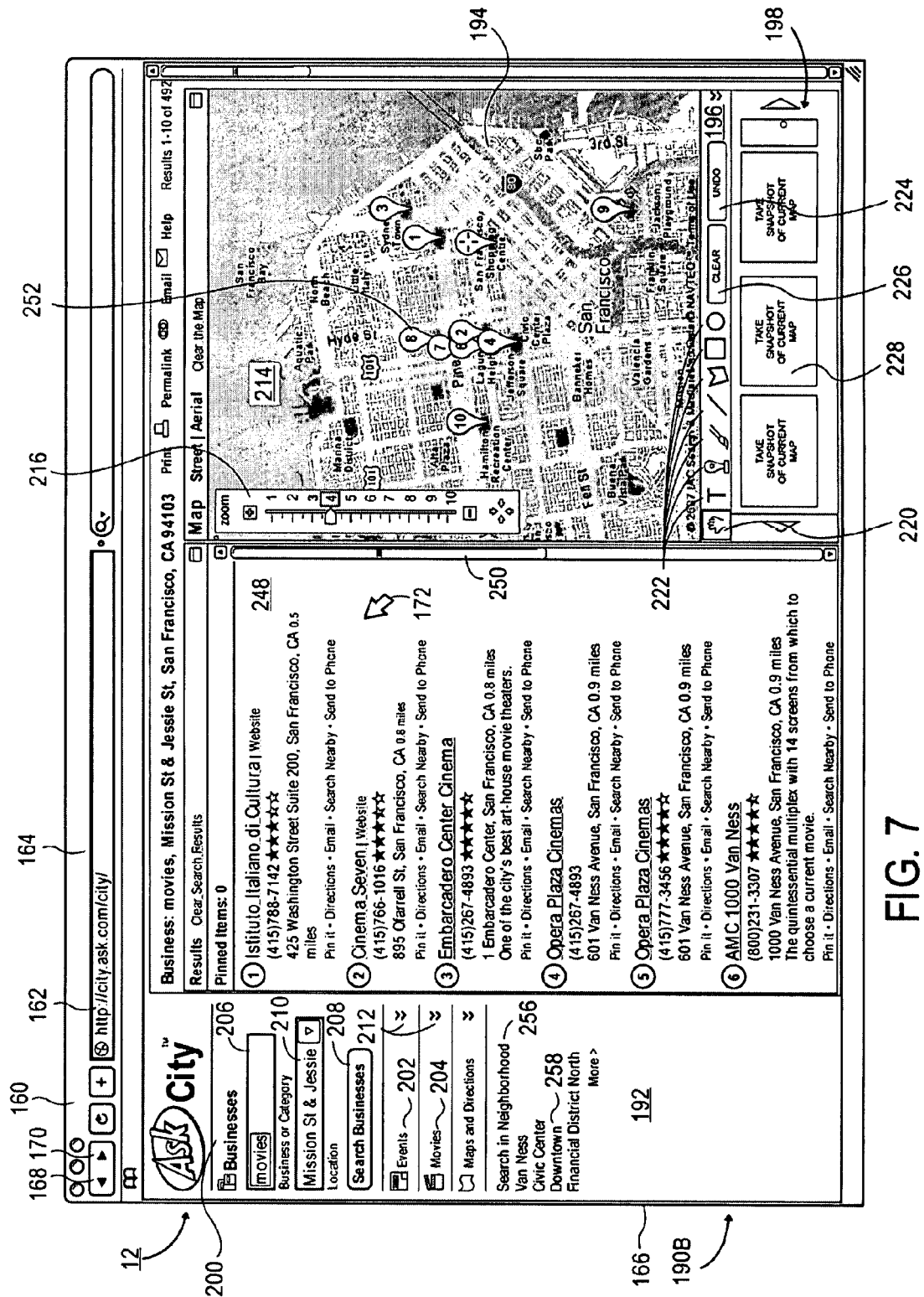
FIG. 7 shows a view of the user interface after search results are obtained and displayed in a results area and on a map of the user interface.

FIG. 7 illustrates a subsequent view 190B of the user interface 12 that is displayed following step 188 in FIG. 5. The view 190B now includes a results area between the search area 192 on the left and the map area 194, the map editing area 196, and the data saving and recollecting area 198 on the right. Search results numbered 1 through 6 are displayed in the results area 248. Each one of the search results includes a respective name corresponding to the name 234 of the data source entry 232 in FIG. 6, a respective address corresponding to the respective address 242 of the respective data source entry 232, and a telephone number. The results area 248 also has a vertical scroll bar 250 that can be selected and moved up and down. Downward movement of the vertical scroll bar 250 moves the search results numbered 1 and 2 off an upper edge of the results area 248 and moves search results numbered 7 through 10 up above a lower edge of the results area 248.

A plurality of location markers 252 are displayed on the map 214. The location markers 252 have the same numbering as the search results in the results area 248. The coordinates of latitude and longitude 244 of each data source entry 232 in FIG. 6 are used to position the location markers 252 at respective locations on the map 214.

Also included in the search area 192 in the view 190B are a context identifier 256 and a plurality of related search suggestions 258. The context identifier 256 is for "neighborhood" and is thus similar to "neighborhood" of the context 240 in FIG. 6. In the view 190B, only one context identifier 256 is included. It should be understood that a number of context identifiers 256 may be shown, each with a respective set of related search suggestions. The context identifier 256 or context identifiers that are included in the search area 192 depend on the vertical search determinators 200, 202, and 204. In the example of the view 190B of FIG. 7, a search is carried out under the vertical search determinator 200 for "business" and the context identifier 256 is for "neighborhood." Context identifiers for "genre" or "venue" are not included for searches under the vertical search determinator 200 for "business."

FIG. 8 illustrates a neighborhood and city relational table that is stored in one of the structured databases or data sources 26 in FIG. 1. The table in FIG. 8 includes a plurality of different neighborhoods and a respective city associated with each one of the neighborhoods. The names of the neighborhoods, in general, do not repeat. The names of the cities do repeat because each city has more than one neighborhood. Each one of neighborhoods also has a respective mathematically-defined area associated therewith.

When a search is conducted, one or more coordinates are extracted for a location of the search. In the present example, the coordinates of latitude and longitude of the intersection of Mission Street and Jessie Street in San Francisco are extracted. The coordinates are then compared with the areas in the table of FIG. 8 to determine which one of the areas holds the coordinates. Once the area holding the coordinates is determined, for example, Area 5, the city associated with Area 5, namely City 2, is extracted. In the present example the city may be San Francisco, Calif. All the neighborhoods in City 2 are then extracted, namely Neighborhood 1, Neighborhood 5, and Neighborhood 8. In the present example, the neighborhoods for San Francisco are shown as the related search suggestions 258 in the view 190B under the context identifier 256.

The related search suggestions 258 are thus the result of an initial search for movies near Mission Street and Jessie Street in San Francisco, Calif. When the user selects one of the related search suggestions 258 in the view 190B, a subsequent search will be carried out at the server computer system 16 according to the method of FIG. 5. Such a subsequent search will be for movies in or near one of the areas in FIG. 8 corresponding to the related search suggestions 258 selected in the view 190B.

A comparison between FIGS. 4 and 7 will show that certain components in the view 190A of FIG. 4 also appear in the view 190B of FIG. 7. It should also be noted that components such as the vertical search determinators 200, 202, and 204, the maximizer selectors 212, the search box 206, the location identifier 210, the search button 208, and the search area 192 are in exactly the same locations in the view 190A of FIG. 4 and in the view 190B of FIG. 7. The size and shape of the search area 192 is also the same in both the view 190A of FIG. 4 and the view 190B of FIG. 7. The map area 194, the map editing area 196, and the data saving and recollecting area 198 are narrower in the view 190B of FIG. 7 to make space for the results area 248 within the viewing pane 166.

As mentioned, the user can select or modify various ones of the components within the search area 192 in the view 190B of FIG. 7. The user can also move the cursor 172 onto and select various components in the map area 194, the map editing area 196, the data saving and recollecting area 198, or the results area 248. The names of the search results in the results area 248 are selectable. In the present example, the user moves the cursor 172 onto the name "AMC 1000 Van Ness" of the sixth search result in the results area 248.

Selection of the name of the sixth search result causes transmission of a results selection request, also serving the purpose of a profile page request, from the client computer system 18 in FIG. 1 to the server computer system 16. One of the structured databases or data sources 26, for example the structured database or data source 26 second from the top, holds a plurality of profile pages. Each one of the profile pages is generated from content of a data source entry 232 in FIG. 6. A profile page in particular includes the name 234, the detailed object 236, the address 242, and often the context 240. The profile page typically does not include the coordinates of latitude and longitude 244 forming part of the data source entry 232. The search engine 28 then extracts the particular profile page corresponding to the sixth search result and then transmits the respective profile page back to the client computer system 18.

Figure 9:
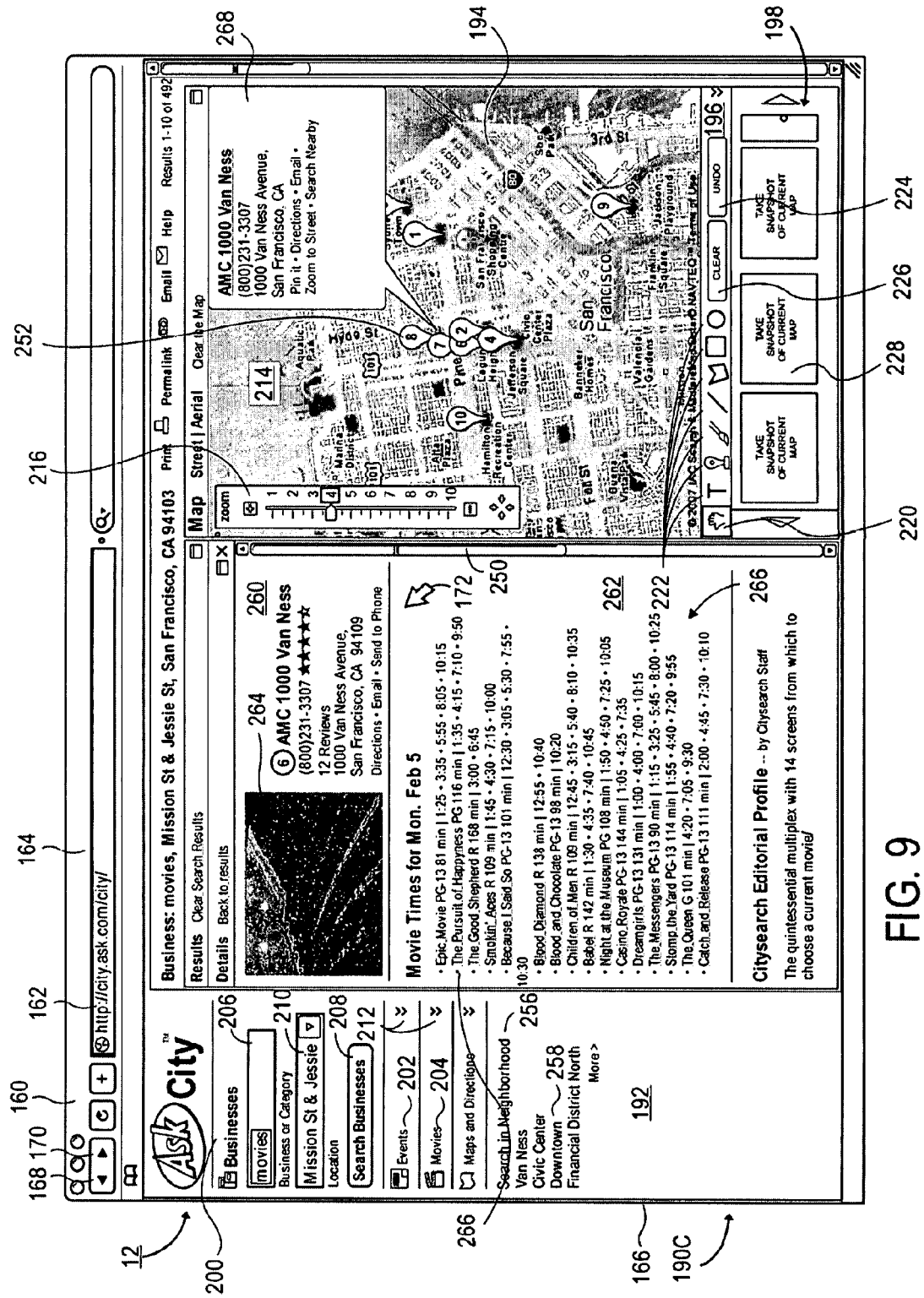
FIG. 9 is a view of the user interface showing a profile page that is obtained using the view of FIG. 7.

FIG. 9 shows a view 190C that appears when the profile page is received by the client computer system 18 in FIG. 1. The view 190C of FIG. 9 is the same as the view 190B of FIG. 7, except that the results area 248 has been replaced with a details area 260 holding a profile page 262 transmitted from the server computer system 16. The profile page 262 includes the same information of the sixth search result in the results area 248 in the view 190B of FIG. 7 and includes further information from the detailed objects 236 of the data source entry 232. Such further information includes an image 264 and movies with show times 266.

A window 268 is also inserted on the map 214 and a pointer points from the window 268 to the location marker 252 numbered "6." The exact same information at the sixth search result in the results area 248 in the view 190B of FIG. 7 is also included in the window 268 in the view 190C of FIG. 9. The profile page 262 thus provides a vertical search result and the map 214 is interactive.

Persistence is provided from one view to the next. The search area 192, the map area 194, the map editing area 196, and the data saving and recollecting area 198 are in the exact same locations when comparing the view 190B of FIG. 7 with the view 190C of FIG. 9. Apart from the window 268 and its contents, all the components in the search area 192, map area 194, map editing area 196, and data saving and recollecting area are also exactly the same in the view 190B of FIG. 7 and in the view 190C of FIG. 9. The vertical scroll bar 150 can be used to move the profile page 262 relative to the viewing pane 166 and the remainder of the user interface 12.

The movies portions of the movies and show times 266 are selectable. In the present example, the user selects the movie "The Good Shepherd" to cause transmission of a profile page request from the client computer system 18 in FIG. 1 to the server computer system 16. The server computer system 16 extracts a profile page for "The Good Shepherd" and transmits the profile page to the client computer system 18.

Figure 10:
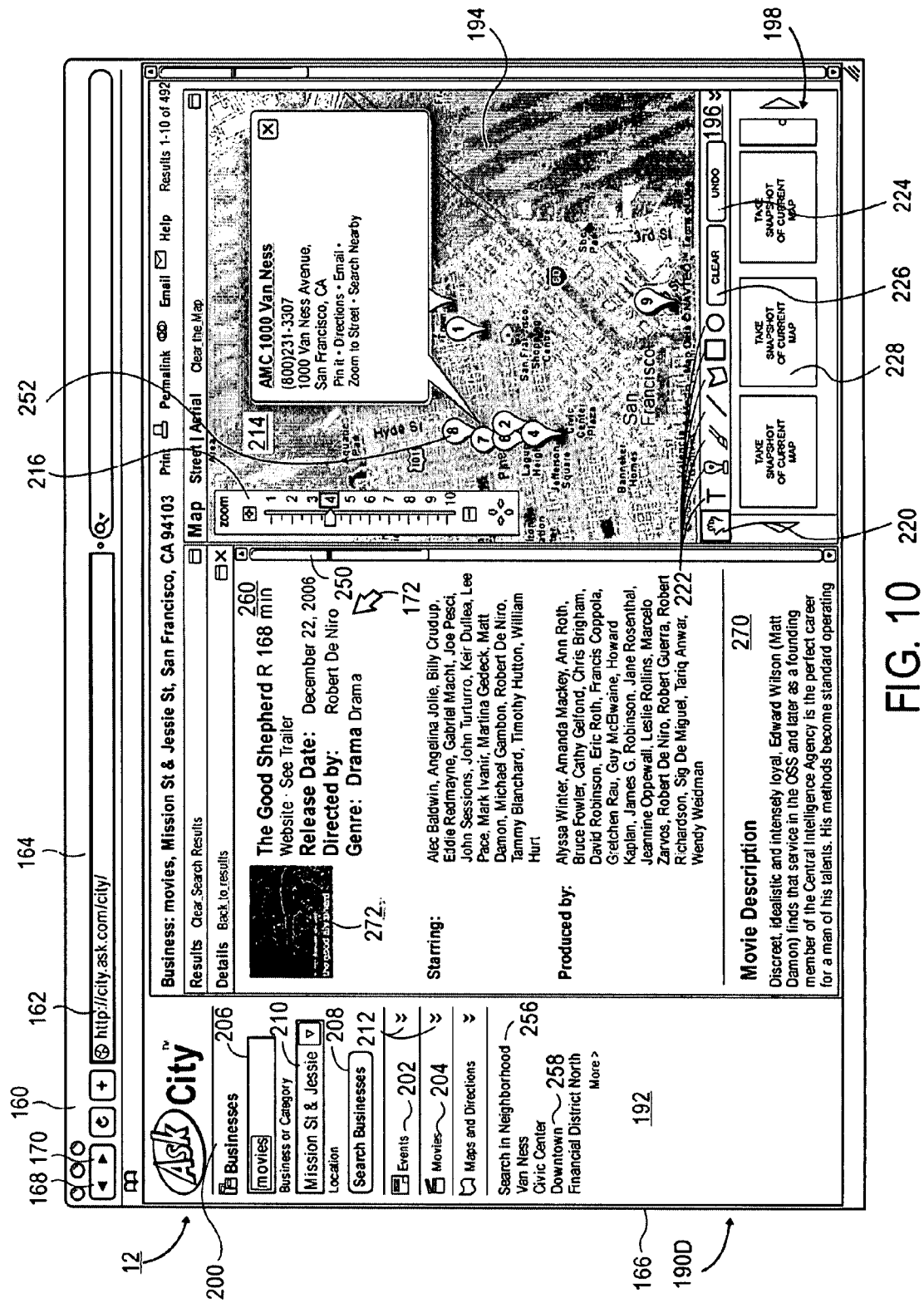
FIG. 10 is a view of the user interface showing a profile page that is obtained using the view of FIG. 9.

FIG. 10 shows a view 190D of the user interface 12 after the profile page for "The Good Shepherd" is received at the client computer system 18. The view 190D of FIG. 10 is exactly the same as the view 190C of FIG. 9, except that the profile page 262 in the view 190C of FIG. 9 is replaced with a profile page 270 in the view 190D of FIG. 10. The profile page 270 is the profile page for "The Good Shepherd" and includes an image 272 and the text indicating the name of the movie, its release date, its director, is genre, actors starring in the movie, who produced the movie, and a description of the movie. It could at this stage be noted that one of the actors of the movie "The Good Shepherd" is shown to be "Matt Damon."

Figure 11:
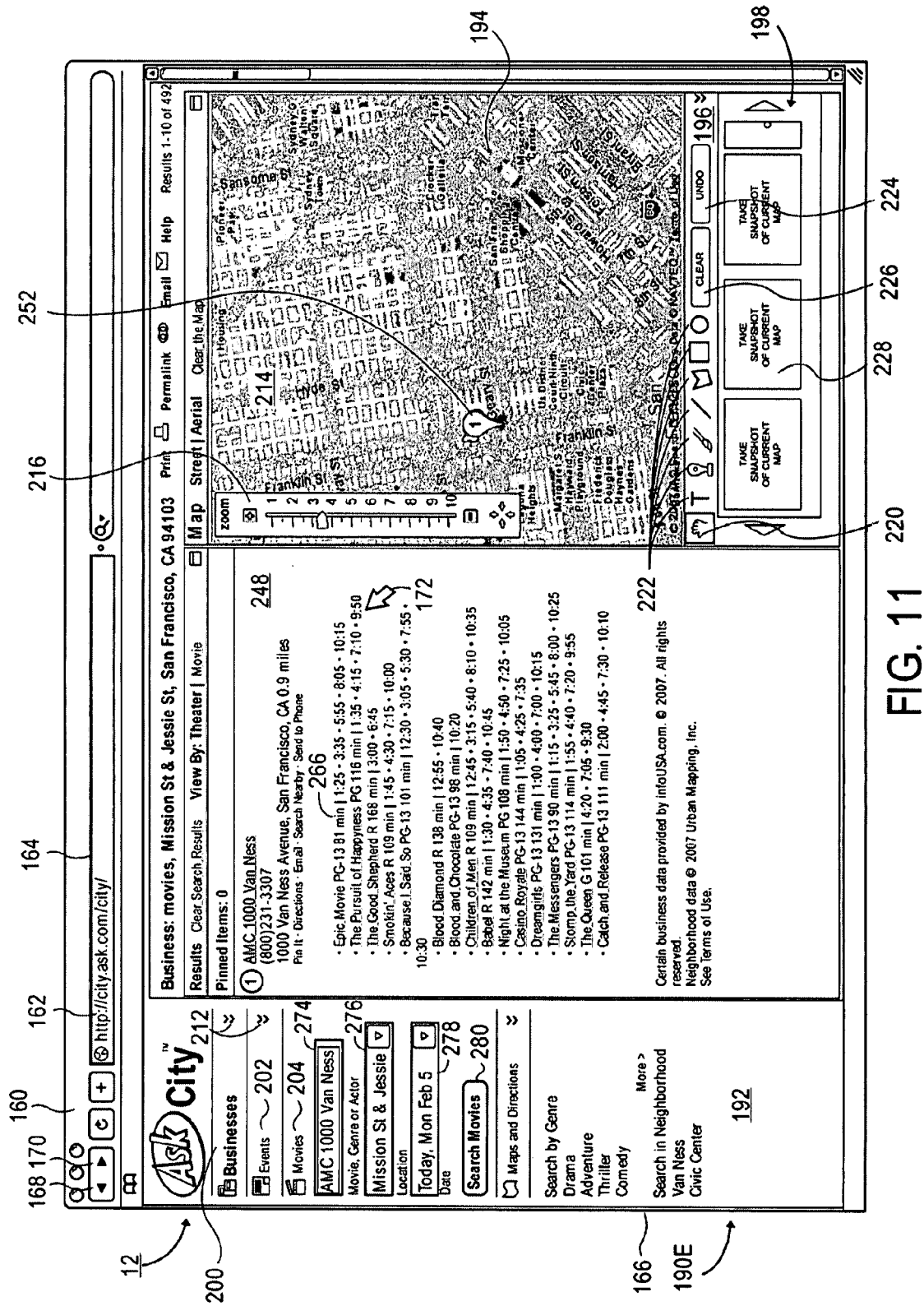
FIG. 11 is a view of the user interface showing a further search that is conducted and from which the same profile page as shown in FIG. 9 can be obtained.

FIG. 11 illustrates a further view 190E of the user interface 12 after the maximizer selector 112 next to the vertical search determinator 204 for "Movies" in the view 190D of FIG. 10 is selected. The search box 206, location identifier 210, and search button 208 below the vertical search determinator 200 for "Businesses" in the view 190D of FIG. 10 are removed in the view 190E of FIG. 11. The vertical search determinators 202 and 204 are moved upward in the view 190E of FIG. 11 compared to the view 190D of FIG. 10.

A search box 274, a location identifier 276, a date identifier 278, and a search button 280 are inserted in an area below the vertical search determinator 204 for "Movies."

in the present example, the user enters "AMC 1000 Van Ness" in the search box 274. The user elects to keep the default intersection of Mission Street and Jessie Street, San Francisco, Calif., 94103 in the location identifier 276, and elects to keep the date in the date identifier 278 at today, Monday, Feb. 5, 2007. The user then selects the search button 280. Upon selection of the search button, the details area 260 in the view 190 of FIG. 10 is again replaced with the results area 248 shown in the view 190B of FIG. 7. The results area 248 in the view 190E of FIG. 11 includes only one search result. The search result includes the same information as the sixth search result in the results area 248 of the view 190B of FIG. 7, but also includes the movies and show times 266 shown in the profile page 262 in the view 190C of FIG. 9. The user can now select the movie "The Good Shepherd" from the movies and show times 266 in the view 190E of FIG. 11. Selection of "The Good Shepherd" causes replacement of the results area 248 with the details area 260 shown in the view 190D of FIG. 10 with the same profile page 270 in the details area 260. The exact same profile page 270 for "The Good Shepherd" can thus be obtained under the vertical search determinator 200 for "Businesses" and the vertical search determinator 204 for "Movies." The profile page 270 for "The Good Shepherd" is thus independent of the vertical search determinators 200, 202, and 204 that the user interacts with.

The view 190E of FIG. 11 has two context identifiers 256, namely for "genre" and "neighborhood." A plurality of related search suggestions 258 are shown below each context identifier 256. The context identifier 256 for "genre" is never shown under the vertical search determinator 200 for "Businesses." The related search suggestions 258 under the context identifier 256 are extracted from the profile pages for the movies included under the movies and show times 266 for all the search results (in the present example, only one search result) shown in the results area 248.

Figure 12:
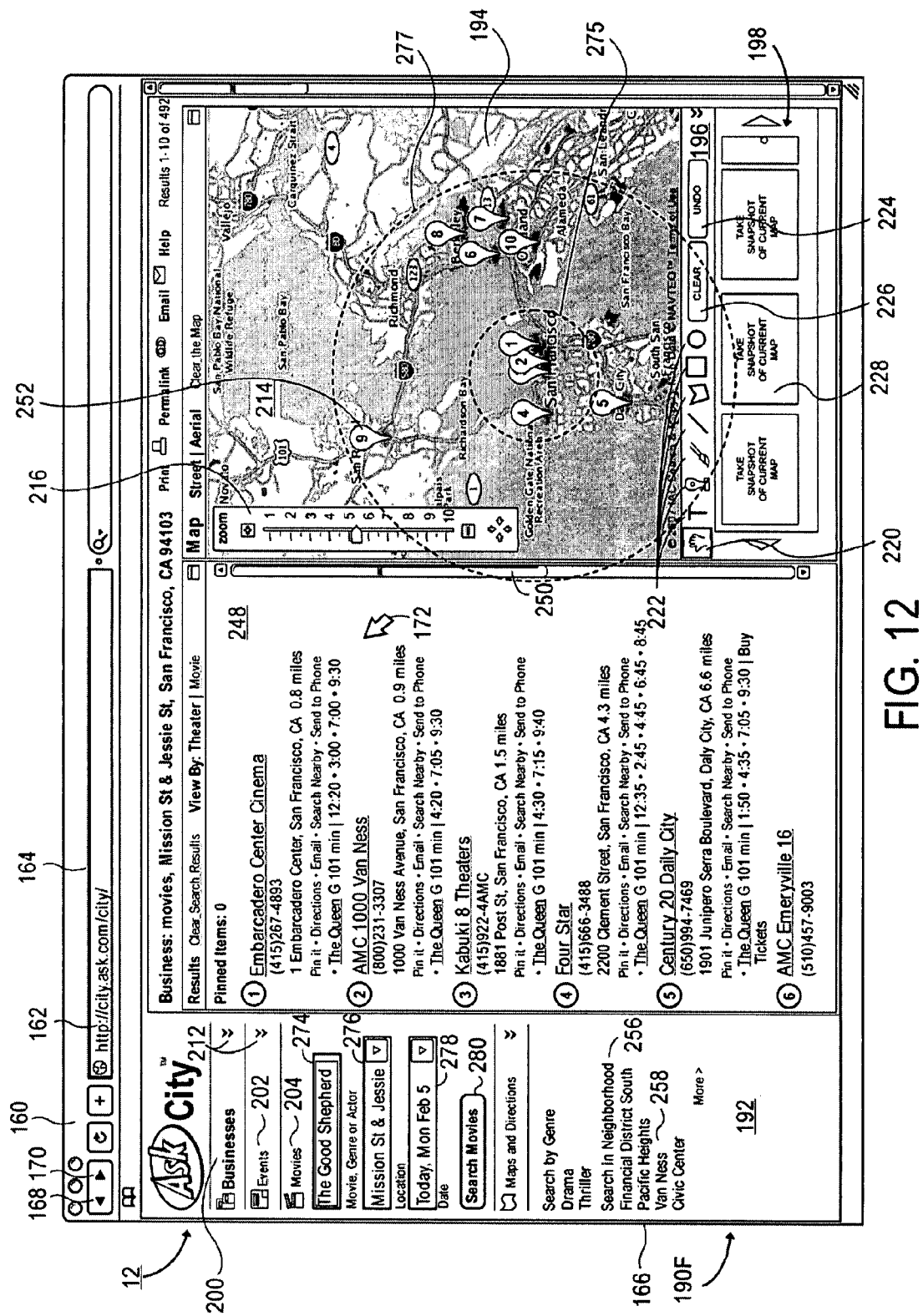
FIG. 12 shows a view of the user interface wherein results are obtained by searching a first of a plurality of fields of data source entries.

FIG. 12 illustrates a further search that can be conducted by the user. The user enters "The Good Shepherd" in the search box 274 under the vertical search determinator 204 for "Movies." The search request is transmitted from the client computer system 18 in FIG. 1 to the server computer system 16. The server computer system 16 then extracts a plurality of search results and returns the search results to the client computer system 18. A view 190F as shown in FIG. 12 is then displayed wherein the search results are displayed in the results area 248. Each one of the results is for a theater showing the movie "The Good Shepherd." The server computer system 16 compares the search query or term "The Good Shepherd" with text in the detailed objects 236 of each data source entry 232 in FIG. 6. The view 190E in FIG. 12, for example, shows that the movie "The Good Shepherd" shows at the theater "AMC 1000 Van Ness."

Ten search results are included within the results area 248 and six of the search results are shown at a time by sliding the vertical scroll bar 250 up or down. All ten search results are shown on the map 214. Only four of the results are within a circle 275 having a smaller radius, for example a radius of two miles, from an intersection of Mission Street and Jessie Street, San Francisco, Calif., 94103. Should there be ten search results within the circle 275, only the ten search results within the circle 275 would be included on the map 214 and within the results area 248. The server computer system 16 recognizes that the total number of search results within the circle 275 is fewer than ten and automatically extracts and transmits additional search results within a larger circle 277 having a larger radius of, for example, four miles from an intersection of Mission Street and Jessie Street, San Francisco, Calif., 94103. All ten search results are shown within the larger circle 277. The circles 275 and 277 are not actually displayed on the map 214 and are merely included on the map 214 for purposes of this description.

Figure 13:
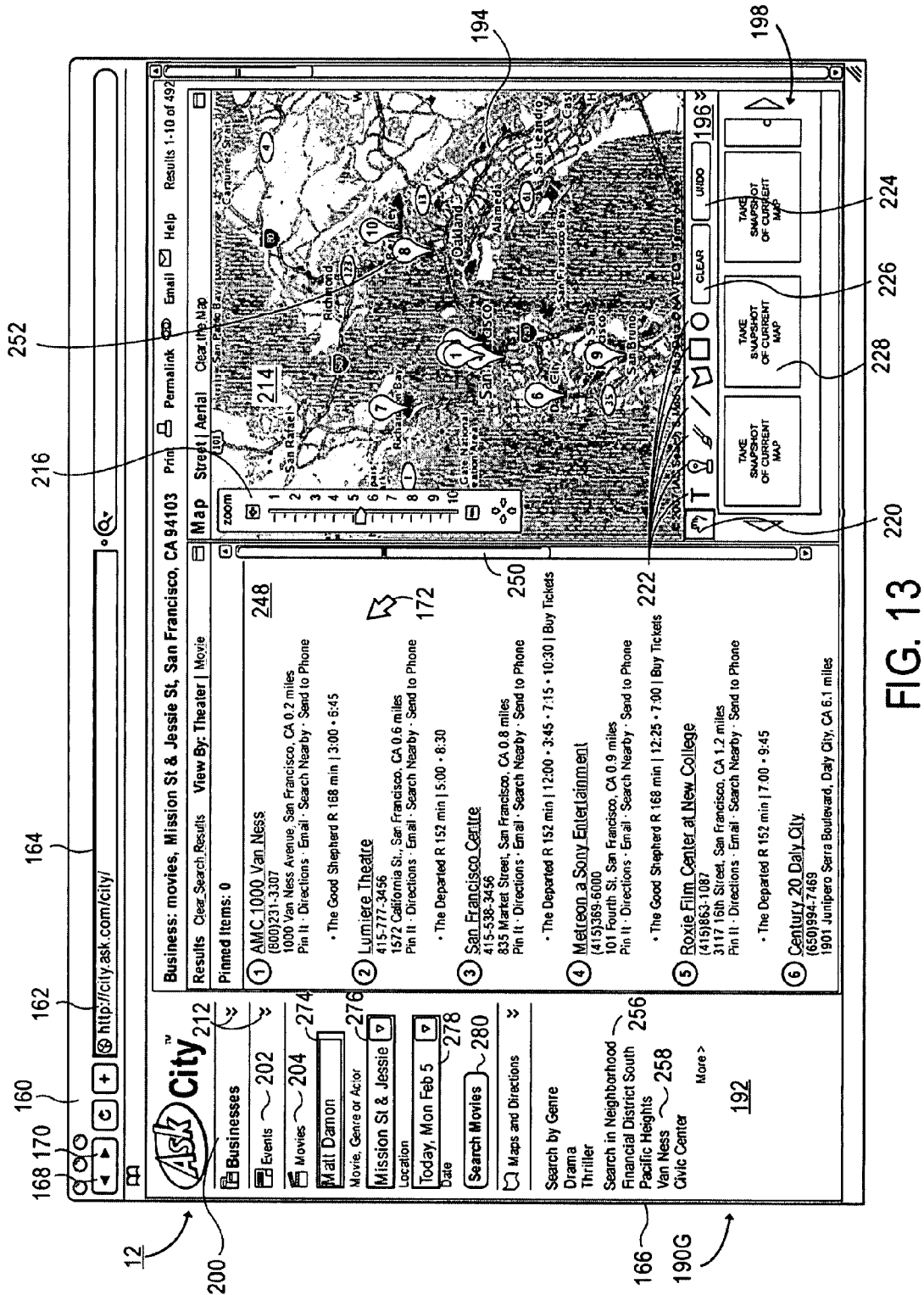
FIG. 13 shows a view of the user interface wherein a second of the plurality of fields that are searched to obtain the view of FIG. 12 are searched to obtain search results and some of the search results in FIGS. 12 and 13 are the same.

FIG. 13 illustrates a further search, wherein the user enters "Matt Damon" in the search box 274. The server computer system compares the query "Matt Damon" with the contents of all location-specific data source entries such as the data source entry 232 in FIG. 6 holding data as represented by the search result in the details area 260 in the view 190C of FIG. 9 and also compares the query "Matt Damon" with profile pages such as the profile page 270 in the view 190D of FIG. 10. Recognizing that the actor "Matt Damon" appears on the profile page 270 for the movie "The Good Shepherd," the search engine then searches for all data source entries, such as the data source entry 232 in FIG. 6 that include the movie "The Good Shepherd." All the data source entries, in the present example all movie theaters, are then transmitted from the server computer system 16 to the client computer system 18. A view 190G as shown in FIG. 13 is then generated with the search results from the data source entries containing "The Good Shepherd" shown in the results area 248 and indicated with location markers 252 on the map 214. One of the search results in the view 190G is for the movie theater "AMC 1000 Van Ness," which also appears in the view 190F of FIG. 12. Multiple fields are thus searched at the same time, often resulting in the same search result.

Figure 14:
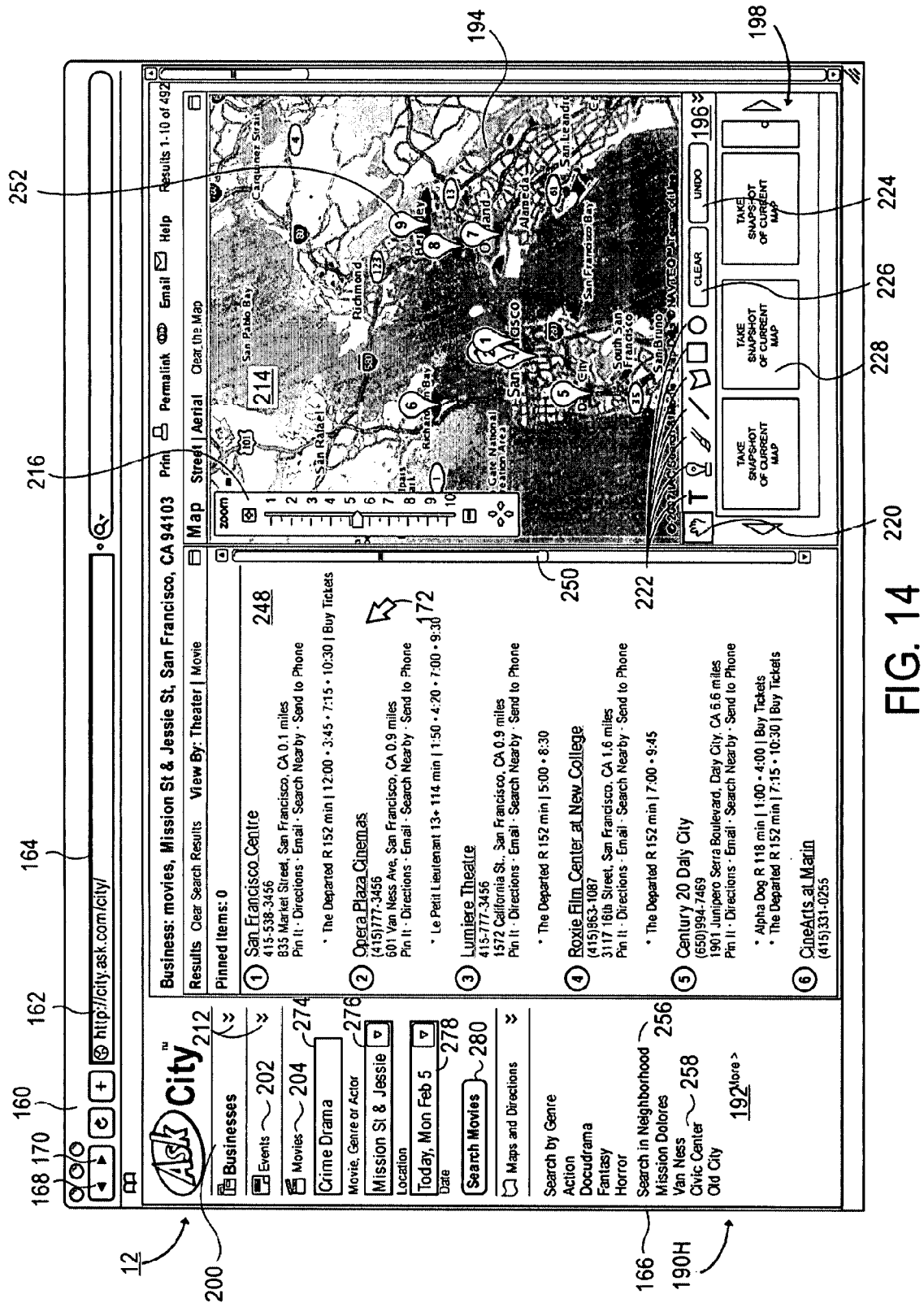
FIG. 14 shows a view of the user interface wherein a further search is conducted.
Figure 15:
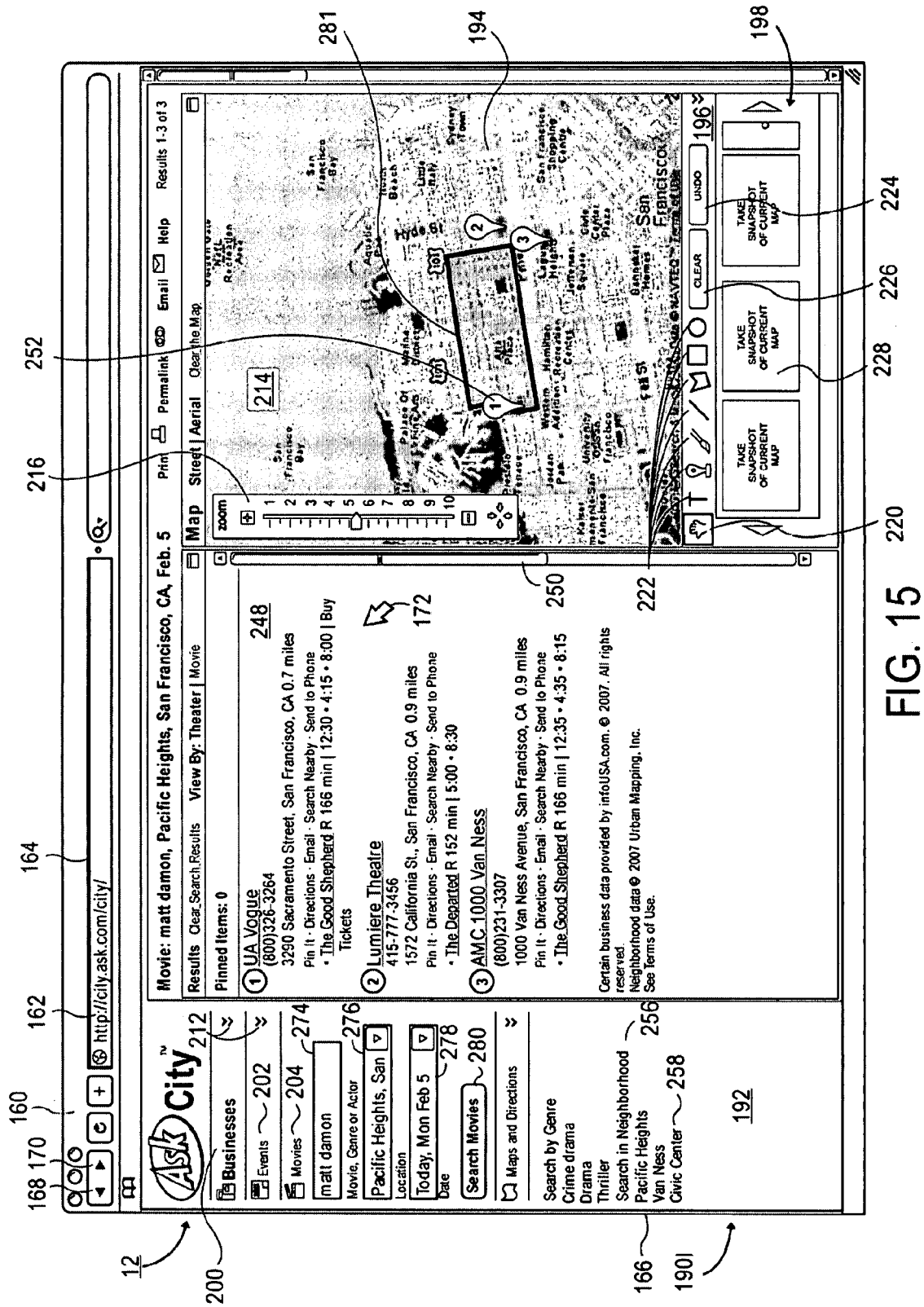
FIGS. 15 and 16 show further views of the user interface wherein further searches are conducted in specific areas and boundaries of the areas are displayed on the map.
Figure 16:
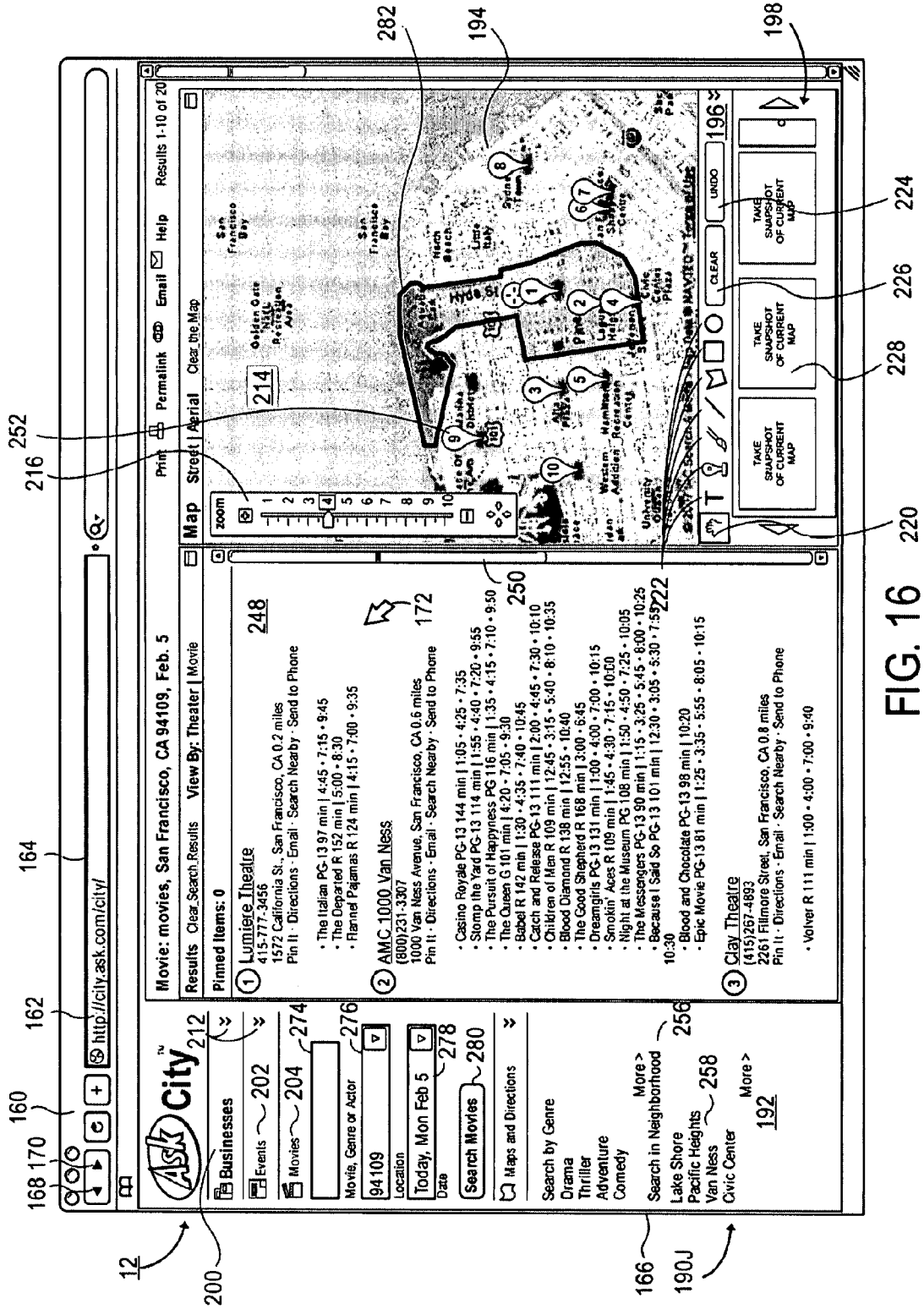

FIGS. 14, 15, and 16 illustrate further searches that can be carried out because multiple fields are searched at the same time, and views 190H, 901I, and 190J that are generated respectively. In FIG. 14, a query "crime drama" is entered in the search box 274. "Crime drama" can also be selected from a related search suggestion 258 under the context identifier 256 for "genre" in an earlier view. A search is conducted based on the data in the search box 274, the location identifier 276, and the date identifier 278.

In FIG. 15, a user types "Matt Damon" in the search box 274 and types "Pacific Heights, San Francisco, Calif." in the location identifier 276. Alternatively, the search criteria "Pacific Heights, San Francisco, Calif." can also be entered by selecting a related search suggestion 258 under the context identifier 256 for "neighborhood" in an earlier view. Again, the search results that are extracted are based on the combined information in the search box 274, location identifier 276, and date identifier 278.

In FIG. 16, the search box 274 is left open and the user types the Zone Improvement Plan (ZIP) code in the location identifier 276. ZIP codes are used in the United States of America, and other countries may use other codes such as postal codes. The resulting search results are for all movies within or near the ZIP code in the location identifier 276 and on the date in the date identifier 278.

Data stored in one of the structured databases or data sources 26 in FIG. 1 that includes coordinates for every ZIP code in the United States of America and FIG. 8 also shows areas representing coordinates for every neighborhood. When a neighborhood or a ZIP code is selected or indicated by the user as described with reference to FIGS. 15 and 16, the server computer system 16 in FIG. 1 also extracts the coordinates for the particular neighborhood or ZIP code. The coordinates for the neighborhood or ZIP code are transmitted together with the search result from the server computer system 16 to the client computer system 18. As shown in the view 901I of FIG. 15, a boundary 281 of an area for the neighborhood "Pacific Heights" in San Francisco, Calif. is drawn as a line on the map 214. Similarly, in FIG. 16, a boundary 282 is drawn on an area corresponding to the ZIP code 94109 and is shown as a line on the map 214.

When a neighborhood or a ZIP code is selected in the location identifier 276, a search is first conducted within a first rectangle that approximates an area of the neighborhood or ZIP code if insufficient search results are obtained, the search is automatically expanded to a second rectangle that is larger than the first rectangle and includes the area of the first rectangle. The second rectangle may, for example, have a surface area that is between 50% and 100% larger than the first rectangle. FIGS. 15 and 16 illustrate that automatic expansion has occurred outside of a first rectangle that approximates the boundaries 281 and 282.

Figure 17:
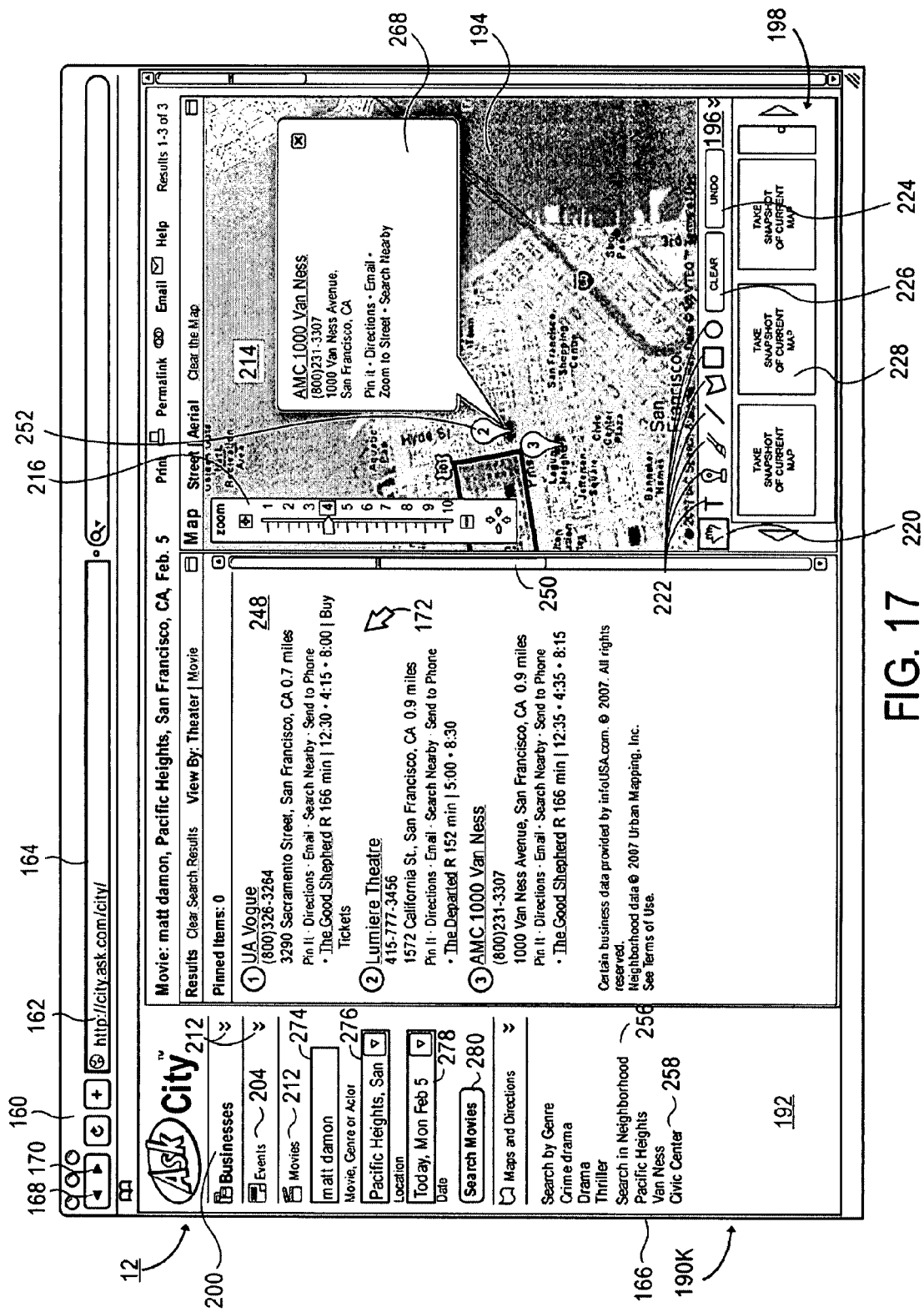
FIGS. 17 and 18 show further views of the user interface, wherein a location marker on the map is changed to a static location marker.

FIG. 17 illustrates a view 190K of the user interface 12 after a third and last of the search results in the view 901I in FIG. 15 is selected. The search result is selected by selecting the location marker 252 numbered "3" in the view 901I of FIG. 15. The window 268 is similar to the window 268 as shown in the view 190C of FIG. 9. Because the search results in the results area 248 in the view 901I of FIG. 15 are not selected, but instead the location marker 252 numbered "3," all the search results in the results area 248 in the view 901I of FIG. 15 are also shown in the results area 248 in the view 190K of FIG. 17.

The window 268 in the view 190K of FIG. 17 includes a "pin it" selector that serves as a static location marker selector. Such a static location marker selector is also shown in each one of the search results in the results area 248. In the present example, the user selects the static location marker in the window 268 that appears upon selection of the static location marker 252 numbered "3" and a static location marker request is then transmitted from the client computer system 18 in FIG. 1 to the server computer system 16. Alternatively, the user can select the static location marker indicator under the third search result in the results area 248 which serves the dual purpose of selecting the third search result and causing transmission of a static location marker request from the client computer system 18 to the server computer system 16.

Figure 18:
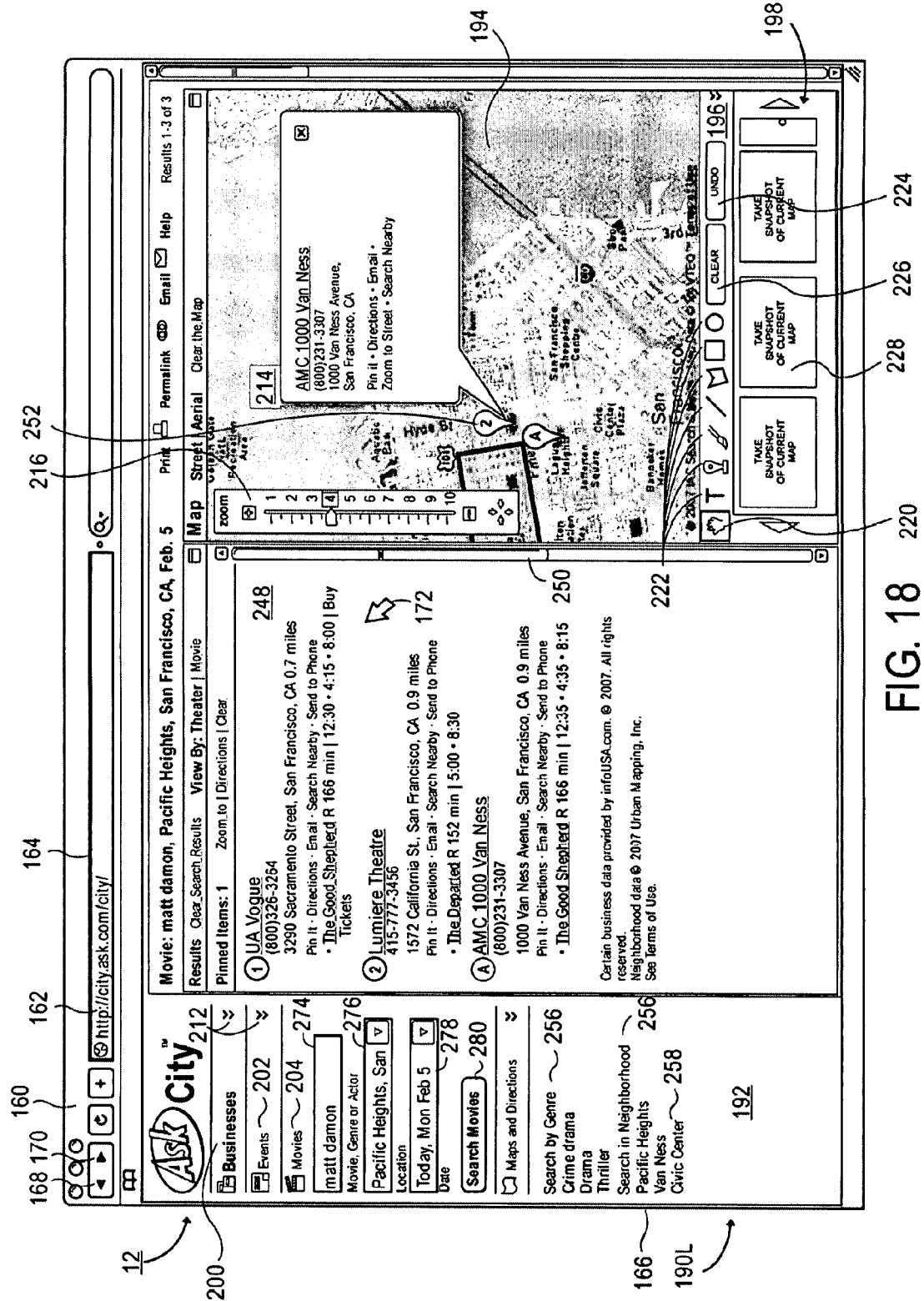

FIG. 18 shows a view 190L of the user interface 12 that is at least partially transmitted from the server computer system 16 to the client computer system 18 in response to the server computer system 16 receiving the static location marker request. The view 190L of FIG. 18 is identical to the view 190K of FIG. 17, except that the third search result in the results area 248 has been relabeled from "3" to "A" and the corresponding location marker is also now labeled "A." The change from numeric labeling to alphabetic labeling indicates that the search result labeled "A" and its corresponding location marker labeled "A" have now been changed to a static search result and a static location marker that will not be removed if a subsequent search is carried out and all of the other search results are replaced.

Figure 19:
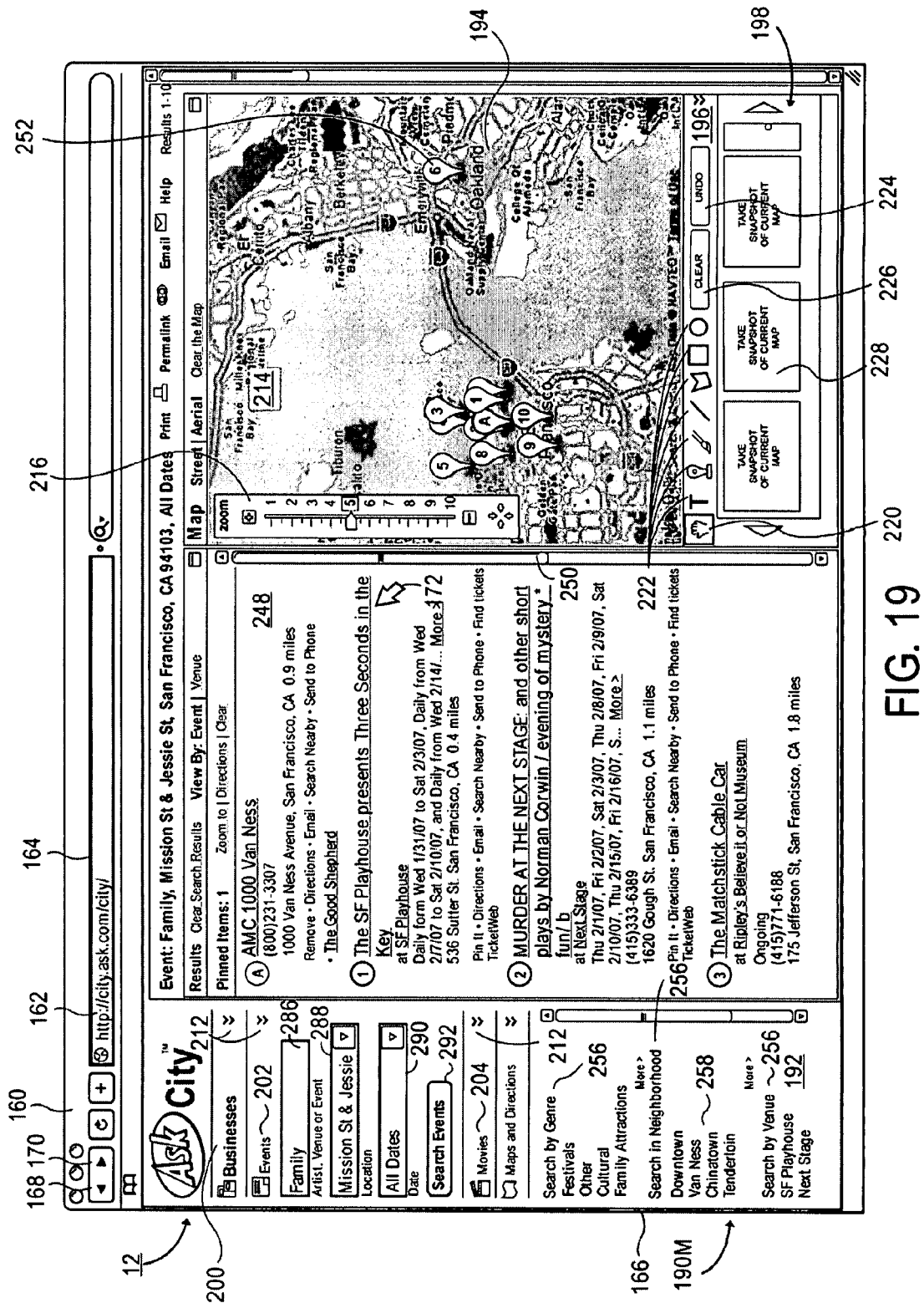
FIG. 19 shows a further view of the user interface wherein a further search is conducted and the static location marker that was set in FIG. 18 is maintained, and further illustrates how the names of context identifiers are changed based on a vertical search identifier that is selected.

FIG. 19 illustrates a view 190M of the user interface 12 after a further search is conducted. The maximizer selector 212 next to the vertical search determinator 202 for "Events" is selected. The vertical search determinator 204 for "Movies" moves down and the search box 274, location identifier 276, date identifier 278, and search button 280 in the view 190L of the FIG. 18 are removed. A search box 286, location identifier 288, date identifier 290, and search button 292 are added below the vertical search determinator 202 for "Events." A search is conducted based on the contents of the search box 286, location identifier 288, and date identifier 290 for events. The results of the search are displayed in the results area, are numbered numerically, and are also shown with location markers 252 on the map 214. The search result labeled "A" in the view 190L of FIG. 18 is also included at the top of the search results in the results area 248 in the view 190M of FIG. 19 and a corresponding location marker 252 labeled "A" is located on the map 214. What should also be noted in the view 190M of FIG. 19 is that context identifiers 256 are included for "genre," "neighborhood," and "venue" with corresponding related search suggestions 258 below the respective context identifiers 256. The context identifier 256 for "venue" is only included when a search is conducted under the vertical search determinator 202 for "Events." The related search suggestions 258 are the names such as the name 234 of the data source entry 232 in FIG. 6 that show events of the kind specified in the search box 286 or if there is a profile page listing such a venue.

Figure 20:
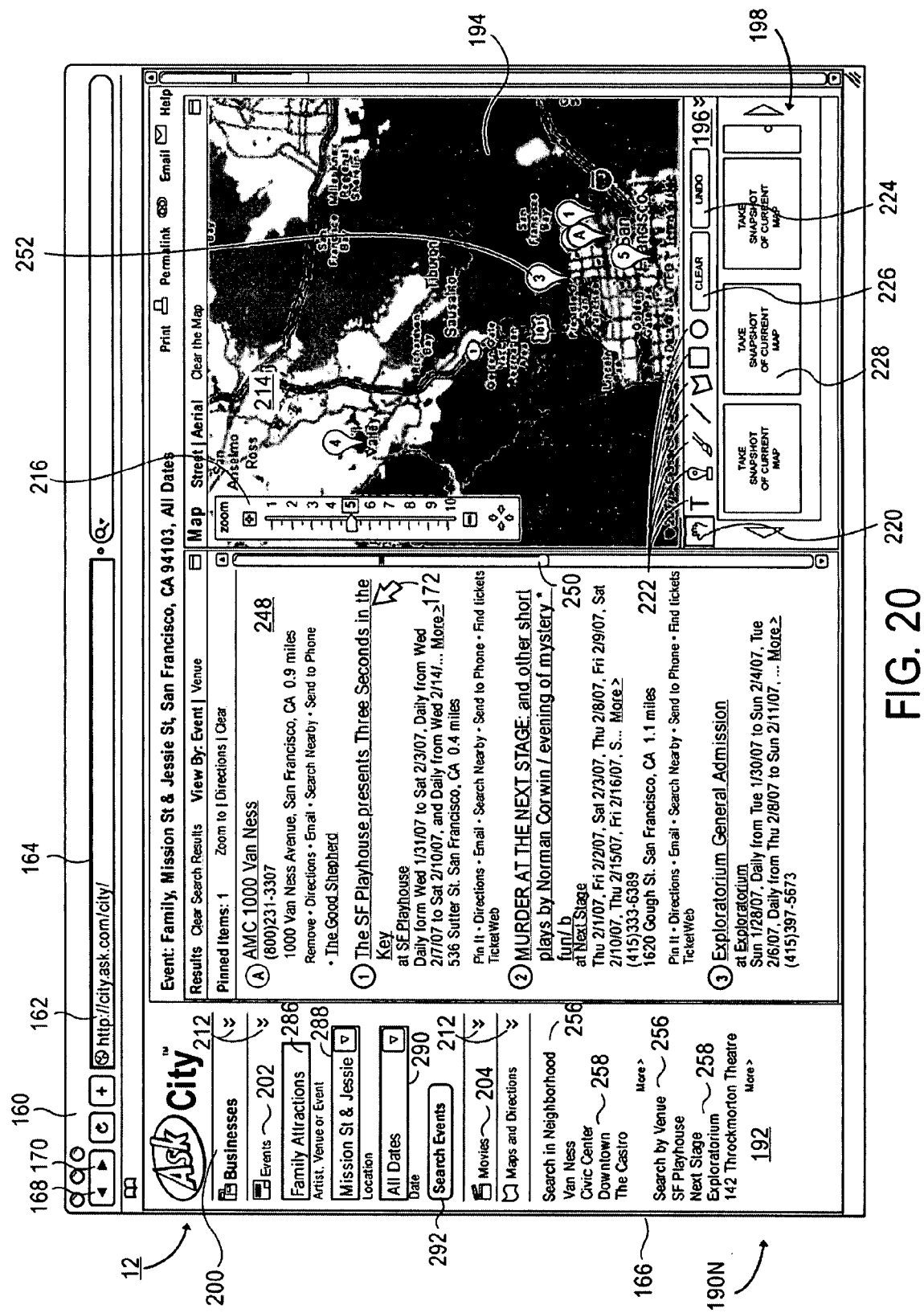
FIGS. 20 to 22 show further views of the user interface wherein further searches are conducted and a further static location marker is created.

FIG. 20 shows a view 190N of the user interface 12 after a further search is carried out by selecting the related search suggestion "family attractions" in the view 190M of FIG. 19. Again, the search result labeled "A" appears in the results area 248 and on the map 214. The user in the present example selects the third search result in the results area 248.

Figure 21:
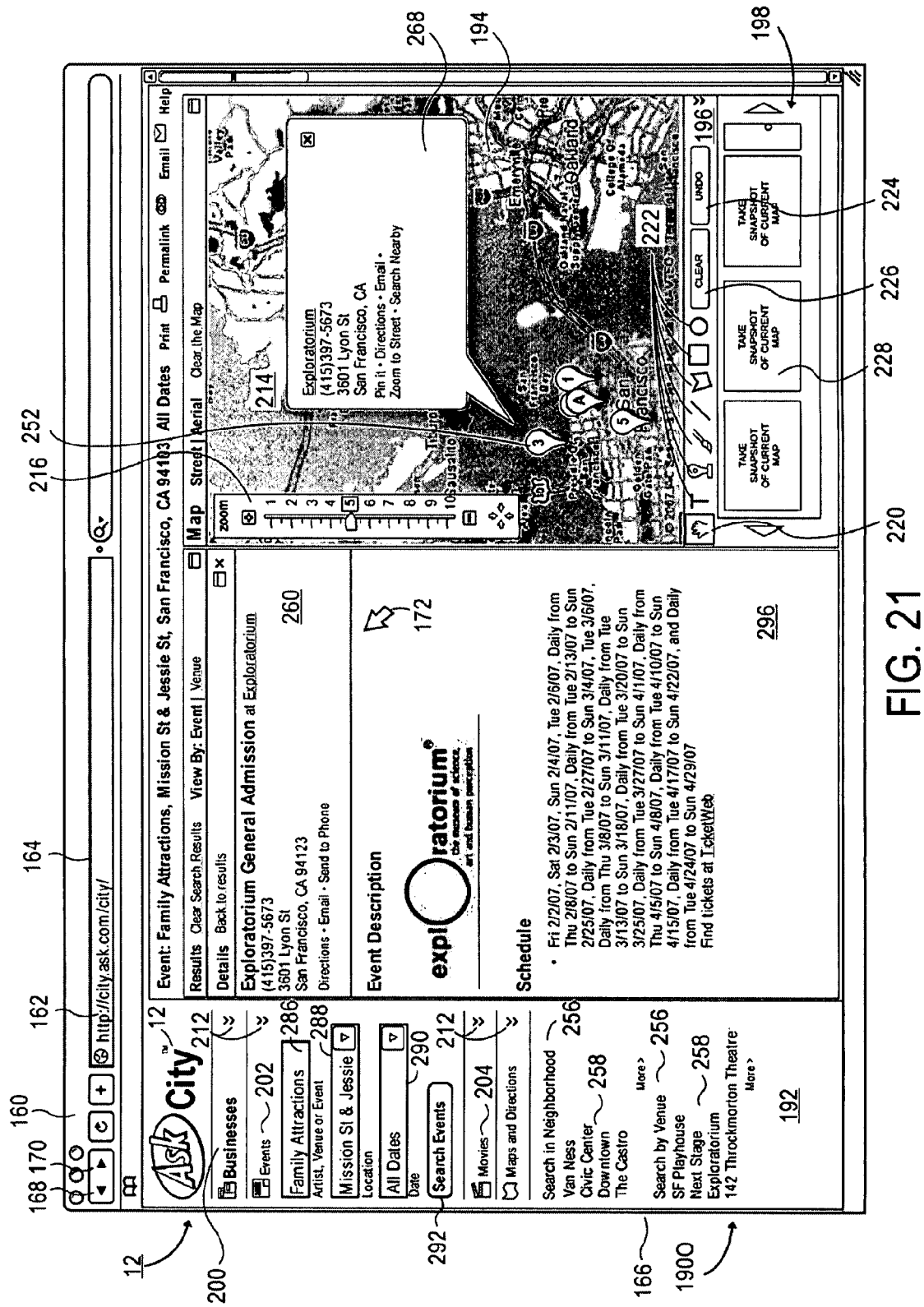

FIG. 21 illustrates a further view 190O of the user interface 12 that is generated and appears after the user selects the third search result in the results area 248 in the view 190N of FIG. 20. The results area 248 in the view 190N of FIG. 20 is replaced with the details area 260 and a profile page 296 of the third search result in the view 190N in FIG. 20 appears in the details area 260. A window 268 is also included on the map with a pointer to the location identifier numbered "3." The user in the present example selects the static location marker identifier "pin it" in the window 268. The label on the location marker 252 changes from "3" to "B." The change from the numeric numbering to the alphabetic numbering of the relevant location marker 252 indicates that the location identifier has become static and will thus not be replaced when a subsequent search is conducted.

Figure 22:
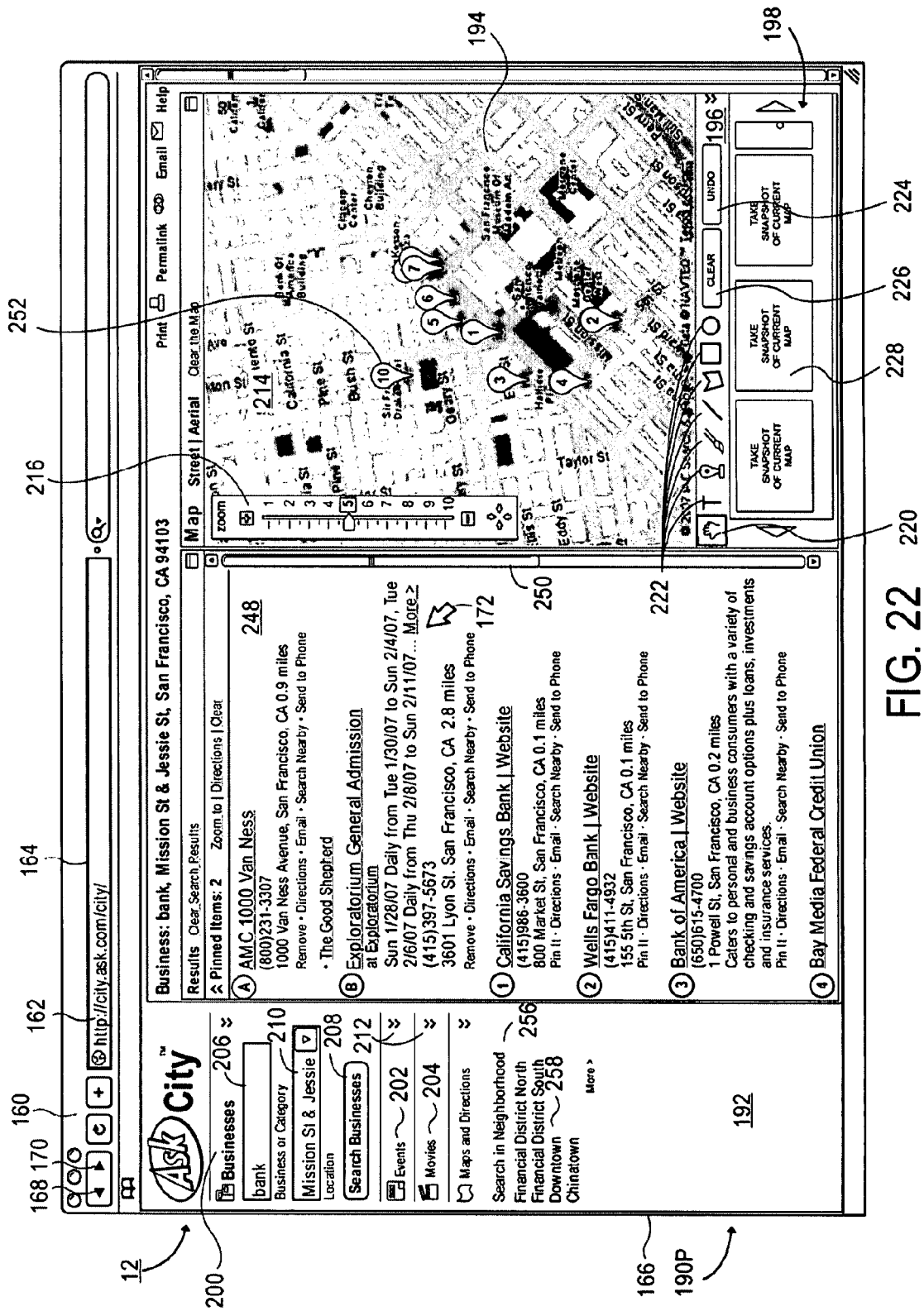

FIG. 22 is a view 190P of the user interface 12 after a subsequent search is conducted under the vertical search determinator 200 for "Businesses." The numerically numbered search results in the view 190M of FIG. 20 are replaced with numerically numbered search results in the view 190P of FIG. 22. The search results labeled "A" and "B" are also included above the numerically numbered search results in the view 190P of FIG. 22. The scale and location of the map 214 in the view 190P of FIG. 22 are such that the locations of the search results labeled "A" and "B" are not shown with any one of the location markers 252, but will be shown if the scale and/or location of the map 214 is changed.

Figure 23:
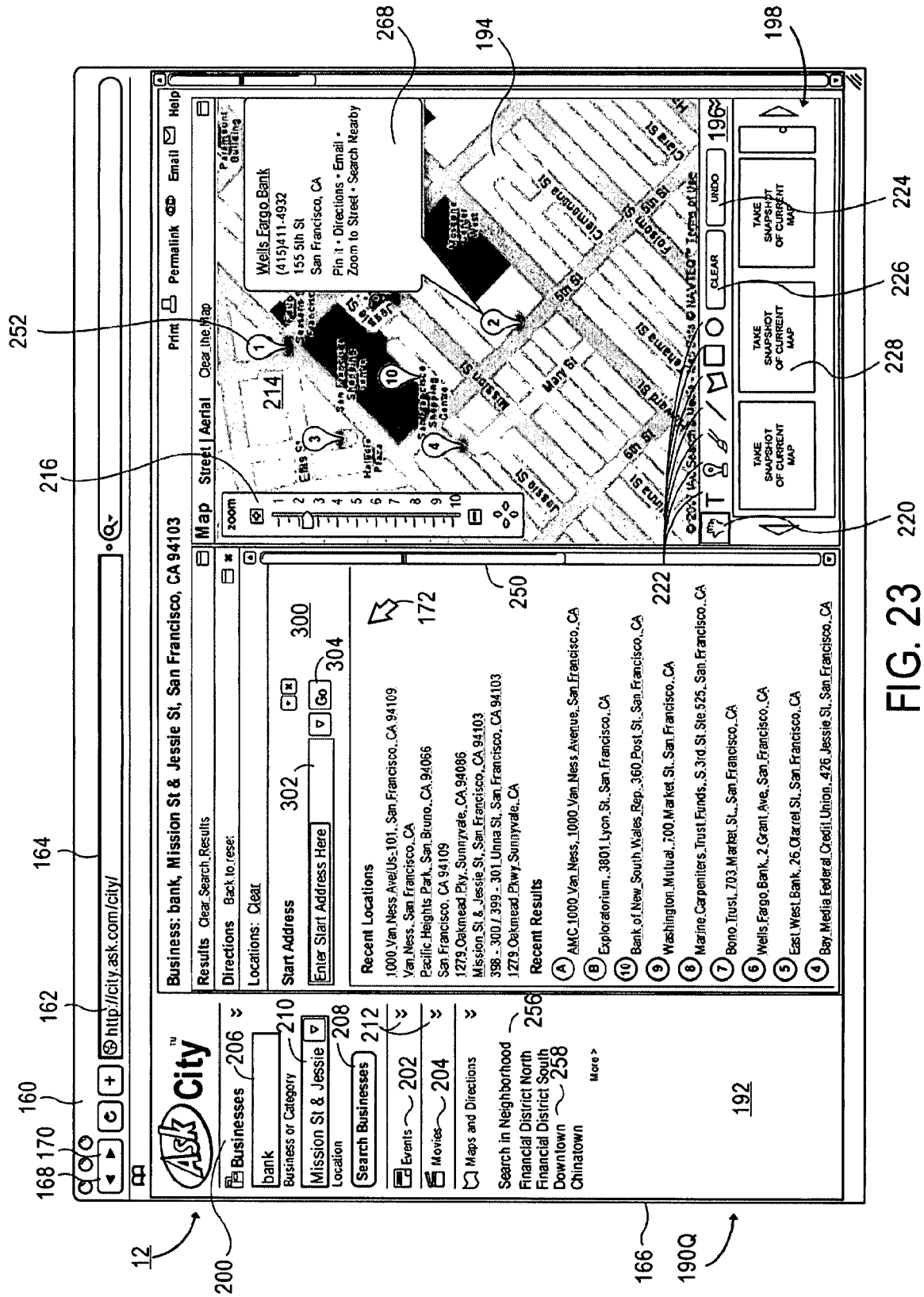
FIGS. 23 to 26 show further views of the user interface, particularly showing how driving directions are obtained without losing search results.

FIG. 23 shows a further view 190Q of the user interface 12. The user has selected either the second search result in the results portion 248 of the view 190P of FIG. 22 or the location marker 252 labeled "3" on the map 214 of the view 190P, which causes opening of a window 268 as shown in the view 190Q of the of FIG. 23. The viewer has then selected "directions" in the window 268, which causes replacement of the results area 248 in the view 190P of FIG. 22 with a driving directions area 300 in the view 190Q of FIG. 23. A start location box 302 is located within the driving directions area 300. The user can enter a start location within the start location box 302 or select a start location from a plurality of recent locations or recent results shown below the start location box 302. The user can then select a go button 304, which causes transmission of the start location entered in the start location box 302 from the client computer system 18 in FIG. 1 to the server computer system 16.

Figure 24:
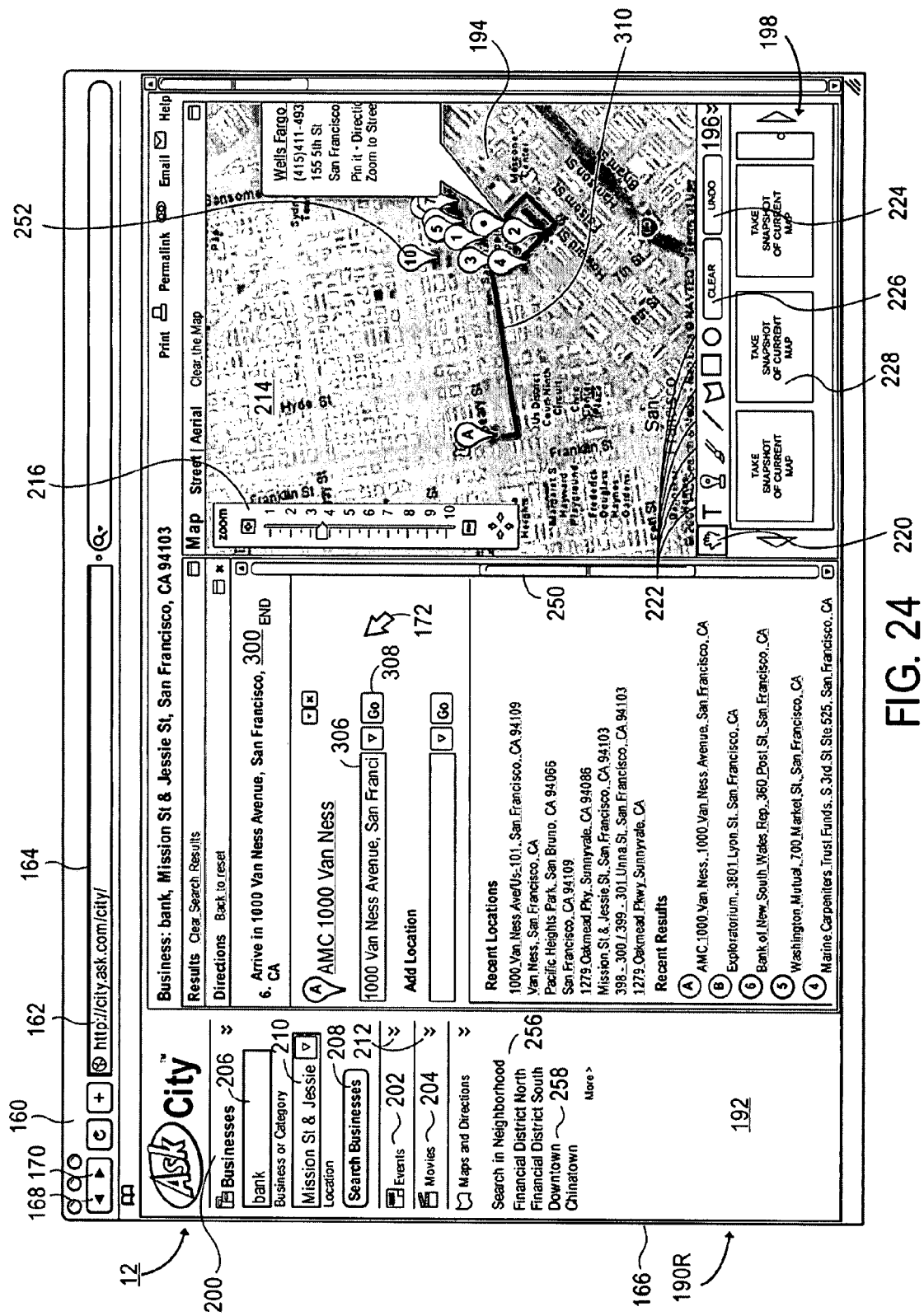

FIG. 24 shows a further view 190R of the user interface 12, part of which is transmitted from the server computer system 16 to the client computer system 18 in response to receiving the start location from the client computer system 18. An end location identifier 306 is included and a user enters an end location in the end location identifier 306. The user then selects a go button 308, which causes transmission of the end location entered in the end location identifier 306 from the client computer system 18 in FIG. 1 to the server computer system 16.

The server computer system then calculates driving directions. The driving directions are then transmitted from the server computer system 16 to the client computer system 18 and are shown in the driving directions area 300 of the view 190R in FIG. 24. The vertical scroll bar 252 is moved down, so that only a final driving direction, indicating the arrival at the end location, is shown in the driving directions area 300.

The server computer system also calculates a path 310 from the start location to the end location and displays the path 310 on the map 214.

Further details of how driving directions and a path on a map are calculated are described in U.S. patent application Ser. No. 11/677,847, which is incorporated herein by reference.

Figure 25:
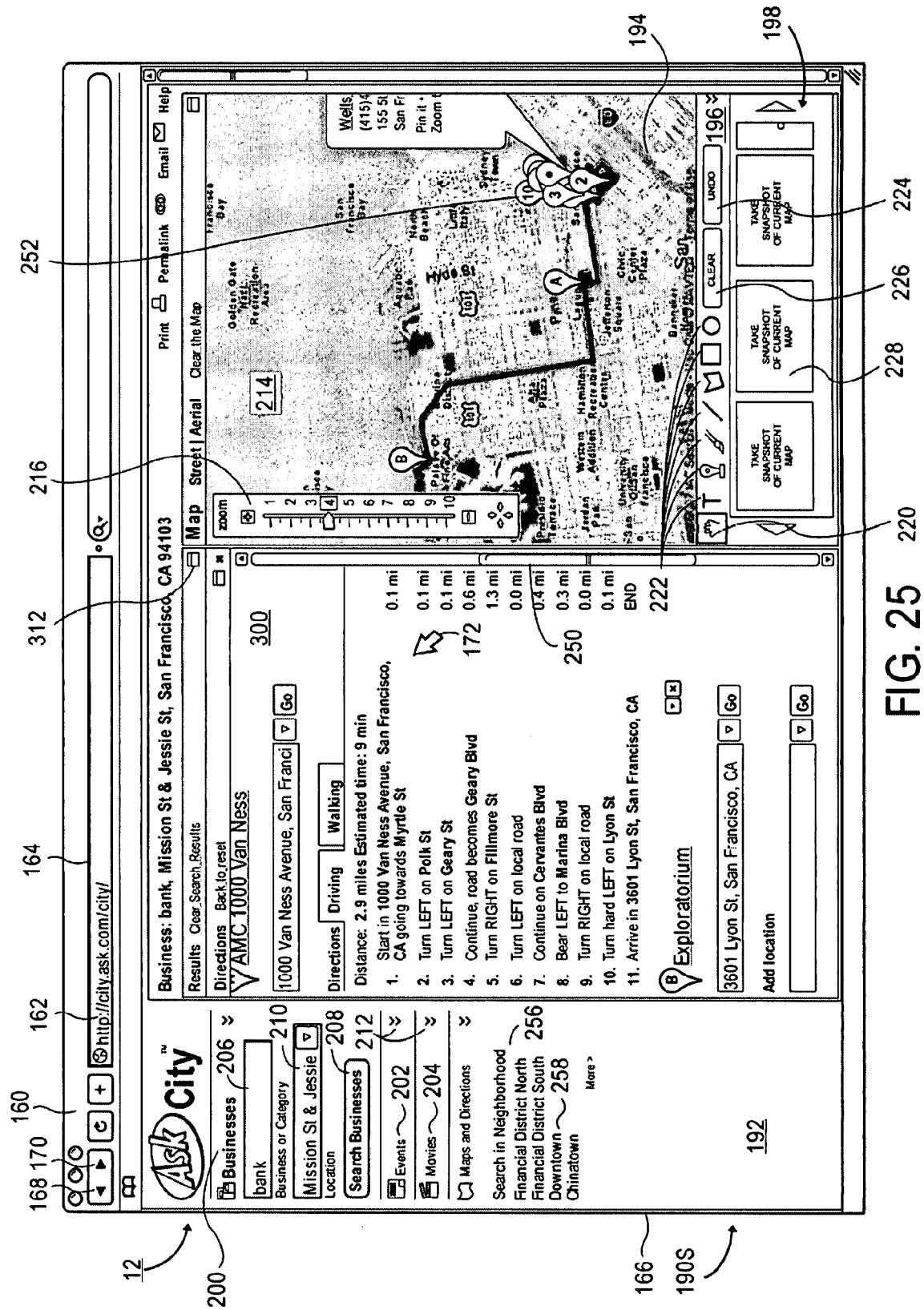

FIG. 25 illustrates a further view 190S of the user interface 12, after the user has added a third location. Driving directions and a path are provided between the second and the third locations. The user has elected to choose the locations labeled "A" and "B" as the second and third locations.

Figure 26:
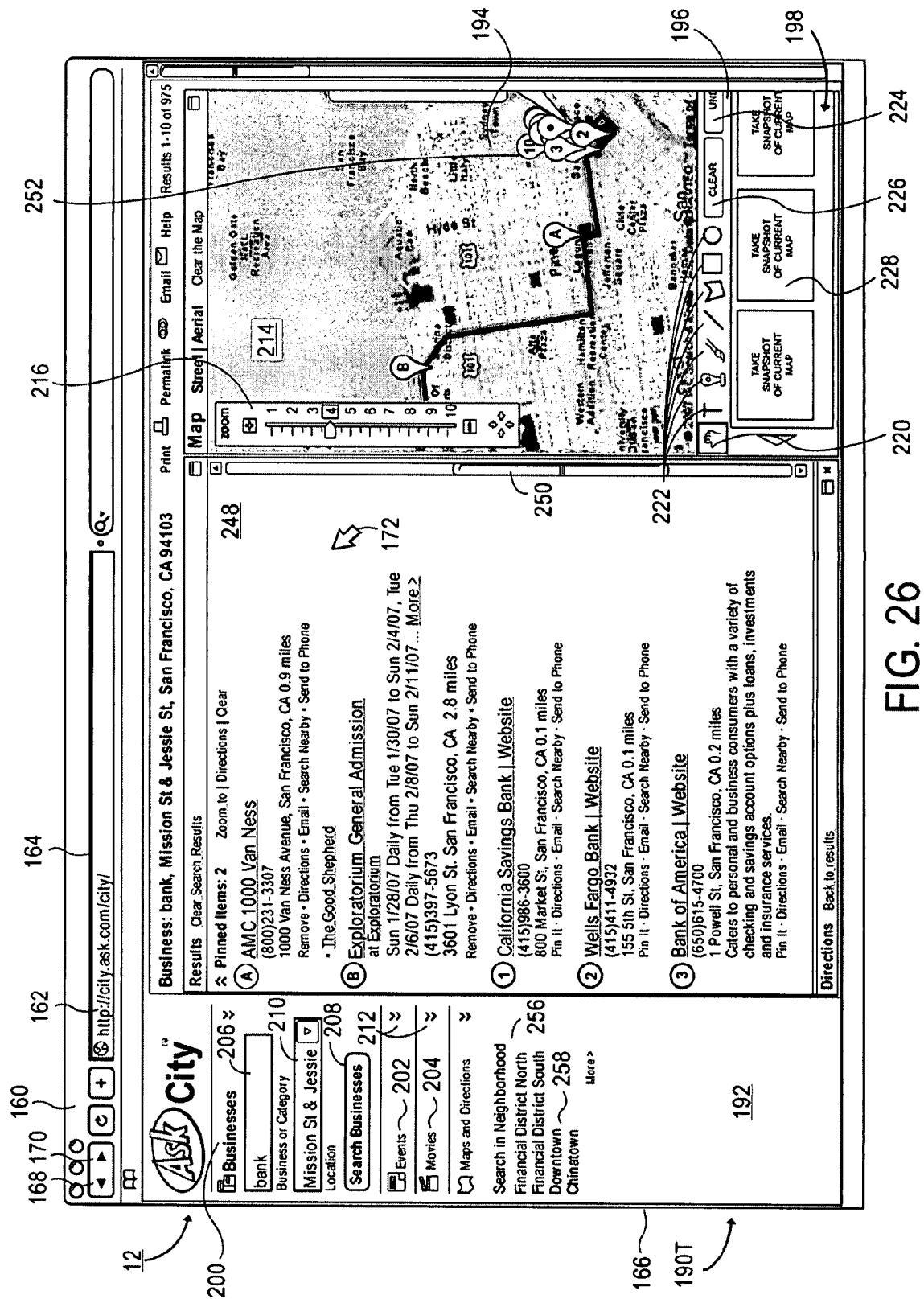

The user can, at any time, select a results maximizer 312, for example in the view 190S of FIG. 25. Upon selection of the results maximizer 312, the driving directions area 300 in the view 190S of FIG. 25 is replaced with the results area 248, as shown in the view 190T in FIG. 26. The results shown in the results area 248 in the view 190T in FIG. 26 are the exact same search results shown in the results area in the view 190P of FIG. 22. The driving directions of the views 190R in FIG. 24 and 190S of FIG. 25 and the entire path 310 have thus been calculated without losing the search results. Moreover, the search results and the path 310 are shown in the same view 190T of FIG. 26.

Figure 27:
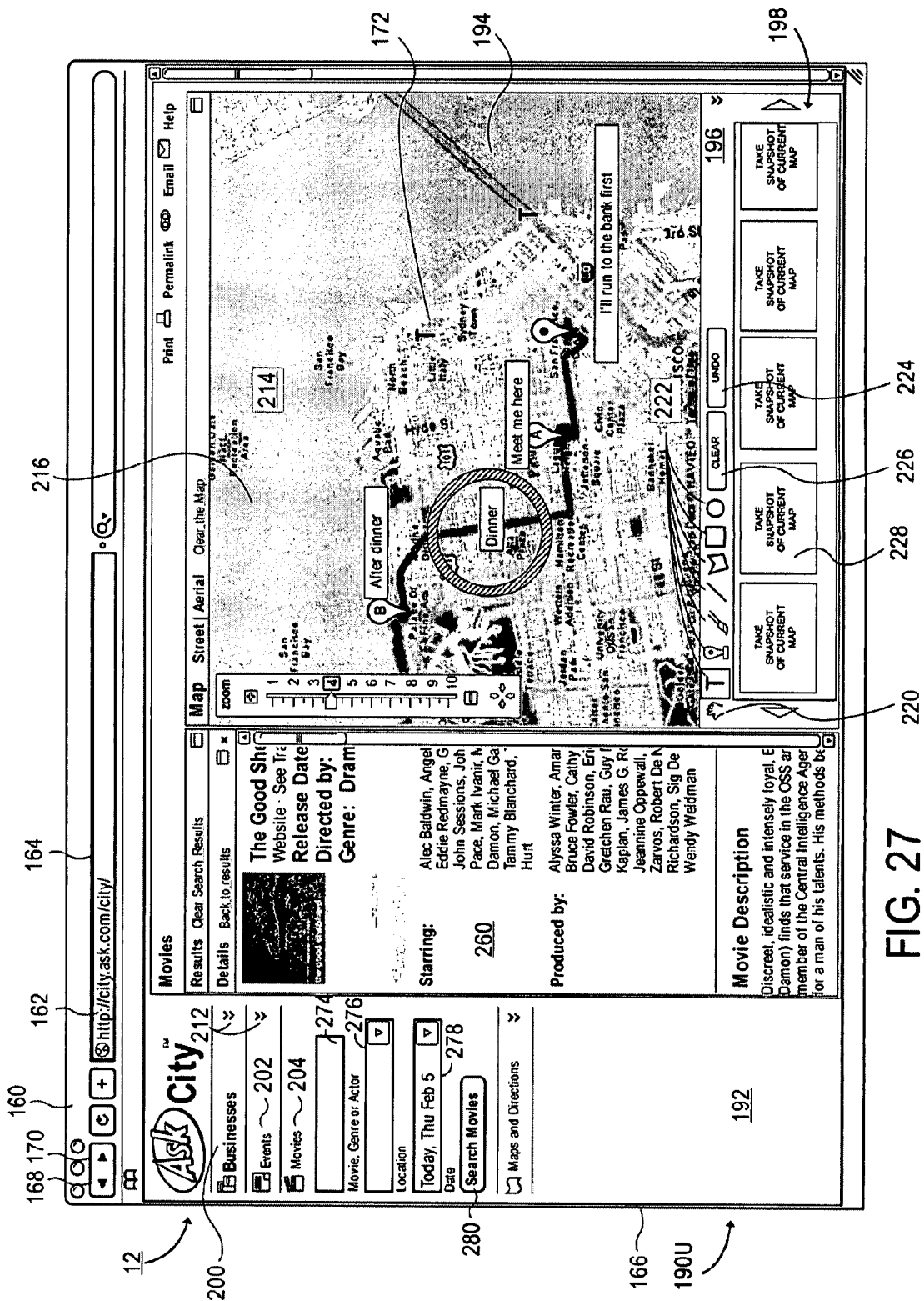
FIG. 27 shows a further view of the user interface and how additions can be made to the map.
Figure 28:
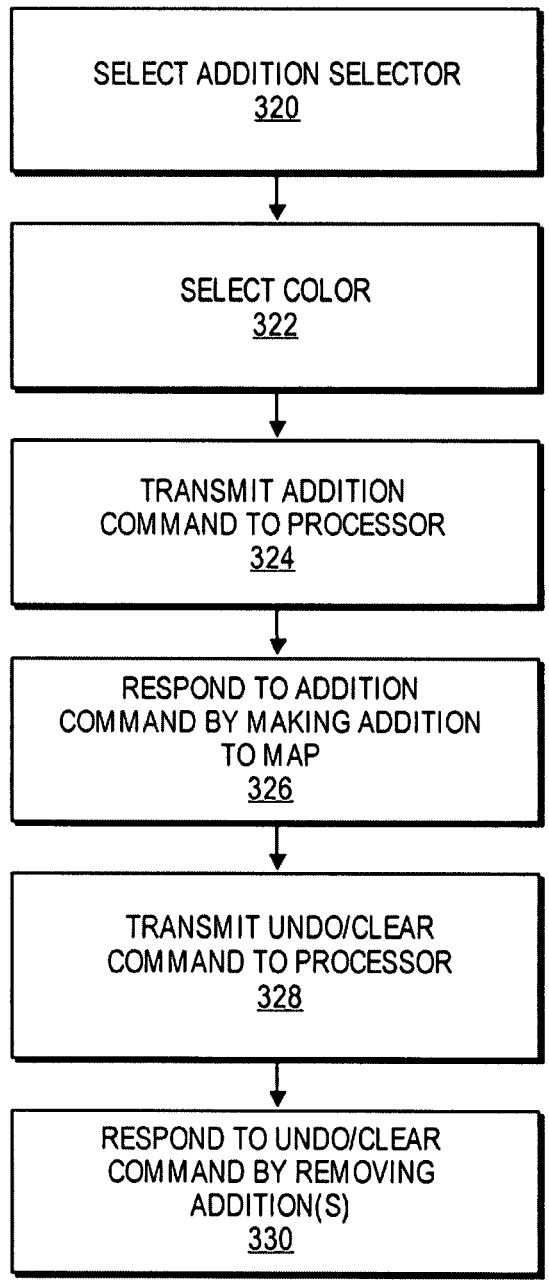
FIG. 28 is a flowchart showing how additions are made to the map.

FIG. 27 is a view 190U of the user interface 12 after various additions are made on the map 214. The user selects one of the map addition selectors 222 (step 320 in FIG. 28). In the view 190U of FIG. 27, the user has selected the map addition selector 222 for text. The cursor 172 automatically changes from a hand shape to a "T" shape.

Figure 29:
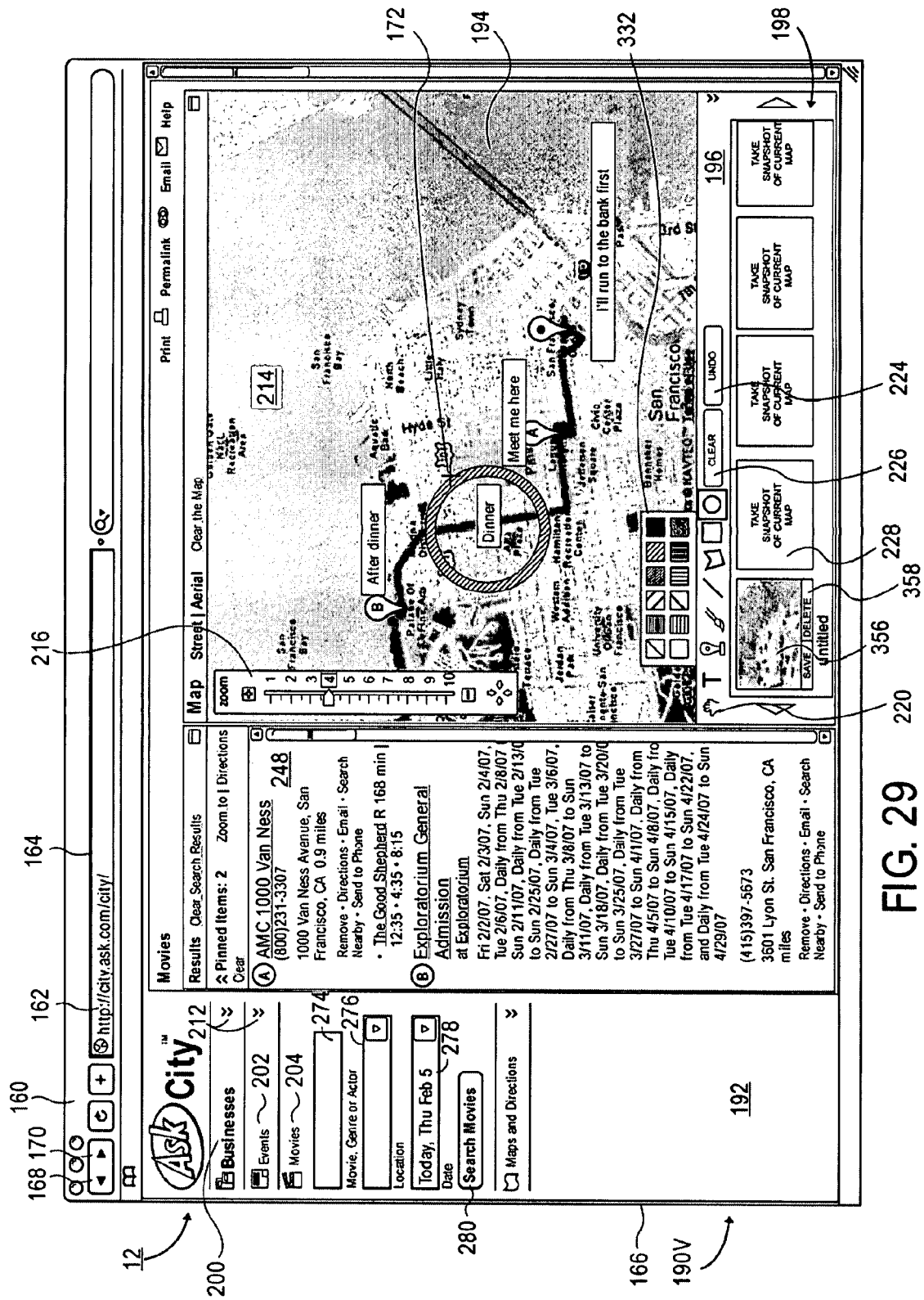
FIG. 29 shows a further view of the user interface and how color can be selected for making additions to the map, and further shows how data can be saved for further reproduction.

FIG. 29 shows a view 190V of the user interface 12 wherein the user has selected the addition selector 222 for a circle. A color template 332 automatically opens. A plurality of colors is indicated within the color template 332. The various colors are differentiated from one another in the view 190V of FIG. 29 by different shading, although it should be understood that each type of shading represents a different color. The user selects a color from the color template 332 (step 322).

The user then selects a location for making the addition on the map 214. Various types of additions can be made to the map depending on the addition selector 222 that is selected. Upon indicating where the additions should be made on the map 214, a command is transmitted to the processor 130 in FIG. 3 (step 324). The processor 130 then responds to the addition command by making an addition to the map 214 (step 326). The addition is made to the map at a location or area indicated by the user and in the color selected by the user from the color template 332.

The user can at any time remove all the additions to the map 214 by selecting the clear selector 224. The user can also remove the last addition made to the map by selecting the undo selector 226. An undo or clear command is transmitted to the processor 130 (step 328). The processor 130 receives the undo or clear command and responds to the undo or clear command by removing the addition or additions from the map 214 (step 330).

Upon selection of the clear selector 224, the undo selector 226, or the map manipulation selector 220, the cursor 172 reverts to an open hand and can be used to drag and drop the map 214.

Figure 30:
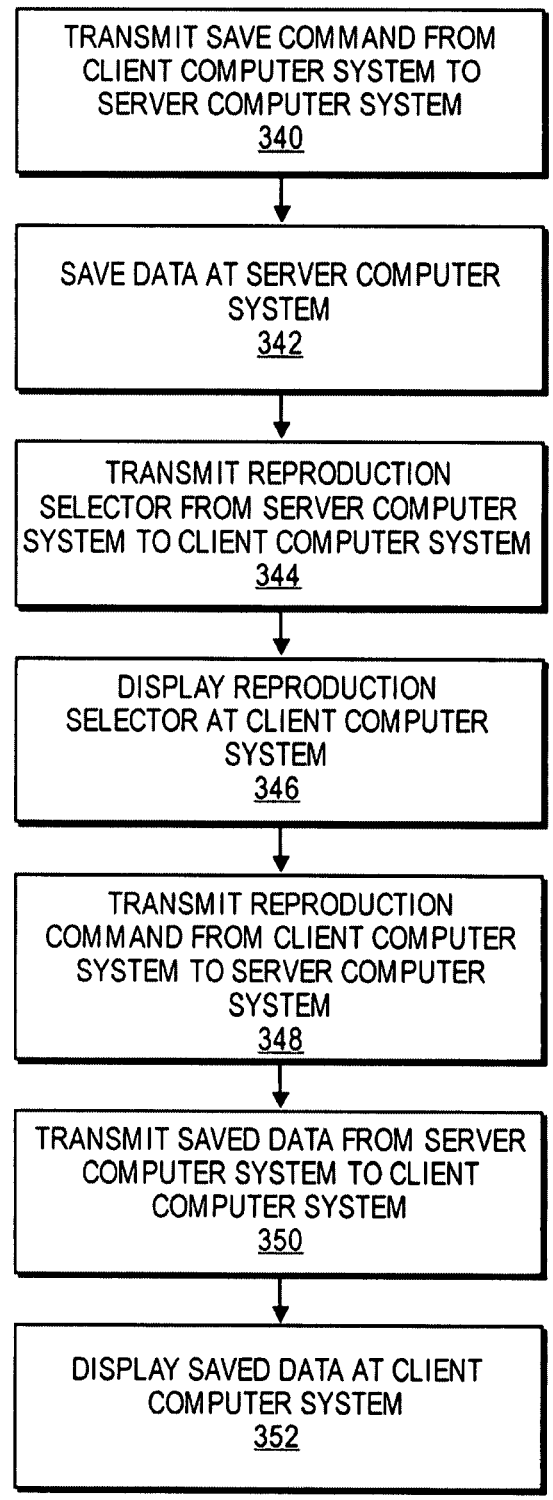
FIG. 30 is a flowchart illustrating how data is saved and later used to reproduce a view.

The user may, at any time, decide to save the contents of a view, and in doing so will select one of the save selectors 228. A save command is transmitted from the client computer system 18 to the server computer system 16 (step 340 in FIG. 30). All data for the view that the user is on is then saved at the server computer system 16 in, for example, one of the structured databases and data sources 26 (step 342). The data that is stored at the server computer system 16, for example, includes all the search results in the results area 248 and on the map 214, any static location markers on the map 214, the location of the map 214 and its scale, and any additions that have been made to the map 214. The server computer system 16 then generates and transmits a reproduction selector 356 to the client computer system (step 344). As shown in the view 190V of FIG. 29, the reproduction selector 356 is then displayed at the client computer system 18 (step 346). A reproduction selector delete button 358 is located next to and thereby associated with the reproduction selector 356. The user may at any time select the reproduction selector delete button 358 to remove the reproduction selector 356. The reproduction selector 356 replaces the save selector 222 selected by the user and selection of the reproduction selector delete button 358 replaces the reproduction selector 356 with a save selector 228.

The user may now optionally close the browser 160. When the browser 160 is again opened, the user can conduct another search, for example a search for a restaurant near Union Street, San Francisco, Calif. The search results in the results area 248 will only include results for the search conducted by the user and the locations of the search results will be displayed on the map 214 without the static location markers or additions shown in the view 190V of FIG. 29.

Any further views of the user interface 12 includes the reproduction selector 356 and any further reproduction selectors (not shown) that have been created by the user at different times and have not been deleted. The user can select the reproduction selector 356 in order to retrieve the information in the view 190V of FIG. 29. A reproduction command is transmitted from the client computer system 18 in FIG. 1 to the server computer system 16 (step 348). The server computer system 16 then extracts the saved data and transmits the saved data from the server computer system 16 to the client computer system 18 (step 350). The saved data is then displayed at the client computer system 18 (step 352).

Figure 31:
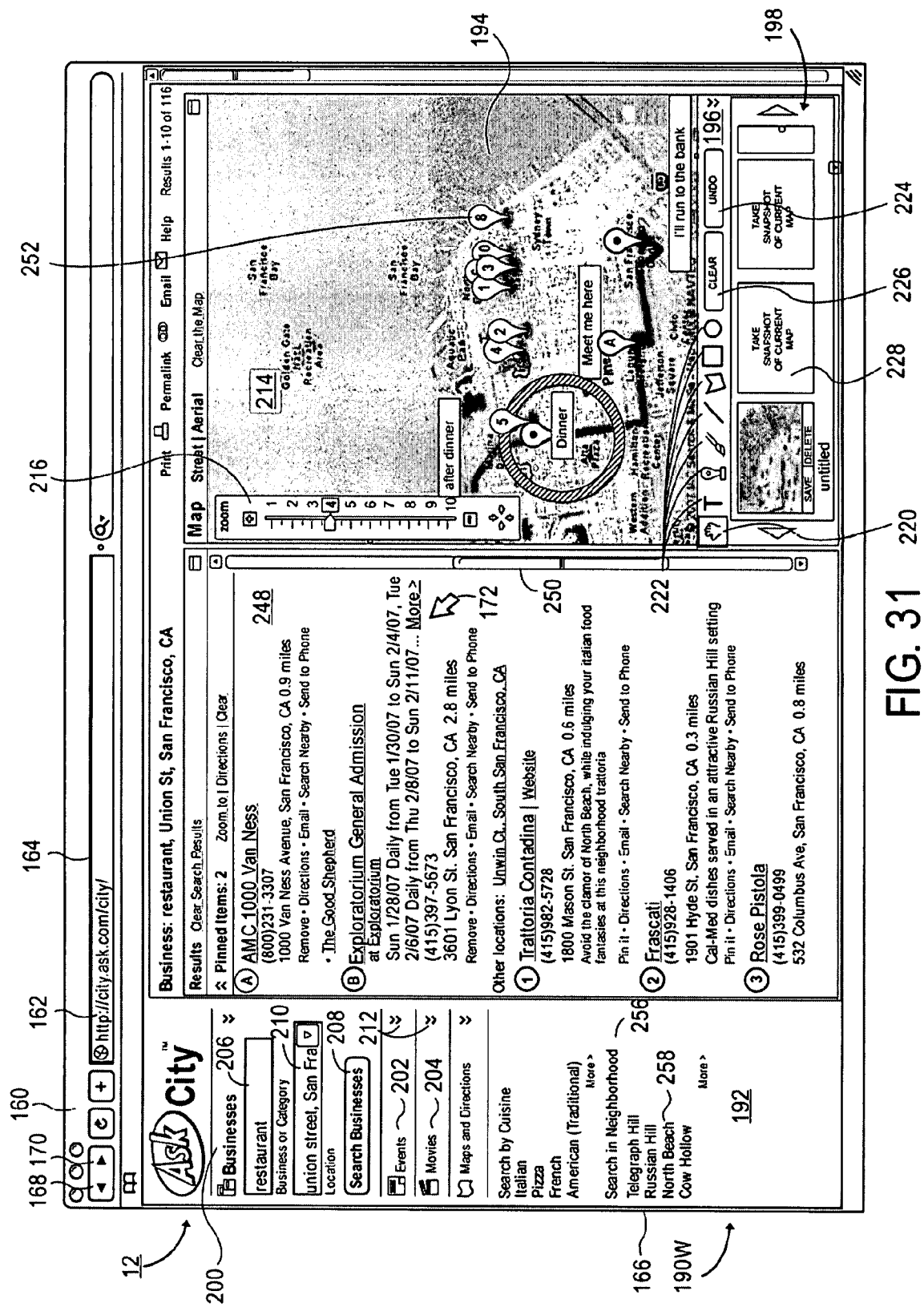
FIG. 31 shows a further view of the user interface after the browser is closed, a subsequent search is carried out and the data that is saved in the process of FIG. 30 is used to create the view of FIG. 31.

FIG. 31 illustrates a view 190W of the user interface 12 that is generated upon selecting the reproduction selector 356. The view 190W of FIG. 31 includes all the same information that is present in the view 190V of FIG. 29.

It should be evident to one skilled of the art that the sequence that has been described with reference to the foregoing drawings may be modified. Frequent use is made in the description and the claims to a "first" view and a "second" view. It should be understood that the first and second views may be constructed from the exact same software code and may therefore be the exact same view at first and second moments in time. "Transmission" of a view should not be limited to transmission of all the features of a view. In some examples, an entire view may be transmitted and be replaced. In other examples, Asynchronous javaScript™ (AJAX™) may be used to update a view without any client-server interaction, or may be used to only partially update a view with client-server interaction.

Figure 32:
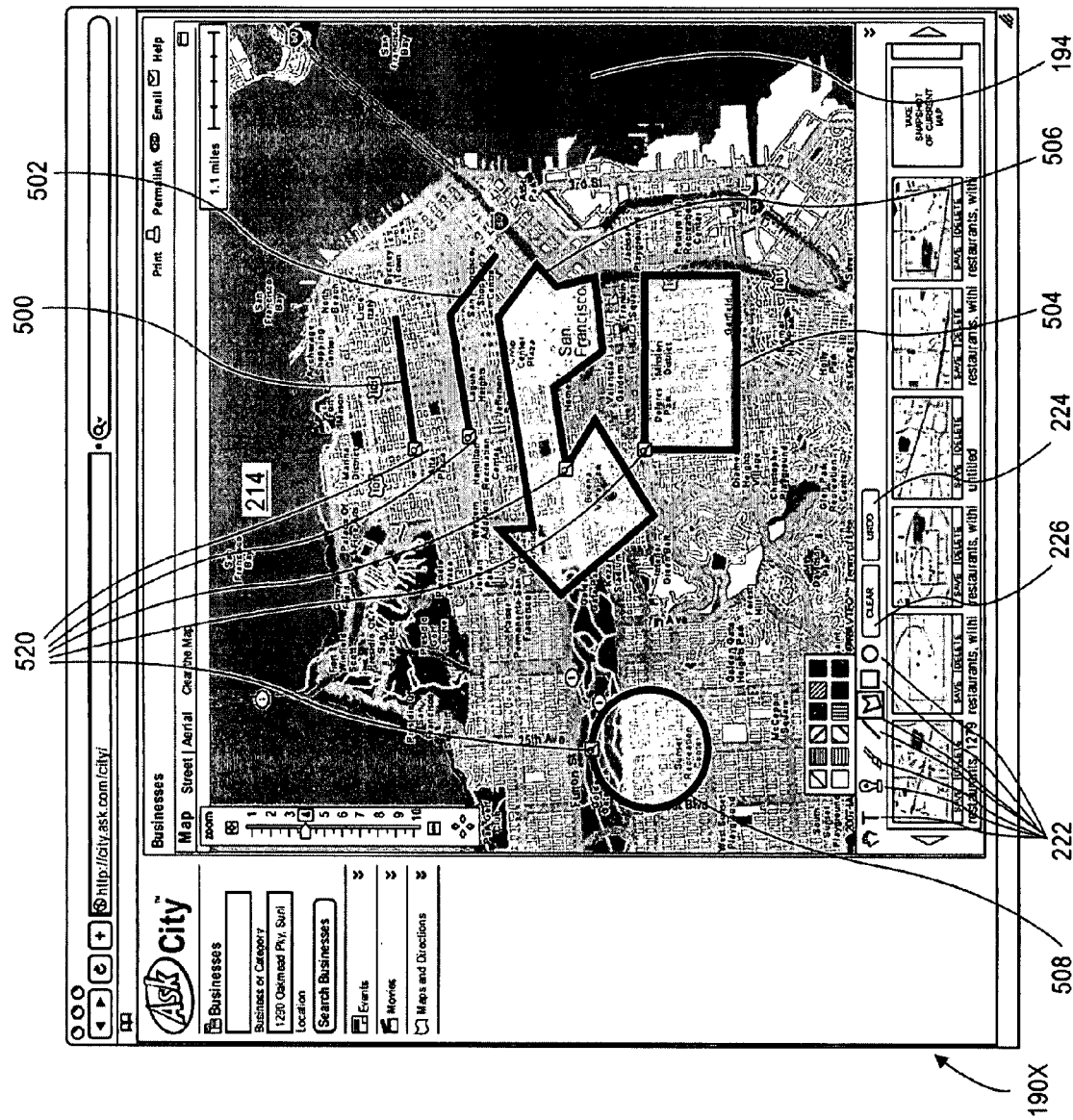
FIG. 32 shows a further view of the user interface showing figure entities drawn onto the map.

FIG. 32 shows a further view 190X of the user interface. Using the map addition selectors 222, the clear selector 224, and the undo selector 226, the user has drawn various figure elements on the map 214 displayed in the map area 194. The figure element in this example includes a single straight line 500, a two-segment line 502, a rectangle 504, a polygon 506, and a circle 508. A search identifier selector 520 is related to each of the figure elements drawn on the map 214 as depicted by the magnifying glass icon situated on the figure entity.

Figure 33:
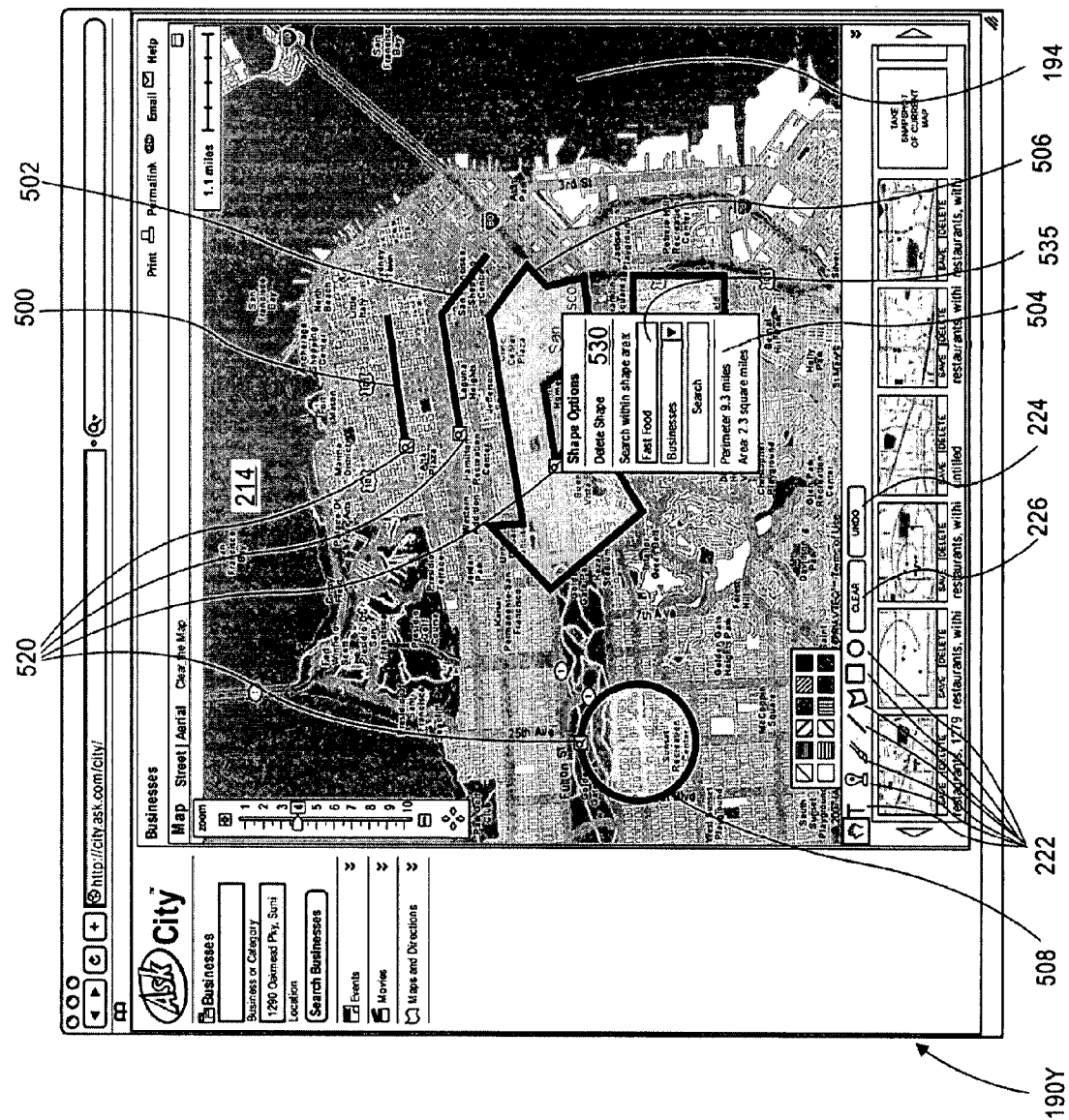
FIG. 33 shows a further view of the user interface showing a search identifier related to one of the figure entities.

FIG. 33 shows a further view 190Y of the user interface. The user has selected the search identifier selector 520 related to the polygon 506. This causes a search identifier 530 to appear in close proximity to the search identifier selector 520. The search identifier 530 includes a search box 535. The search identifier 530 is similar in appearance and function as the search area 192 of FIG. 7. In the example illustrated in FIG. 33, the user has entered "Fast Food" in the search box 535. Upon hitting the enter key on the client computer system or selecting the search button located in the search identifier 530, the text "Fast Food" entered into the search box 535 and an associated search request are transmitted from the client computer system to the server computer system to extract at least one search result from a data source. In this example, the search result will be restricted to a geographical location defined by the polygon 506. Thus, the expected search results would consist of fast food businesses with geographical coordinates located within the polygon 506.

Figure 34:
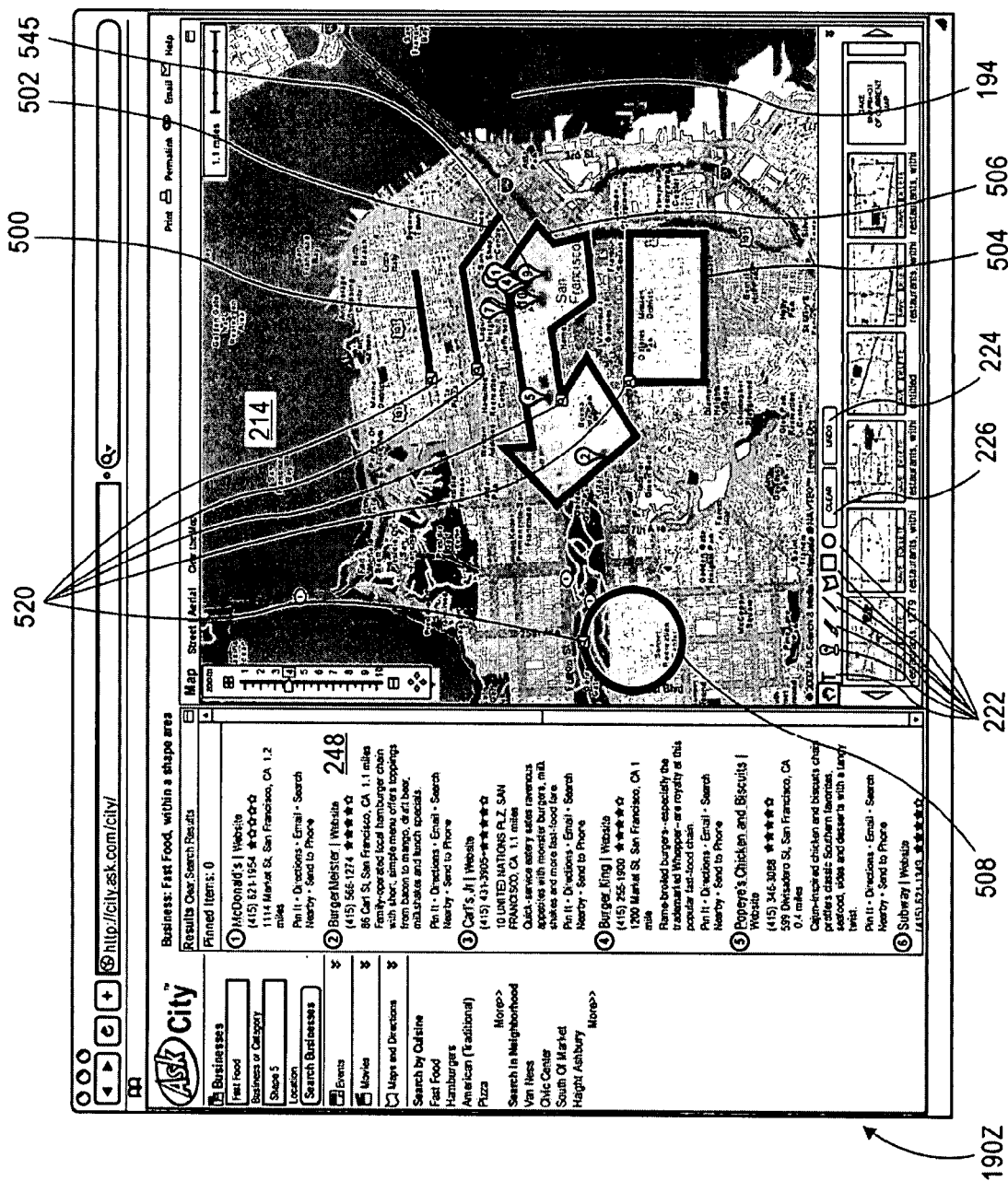
FIG. 34 shows a further view of the user interface after search results are obtained and displayed in a results area and on a map of the user interface, wherein the search results are restricted to a geographical location defined by the figure entity that is a polygon.

FIG. 34 shows a further view 190Z of the user interface. The user interaction of FIG. 33 has resulted in a second view transmitted from the server computer to the client computer showing search results displayed in a results area 248, and location markers 545 related to the search results displayed in the map area 194. In this example, since the user has utilized the search identifier 530 related to the polygon 506 instead of using the search box in the search area 192 of FIG. 7, the search results and location markers 545 related to the search results are restricted to the geographical location defined by the polygon 506.

Figure 35:
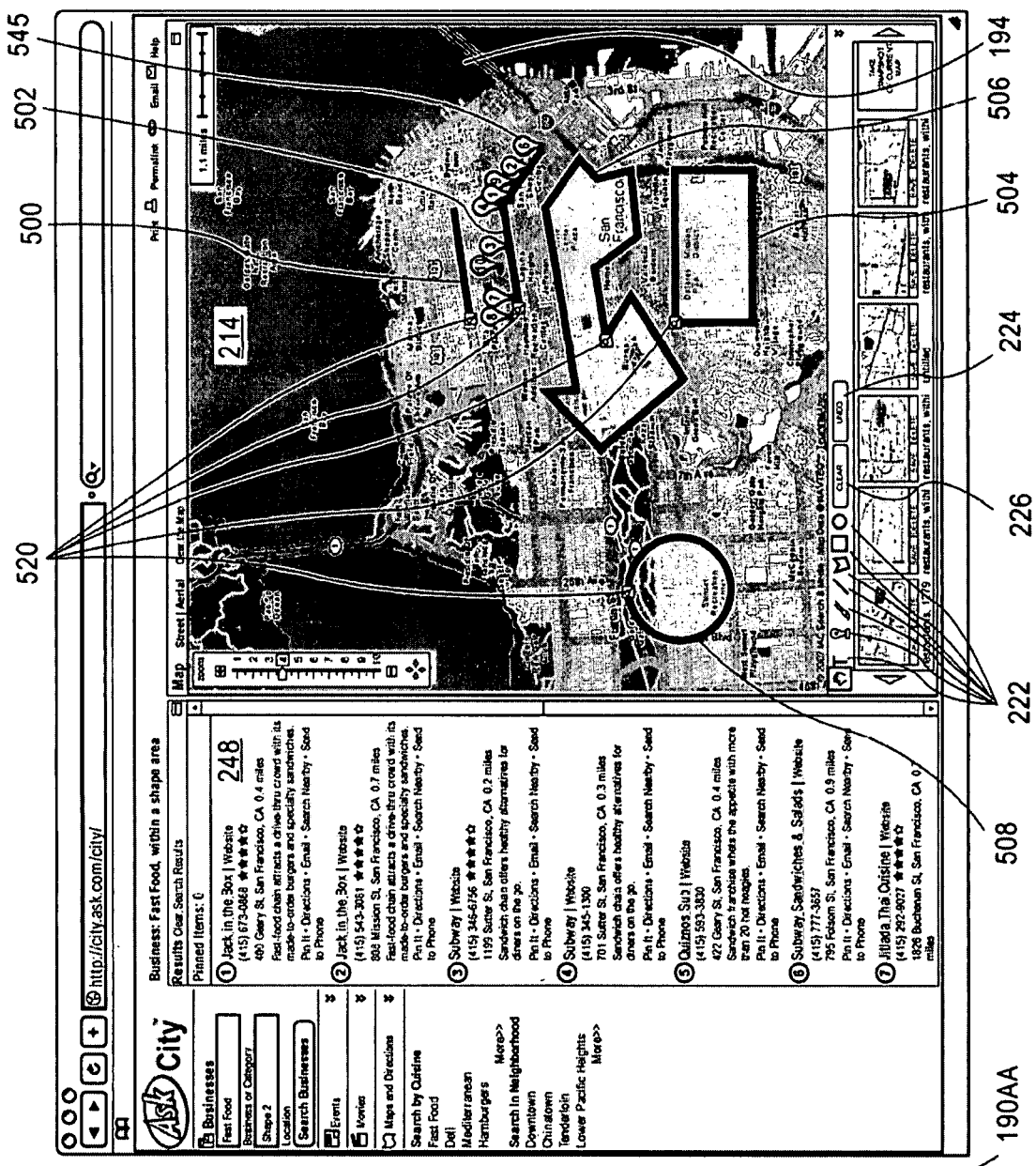
FIG. 35 shows a further view of the user interface after search results are obtained and displayed in a results area and on a map of the user interface, wherein the search results are restricted to a geographical location defined by the figure entity, the figure entity being a plurality of lines.

FIG. 35 shows a further view 190AA of the user interface. In this example, the user has interacted in the same manner as in FIGS. 33 and 34, except that the user has interacted with the search identifier 530 related to the two-segment line 502 instead of the polygon 506. The resulting search results are displayed in a results area 248, and location markers 545 related to the search results are displayed in the map area 194. Here, the search results and the location markers 545 related to the search results are restricted to the geographical location defined by the two-segment line 502.

Figure 36:
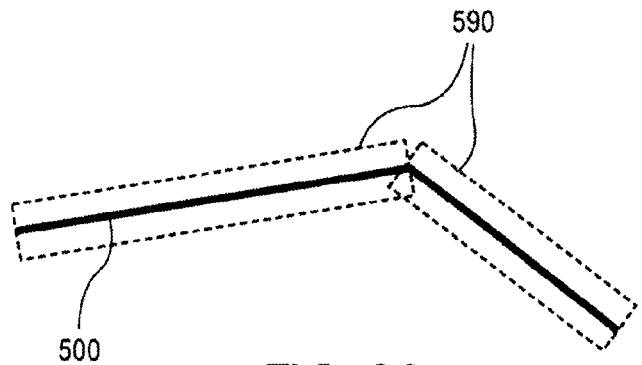
FIG. 36 shows one figure element comprised of two line segments, wherein the line segments are approximated by two rectangles and each rectangle represents a plurality of latitude and longitude coordinates.
Figure 37:
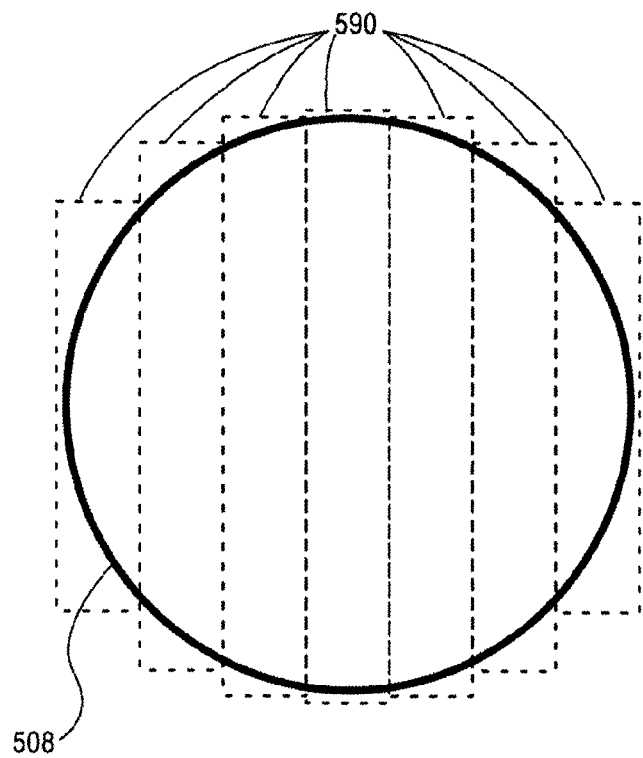
FIG. 37 shows one figure element comprised of a circle, wherein the circle is approximated by a plurality of rectangles and each rectangle represents a plurality of latitude and longitude coordinates.
Figure 38:
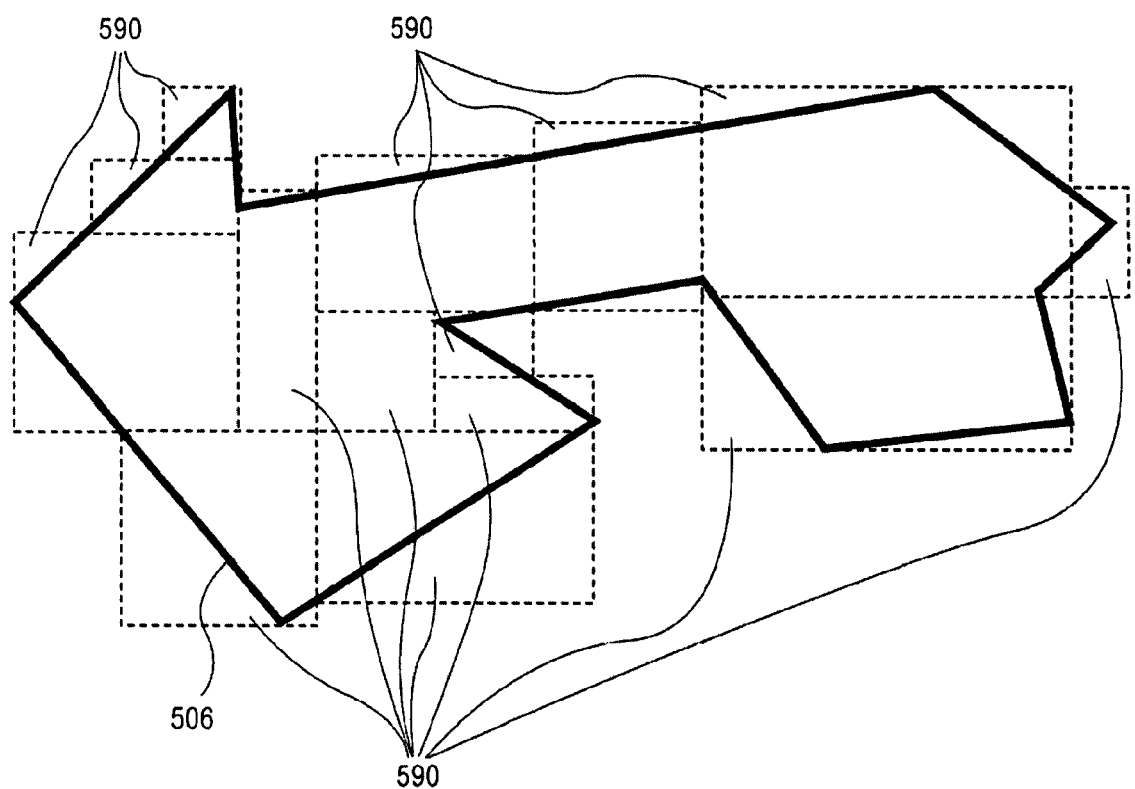
FIG. 38 shows one figure element comprised of a polygon, wherein the polygon is approximated by a plurality of rect-angles, wherein each rectangle represents a plurality of latitude and longitude coordinates.

FIGS. 36 to 38 show embodiments of the approximating technique performed by the server computer to approximate the latitude and longitude coordinates related to the figure entities drawn on the map. The approximating technique is performed solely on the server computer, and no approximating is performed on the client computer system. FIG. 36 shows the two-segment line 502 without the underlying map 214 for the purpose of illustrating the approximating technique. When such a figure element is drawn on the map, in this instance a two-segment line, the client computer transmits the drawn figure element to the server computer, where the server computer approximates the geographical location depicted by the drawn figure element. In one embodiment, each segment of the two-segment line 502 is approximated by rectangles 590 that match the length of the segment, but is wider than the width of the segment. These rectangles 590 may be but are not required to be orthogonal to a North, South, East, or West direction, and each rectangle 590 may be of a different size. The rectangles 590 define a range of latitude and longitude coordinates. This range of latitude and longitude coordinates allows the server computer system to extract at least one search result from a search data source, wherein the search result possesses latitude and longitude coordinates that are within the range of latitude and longitude coordinates defined by the rectangles 590. The extra width provided by the approximating rectangles 590 in this embodiment yields better search results by providing a larger range of latitude and longitude coordinates, since a line by strict geometric definition has no width. In another embodiment, the shapes or entities used to approximate the drawn figure elements may be other geometric figures instead of a rectangle, such as a circle, an oval, or a polygon.

Similarly, FIG. 37 shows the circle 508 without the underlying map 214. In one embodiment, rectangles 590 are used by the server computer to approximate the geometry of the circle 508. In the same manner as the embodiment described in FIG. 36, these rectangles 590 define a range of latitude and longitude coordinates. Moreover, other embodiments need not use solely rectangles to approximate the figure element, but can be other geometric figures.

Similarly, FIG. 38 shows the polygon 506 without the underlying map 214. In this embodiment, rectangles 590 of varying sizes are used by the server computer to approximate the geometry of the polygon 506. In the same manner as the embodiment described in FIG. 36, these rectangles 590 define a range of latitude and longitude coordinates. Other embodiments need not use solely rectangles to approximate the figure element, but can be other geometric figures. In addition, the number of rectangles or other geometric figures may vary to increase or decrease approximation accuracy.

In a different embodiment, the figure entities drawn on the map, the polygon 506, for example, may be used by the server computer system to define latitude and longitude coordinates using only the outline of the figure entity, without the enclosed area. In this embodiment, the figure entities such as the polygon 506 may be treated as a series of line segments. In the same manner as in FIG. 36, the line segments comprising polygon 506 may be approximated by rectangles 590 that closely approximate each line segment. In this manner, the outline of the figure entity may be approximated, while latitude and longitude coordinates contained within the figure entity may be excluded.

Search System

Figure 39:
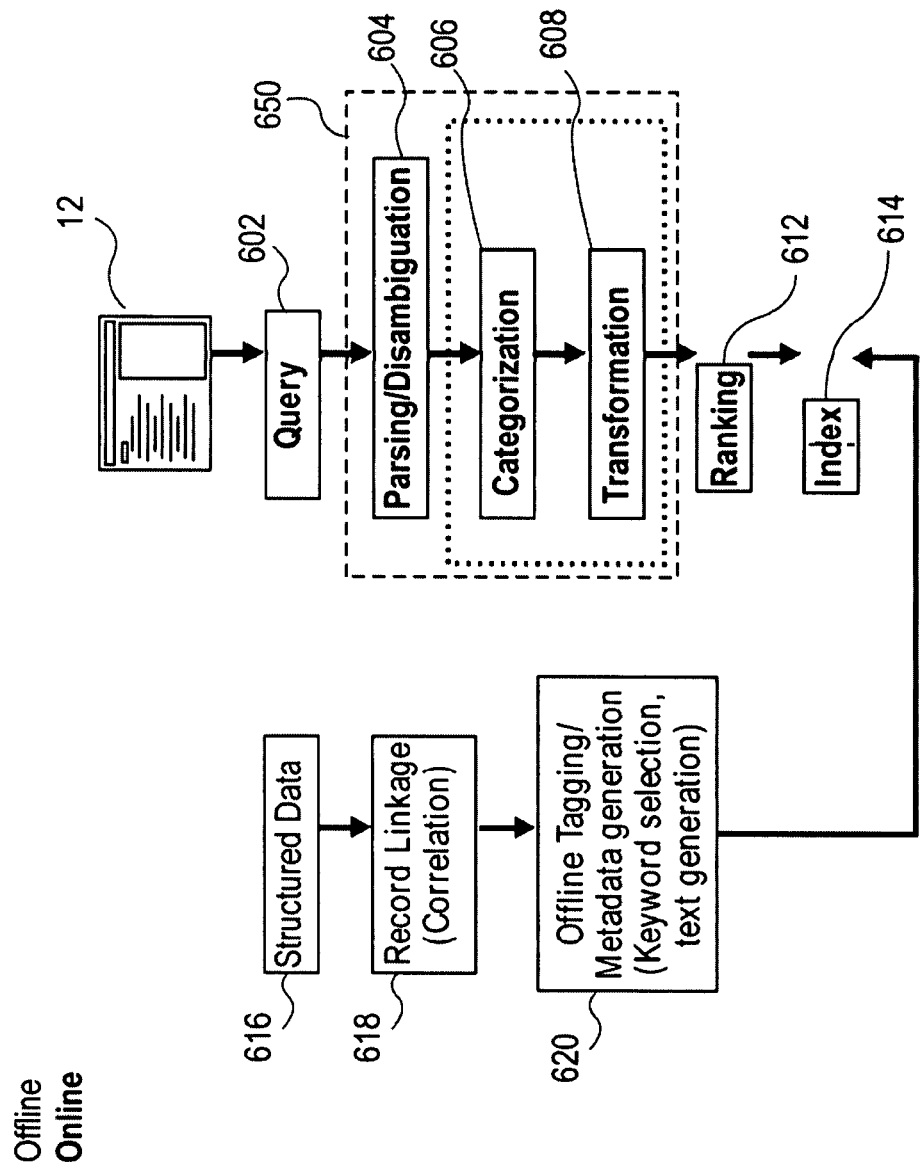
FIG. 39 shows a global view of the search system.

FIG. 39 shows a global view of the search system. The search system is composed of the search user interface 12 where a user can input a search query 602. The query 602 is processed by an online query processing system (QPS) 650. The QPS 650 is comprised of a parsing and disambiguation sub-system 604, a categorization sub-system 606, and a transformation sub-system 608. The query 602 that is processed by the QPS 650 is compared with an index 614 from an offline backend search system. The backend search system includes a structured data sub-system 616, a record linkage sub-system 618 for correlation of data, and an offline tagging sub-system 620 for keyword selection and text generation. The search system also includes a ranking sub-system 612 that ranks the search results obtained by the index 614 from the backend search system to provide the user with the most relevant search results for a given user query.

Query Processing System

The query processing system (QPS) 650 performs three main functions: a) parsing/disambiguation, b) categorization; and c) transformation.

Categorization

Figure 40:
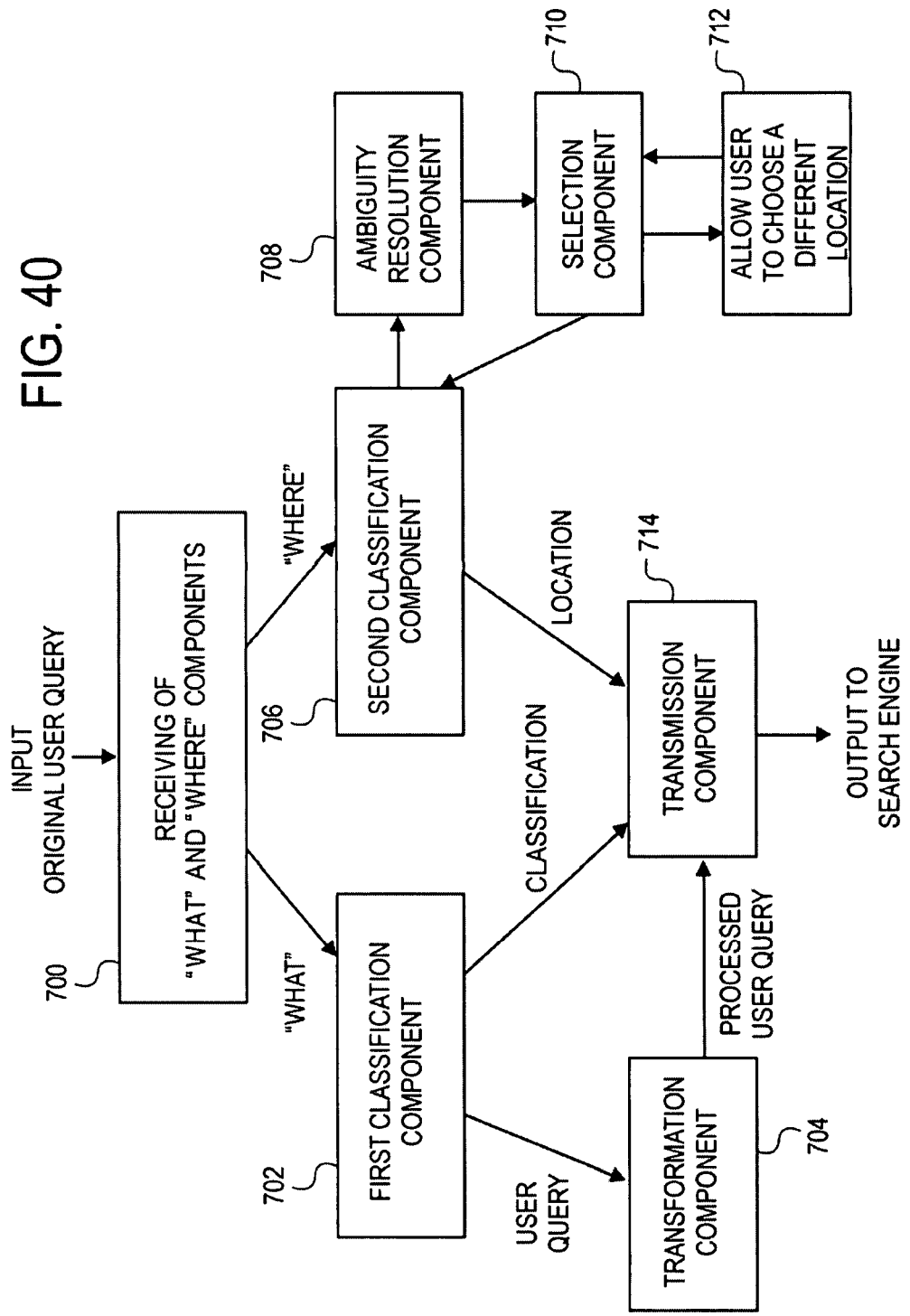
FIG. 40 is a diagram of the categorization sub-system of the search system.

FIG. 40 is a diagram of the categorization sub-system 606 in FIG. 39. An identification component 700 receives an original user query input and identifies a what-component and a where-component using the original user query. The what-component is passed onto a first classification component 702 that analyses and classifies the what-component into a classification. The classification can be a business name, business chain name, business category, event name, or event category. The what-component of the user query may be sent to a transformation component 704 to transform the original user query into a processed query that will provide better search results than the original user query. The transformation component 704 may or may not transform the original user query, and will send the processed query to a transmission component 714. The classification is also sent to the transmission component 714.

The where-component is sent to a second classification component 706 which is comprised of an ambiguity resolution component 708 and a selection component 710. The ambiguity resolution component 708 determines whether the where-component contains a geographical location. The selection component 710 receives a where-component containing a geographical location from the ambiguity resolution component 708 and determines the resulting location. A view 712 for changing the result location is provided to the user to select the most appropriate location for the user query that is different from the location selected by the selection component 710. The second classification component 706 then sends the location to the transmission component 714. The transmission component 714 sends the processed user query, the classification, and the location to the backend search engine.

The QPS 650 processes every query both on the reply page (e.g., one of the search databases 24 in FIG. 1) and in the local channel (the structured database or data source 26 in FIG. 1 for local searching). If it is not able to map the original user query to a different target query that will yield better results, it may still be able to understand the intent of the query with high confidence, and classify it appropriately without further mapping. There are two analysis levels: "what" component and "where" component.

"What" Component:

The query processing system can parse user queries, identify their "what" component, and classify them in different buckets: business names, business chain names, business categories, event names, event categories.

Then if no transformation operation can be performed, it sends the original user query and its classification to the backend local search engine. The backend local search engine will make use of the classification provided by the QPS 650 so as to change the ranking method for the search results. Different query classes determined by the QPS 650 correspond to different ranking options on the backend side. For example, the QPS 650 may classify "starbucks" as a business name, while it may categorize "coffee shops" as business category.

The ability to change ranking method depending on the classification information provided by the QPS 650 has a crucial importance in providing local search results that match as closely as possible the intent of the user, in both dimensions: name and category.

Business Name Examples:

In a particular geographic location there might not be "starbucks" coffee shops nearby. However, if the user explicitly specifies a request for "starbucks" in that location, the system will be able to provide results for "starbucks" even if they are far away and there are other coffee shops that are not "starbucks" closer to the user-specified location.

There might be database records for which common words that are also business names have been indexed, such as "gap," "best buy," "apple." The QPS 650 recognizes that these are proper and very popular business names, thus making sure that the local backend search engine gives priority to the appropriate search results (instead of returning, for example, grocery stores that sell "apples").

Category Name Examples:

There might exist businesses whose full name (or parts thereof) in the database contains very common words that most typically correspond to a category of businesses. For example, in a particular geographic location there might be several restaurants that contain the word "restaurant" in the name, even if they are not necessarily the best restaurants that should be returned as results for a search in that location. The QPS 650 will recognize the term "restaurant" as a category search, and this classification will instruct the local backend search engine to consider all restaurants without giving undue relevance to those that just happen to contain the word "restaurant" in their name.

"Where" Component:

The QPS 650 can parse user queries and identify their "where" component. The QPS 650 performs two main sub-functions in analyzing user queries for reference to geographic locations: ambiguity resolution and selection.

Ambiguity Resolution:

For every user query the QPS 650 determines whether it does indeed contain a geographic location, as opposed to some other entity that may have the same name as a geographic location. For example, the query "san francisco clothing" is most likely a query about clothing stores in the city of San Francisco, whereas "hollister clothing" is most likely a query about the clothing retailer "Hollister Co." rather than a query about clothing stores in the city of Hollister, Calif. So only the first query should be recognized as a local business search query and sent to the backend local search engine.

The QPS 650 recognizes the parts of user queries that are candidates to be names of geographic locations, and determines whether they are actually intended to be geographic names in each particular query. This determination is based on data that is pre-computed offline.

The algorithm for geographic name interpretation takes as input the set of all possible ways to refer to an object in a geographic context. This set is pre-computed offline through a recursive generation procedure that relies on seed lists of alternative ways to refer to the same object in a geographic context (for example, different ways to refer to the same U.S. state).

For each geographic location expression in the abovementioned set, the QPS 650 determines its degree of ambiguity with respect to any other cultural or natural artifact on the basis of a variety of criteria: use of that name in user query logs, overall relevance of the geographic location the name denotes, number of web results returned for that name, formal properties of the name itself, and others. Based on this information and the specific linguistic context of the query in which a candidate geographic expression is identified, the QPS 650 decides whether that candidate should be indeed categorized as a geographic location.

Selection:

In case there are multiple locations with the same name, the QPS 650 determines which location would be appropriate for most users. Out of all the possible locations with the same name, only the one that is selected by the QPS 650 is sent to the backend local search engine, and results are displayed only for that location. However, a drop-down menu on the reply page gives the user the possibility to choose a different location if they intended to get results for a place different from the one chosen by the QPS 650.

For example, if the user asks for businesses in "Oakland," the QPS 650 selects the city of Oakland, Calif. out of the dozens of cities in the U.S. that have the same name.

The determination of which city to display results for out of the set of cities with the same name is based on data pre-computed offline. This selection algorithm takes as input the set of all possible ways to refer to an object in a geographic context (this is the same set as the one generated by the recursive generation procedure described herein before. For example, the city of San Francisco can be referred to as "sf," "san francisco, Calif.," "sanfran," etc. For all cases in which the same linguistic expression may be used to refer to more than one geographic location, the selection algorithm chooses the most relevant on the basis of a variety of criteria: population, number of web results for each geographic location with the same name and statistical functions of such number, and others.

Transformation

Figure 41:
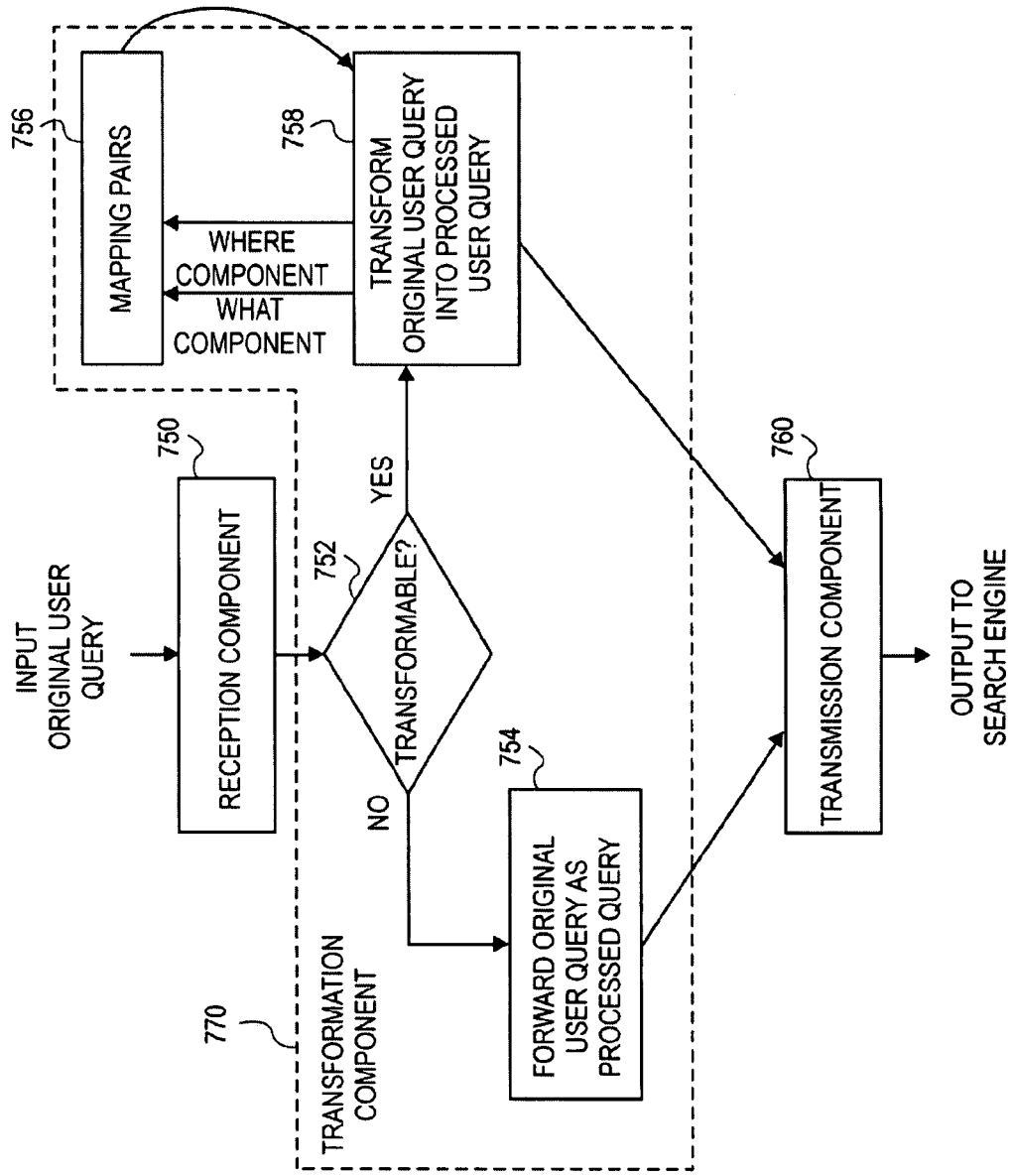
FIG. 41 is a diagram of the transformation sub-system of the search system.

FIG. 41 is a diagram of the transformation sub-system 606 in FIG. 39. A reception component 750 receives an original user query and passes the user query to a transformation component 770. The processed user query transformed by the transformation component 770 is passed to a transmission component 760 that outputs the processed user query to the backend search engine. The transformation component includes a decision sub-system 752 that determines whether or not the original user query can be transformed. If the original user query cannot be transformed, then the original user query is used as the processed query and the processed query is forwarded 754 to the transmission component 760. If the processed query can be transformed, the nature of the transformation is determined by the what-component and the where-component of the original user query. The what-component is given a classification, which may include business names, business chain names, business categories, business name misspellings, business chain name misspellings, business category misspellings, event names, event categories, event name misspellings, and event category misspellings. The where-component is given a classification, which may be a city name or a neighborhood name. The transformation component then uses mapping pairs 756 that are generated offline to transform 758 the original user query into a processed query. The mapping pairs 756 may be generated on the basis of session data from user query logs, or may be generated as a part of a recursive generation procedure.

The QPS 650 processes every query both on the reply page and in the AskCity local channel and possibly maps the original user query (source query) to a new query (target query) that is very likely to provide better search results than the original query. While every query is processed, only those that are understood with high confidence are mapped to a different target query. Either the original user query or the rewritten target query is sent to the backend local search engine.

The target queries correspond more precisely to database record names or high quality index terms for database records. For example, a user may enter the source query "social security office." The QPS 650 understands the query with high confidence and maps it to the target query "US social security adm" (this is the official name of social security office in the database). This significantly improves the accuracy of the search results.

The QPS 650 can perform different types of mappings that improve search accuracy in different ways and target different parts of a user query. The QPS 650 first analyzes the user query into a "what" component and a "where" component. The "what" component may correspond to a business or event (name or category), and the "what" component may correspond to a geographic location (city, neighborhood, ZIP code, etc.). For each component and subtypes thereof, different types of mapping operations may take place.

For example, for business search there are four sub-cases:
Business names: "acura car dealerships"=>"acura";
Business categories: "italian food"=>"italian restaurants";
Business name misspellings: "strabucks"=>"starbucks";
Business category misspellings: "resturant"=>"restaurant."

Similar sub-cases apply to event search. For locations, there are two sub-cases:
City names: "sf"=>"San Francisco";
Neighborhood names: "the mission"=>"mission district."

For each class of sub-cases, a different algorithm is used offline to generate the mapping pairs:

Names and categories (both business and events): mapping pairs are generated on the basis of session data from user query logs. The basic algorithm consists in considering queries or portions thereof that were entered by users in the same browsing session at a short time distance, and appropriately filtering out unlikely candidates using a set of heuristics.

Misspellings (both business and events): mapping pairs are generated on the basis of session data from user query logs. The basic algorithm consists in considering queries or portions thereof that i) were entered by used in the same browsing session at a short time distance; ii) are very similar. Similarity is computed in terms of editing operations, where an editing operation is a character insertion, deletion, or substitution.

Geographic locations (cities and neighborhoods): mapping pairs are generated as a part of the recursive mentioned hereinbefore.

Correlation of Data

Figure 42:
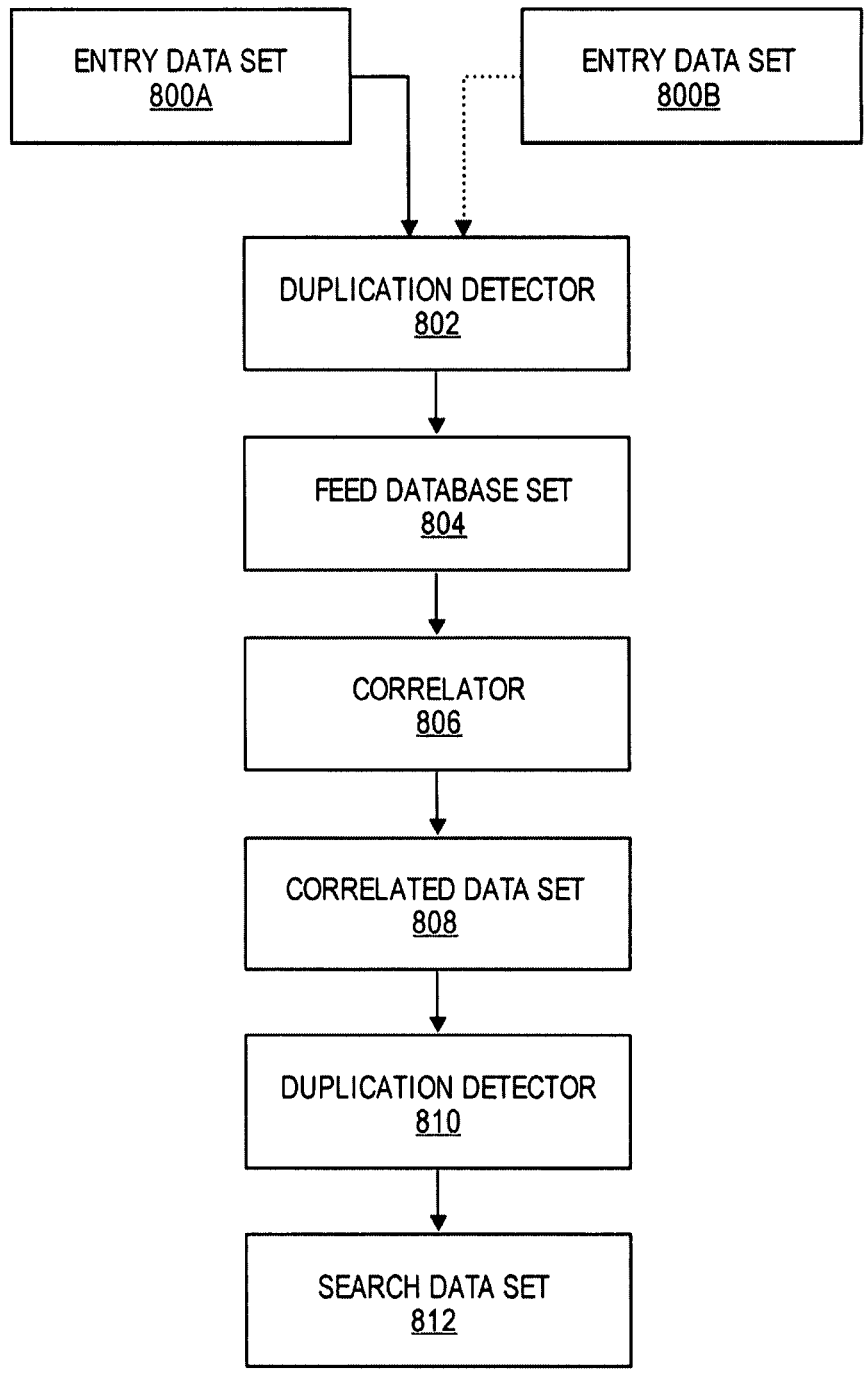
FIG. 42 is a diagram of the offline tagging sub-system of the search system.

FIG. 42 illustrates a system to correlate data forming part of the record linkage sub-system 618 in FIG. 39, including one or more entry data sets 800A and 800B, a duplication detector 802, a feed data set 804, a correlator 806, a correlated data set 808, a duplication detector 810, and a search data set 812. The entry data sets are third-party data sets as described with reference to the structured database or data source 26 in FIG. 1. The duplication detector 802 detects duplicates in the entry data sets 800A and 800B. In one embodiment, only one of the entry data sets, for example the entry data set 800A, may be analyzed by the duplication detector 802. The duplication detector 802 keeps one of the entries and removes the duplicate of that entry, and all entries, excluding the duplicates, are then stored in the feed data set 804.

The correlated data set 808 already has a reference set of entries. The correlator 806 compares the feed data set 804 with the correlated data set 808 for purposes of linking entries of the feed data set 804 with existing entries in the correlated data set 808. Specifically, the geographical locations of latitude and longitude (see reference numeral 244 in FIG. 6) are used to link each one of the entries of the correlated data set 808 with a respective entry in the feed data set 804 to create a one-to-one relationship. The correlator 806 then imports the data in the feed data set 804 into the data in the correlated data set 808 while maintaining the one-to-one relationship. The correlator 806 does not import data from the feed data set 804 that already exists in the correlated data set 808.

The duplication detector 810 may be the same duplication detector as the duplication detector 802, but configured slightly differently. The duplication detector 810 detects duplicates in the correlated data set 808. Should one entry have a duplicate, the duplicate is removed, and all entries except the removed duplicate are stored in the search data set 812. The duplication detectors 802 and 810 detect duplicates according to a one-to-many relationship.

The duplication detectors 802 and 810 and the correlator 806 restrict comparisons geographically. For example, entries in San Francisco, Calif. are only compared with entries in San Francisco, Calif., and not also in, for example, Seattle, Wash. Speed can be substantially increased by restricting comparisons to a geographically defined grid.

Soft-term frequency/fuzzy matching is used to correlate web-crawled data and integrate/aggregate feed data, as well as to identify duplicates within data sets. For businesses, match probabilities are calculated independently across multiple vectors (names and addresses) and then the scores are summarized/normalized to yield an aggregate match score. By preprocessing the entities through a geocoding engine and limiting candidate sets to ones that are geographically close, the process is significantly optimized in terms of execution performance (while still using a macro-set for dictionary training).

Selection of Reliable Key Words From Unreliable Sources

Figure 43:
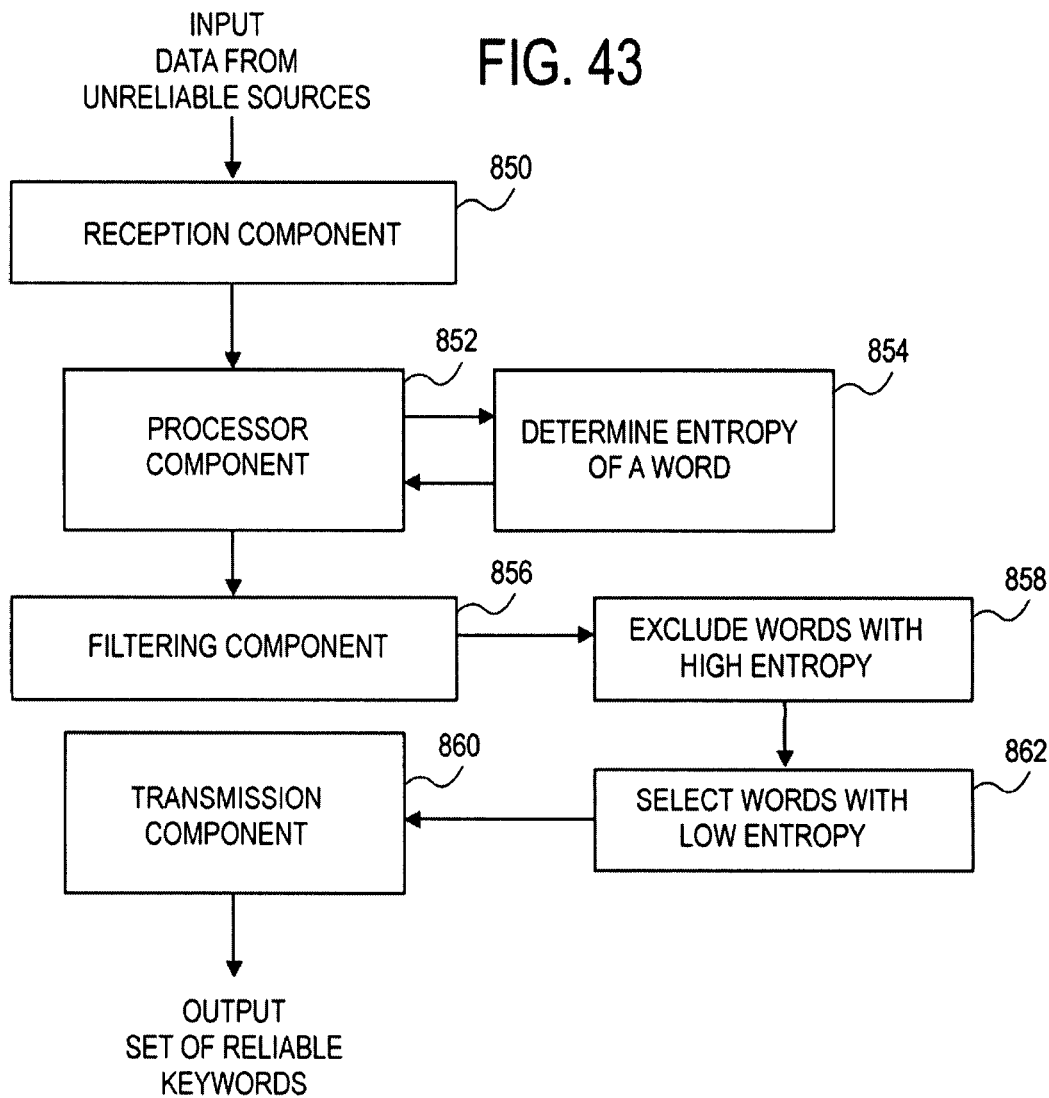
FIG. 43 is a diagram of the offline selection of reliable keywords sub-system of the search system.

FIG. 43 is a diagram of the selection of reliable key words from an unreliable sources sub-system. This includes a reception component 850, a processing component 852, a filtering component 856, and a transmission component 860. The reception component 850 receives data, including data from unreliable sources and passes the data to the processor component 852 which determines 854 the entropy of a word in a data entry. The entropy of a word and the word is passed on to the filtering component 856 which selects 862 words having low entropy values, and filters 858 away words with high entropy values. Words with low entropy values are considered to be reliable, whereas words with high entropy values are considered to be unreliable. The words with low entropy values and the associated data entry is passed onto the transmission component 860 to output a set of reliable key words for a given data entry or data set.

The entropy of a word on reliable data type (like a subcategory) is used to filter reliable key words from unreliable sources. For example, there is a set of restaurants with a "cuisine" attribute accompanied by unreliable information from reviews. Each review corresponds to a particular restaurant that has a particular cuisine. If the word has high entropy on distribution on cuisine, then this word is not valid as a key word. Words with low entropy are more reliable. For example, the word "fajitas" has low entropy because it appears mostly in reviews of Mexican restaurants, and the word "table" has high entropy because it is spread randomly on all restaurants.

Figure 44:
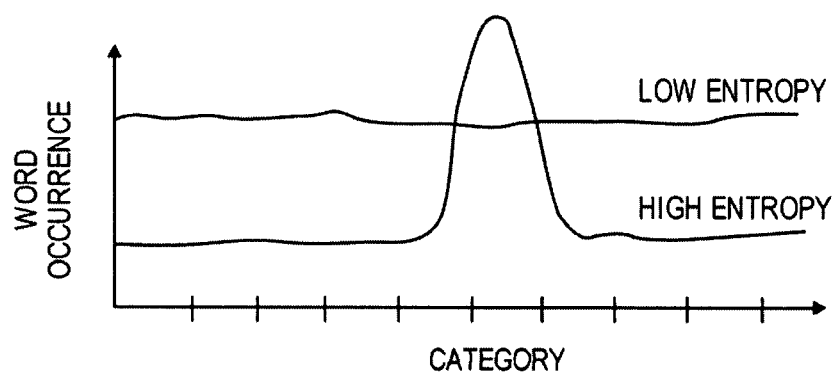
FIG. 44 is a graph illustrating entropy of words.

FIG. 44 graphically illustrates entropy of words. Certain words having high occurrence in categories and not in other categories have high entropy. Entropy is defined as:

$$\text{Entropy} = \sum_{n=1}^{k} pn \log\left(\frac{1}{pn}\right)$$

where
  p is probability,
  n is category.

Multiple Language Models Method for information Retrieval

Figure 45:
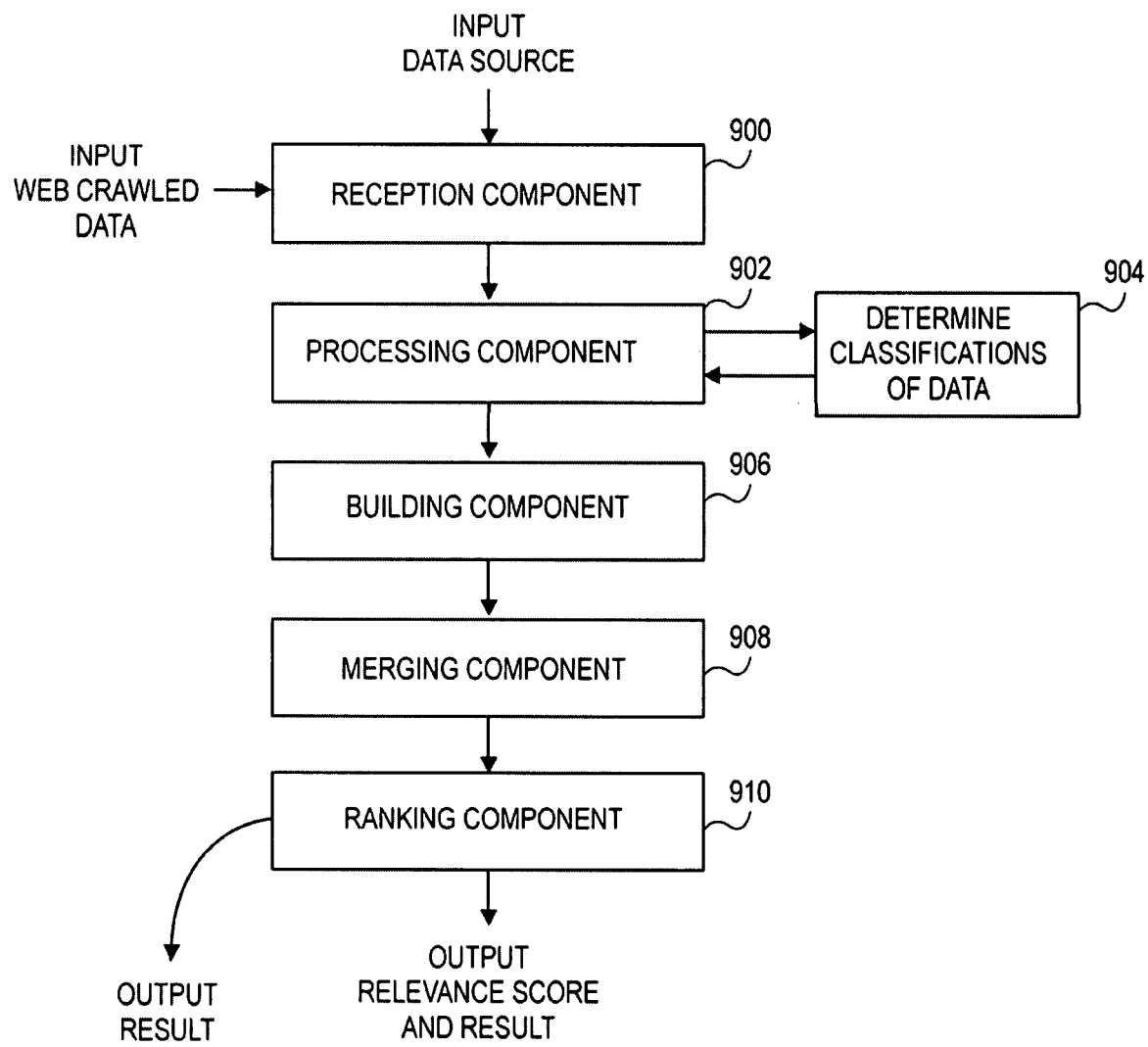
FIG. 45 is a diagram of a system for building text descriptions in a search database.

FIG. 45 is a diagram of the multiple language models method for information retrieval sub-system. This includes a reception component 900 that receives data from at least one source, including web-crawled data. The data is passed on to a processing component 902 that determines 904 the classification of a data entry. Using the classifications, a building component 906 builds at least one component of the language model associated to the data entry. This built component may be built using text information from data possessing the same classification as the data entry. This built component of the language model is merged by the merging component 908. The merging component 908 may perform the merge using a linear combination of the various components of the language model, including the built component, to create a final language model. The merging component 908 may output the final language model, and may also output the final language model to a ranking component 910 that uses the final language model to estimate the relevance of the data entry against a user query.

Suppose there is a database where objects may have type/category attributes and text attributes. For example, in the "Locations" database, the locations may have:
  Type attributes: category, subcategory, cuisine;
  Text attributes: reviews, home webpage information.

In some cases a significant part of database objects (>80%) does not have text information at all, so it is impossible to use standard text information retrieval methods to find objects relevant to the user query.

The main idea of the proposed information retrieval method is to build a Language Model for each "type attribute" and then merge them with a Language model of the object. (Language model is usually N-grams with N=1, 2 or 3.)

For example, locations may include:
  Category=Medical Specialist;
  Subcategory=Physical Therapy & Rehabilitation;
  TextFromWebPage=" . . . "
Language Models may include:
  L1—using text information from all Locations with category "Medical Specialist";
  L2—using text information from all Locations with a subcategory "Physical Therapy & Rehabilitation";
  L3—using TextFromWebPage text.
Then a final Language Model for Location. "S" is built: Ls=Merge (L1,L2,L3). The Merge function may be a linear combination of language models or a more complex function.

Then Ls is used to estimate the probability that query q belongs to Language model Ls. This probability is the information retrieval score of the location s.

Figure 46A:
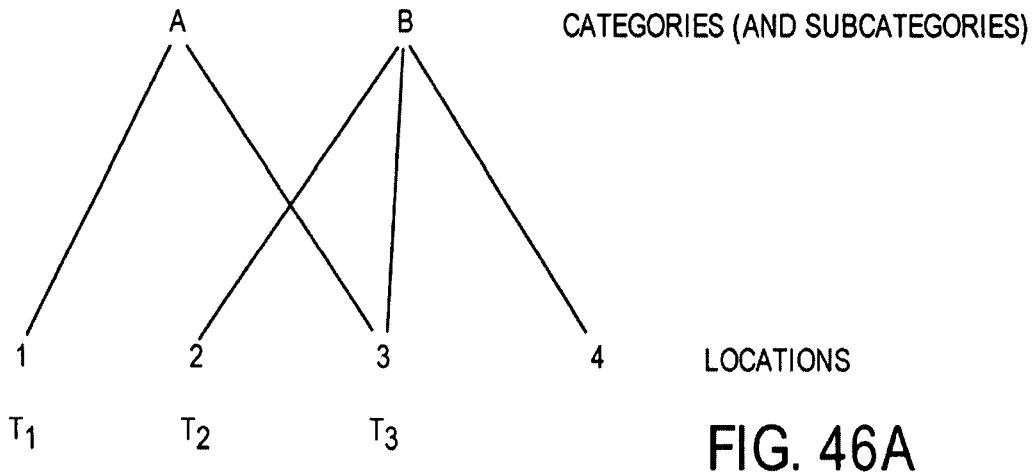
FIGS. 46A to 46C are diagrams illustrating how text descriptions are built.

FIG. 46A represents four locations numbered from 1 to 4, and two categories and subcategories labeled A and B. Text T1 is associated with the first location. Similarly, text T2 is associated with the second location, and text T3 is associated with the third location. The fourth location does not have any text associated therewith. The first and third locations are associated with the category A. The second, third, and fourth locations are associated with the category B. The second and fourth locations are not associated with the category A. The first location is not associated with the category B. The third location is thus the only location that is associated with both categories A and B.

Figure 46B:
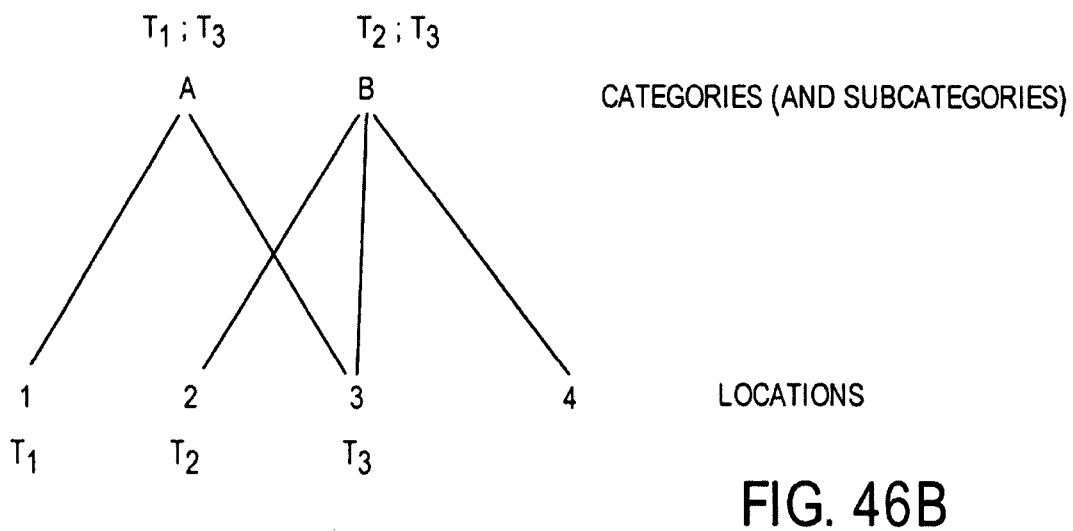

As shown in FIG. 46B, the texts T1 and T3 are associated with the first and third locations, are merged and associated with category A, due to the association of the first and third locations with category A. The texts T2 and T3 are merged and associated with the category B, due to the association of category B with the second and third locations. The text T2 is not associated with the category A, and the text T1 is not associated with category B.

Figure 46C:
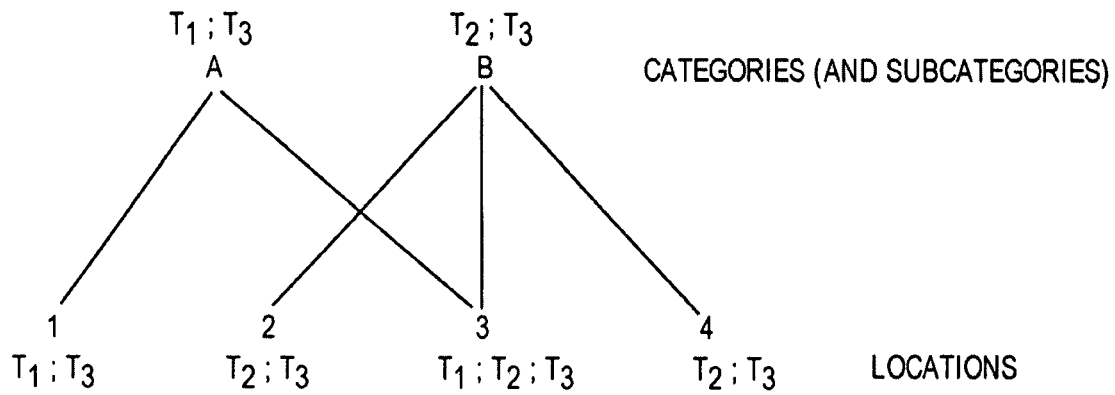

As shown in FIG. 46C, the combined text T1 and T3 is associated with the first location, due to the association of the first location with the category A. The texts T1 and T2 are also associated with the third location due to the association of the third location with the category A. Similarly, the texts T2 and T3 associated with category B are associated with the second, third, and fourth locations due to the association of the category B with the second, third, and fourth locations. The third location thus has text T1, T2, and T3 associated with categories A and B.

Ranking of Objects Using Semantic and Nonsemantic Features

Figure 47:
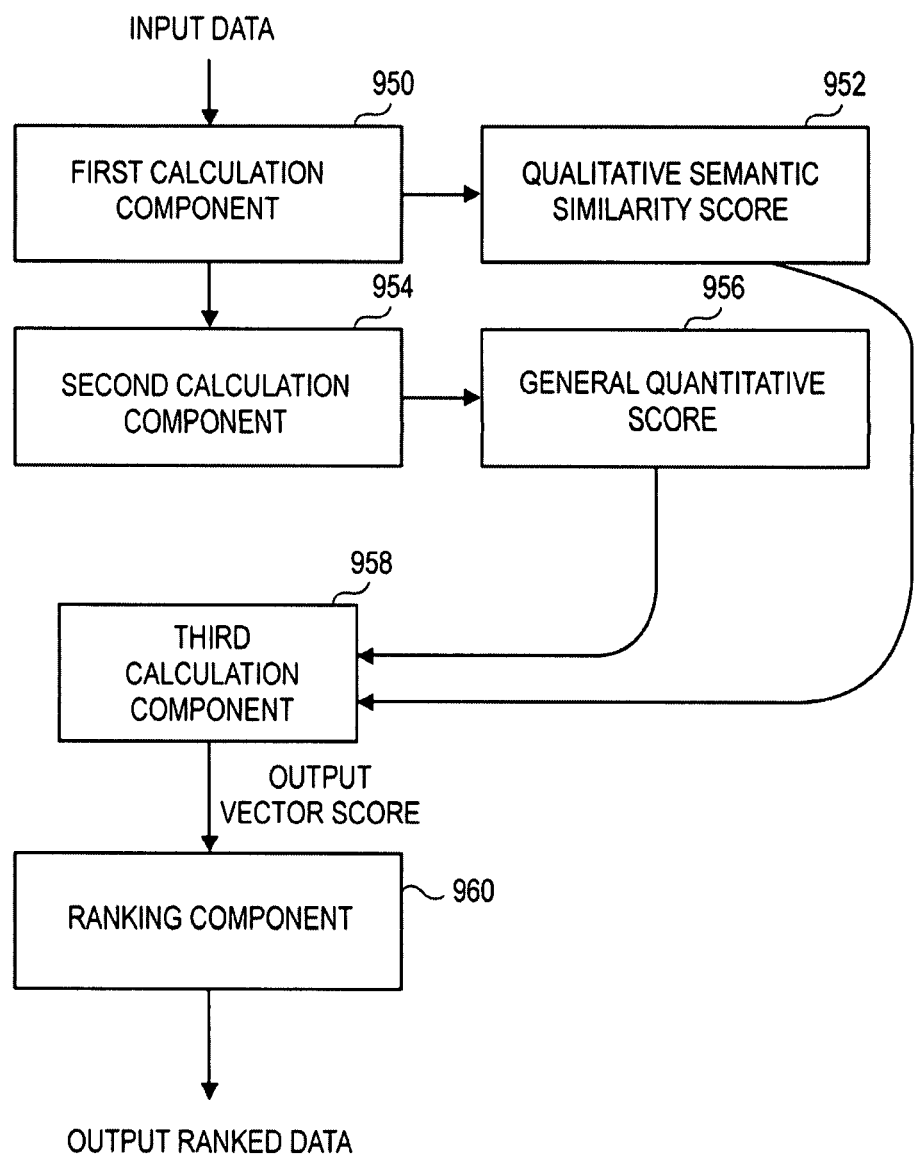
FIG. 47 is a diagram of the ranking of objects using semantic and nonsemantic features sub-system of the search system.

FIG. 47 is a diagram of the ranking of objects using a semantic and nonsemantic features sub-system, comprising a first calculation component 950 that calculates a qualitative semantic similarity score 952 of a data entry. The quantitative semantic similarity score 952 indicates the quantitative relevancy of a particular location to the data entry. A second calculation component 954 uses the data entry to calculate a general quantitative score 956. The general quantitative score 956 comprises a semantic similarity score, a distance score, and a rating score. A third calculation component 958 takes the qualitative semantic similarity score 952 and the general quantitative score 956 to create a vector score. The vector score is sent to a ranking component 960 that ranks the data entry among other data entries to determine which data entry is most relevant to a user query, and outputs the ranking and the associated data entry.

In ranking algorithm for Locations, many things need to be taken into account: semantic similarity between query and keywords/texts associated with location, distance from location to particular point, customer's rating of location, number of customer reviews.

A straightforward mix of this information may cause unpredictable results. A typical problem when a location that is only partially relevant to the query is at the top of the list because it is very popular or it is near the searching address.

To solve this problem, a vector score calculation method is used. "Vector score" means that the score applies to two or more attributes. For example, a vector score that contains two values is considered: a qualitative semantic similarity score, and a general quantitative score. The qualitative semantic similarity score shows the qualitative relevancy of the particular location to the query:

QualitativeSemanticSimilarityScore=QualitativeSemanticSimilarityScoreFunction (Location, Query).

QualitativeSemanticSimilarityScore has discrete values: relevant to the query, less relevant to the query, . . . , irrelevant to the query.

A general quantitative score may include different components that have different natures:

GeneralQuantitativeScore=a1*SemanticSimilarity (Location, Query)+a2*DistanceScore(Location)+a3*RatingScore (Location).

So the final score includes two attributes S=(QualitativeSemanticSimilarityScore, GeneralQuantitativeScore).

Suppose there are two locations with scores S1=(X1,Y1) and S2=(X2,Y2). To compare the scores the following algorithm may be used:

If (X1>X2) S1>S2;
Else if (X1<X2) S1<S2;
Else if (Y1>Y2) S1>S2;
Else if (Y1<Y2) S1<S2;
Else S1=S2.

This method of score calculation prevents penetration of irrelevant objects to the top of the list.

Table 1 shows a less-preferred ranking of locations where distance scores and semantic scores have equal weight. According to the ranking method in Table 1, the second location on the distance score has the highest total score, followed by the eighth location the distance score. The semantic score thus overrules the distance score for at least the second location on the distance score and the eighth location on the distance score.

TABLE 1

| Location | Distance Score | Semantic Score | Total Score |
|---|---|---|---|
| 1 | 0.90 | 0.01 | 1.00 |
| 2 | 0.80 | 0.08 | 1.60 |
| 3 | 0.80 | 0.02 | 1.00 |
| 4 | 0.80 | 0.01 | 0.90 |
| 5 | 0.70 | 0.04 | 1.30 |
| 6 | 0.70 | 0.03 | 1.00 |
| 7 | 0.70 | 0.01 | 0.80 |
| 8 | 0.60 | 0.09 | 1.50 |

Table 2 shows a preferred ranking method, wherein the distances scores are never overrules by the semantic scores. The distance scores are in multiples of 0.10. The semantic scores are in multiples of 0.01, and range from 0.01 to 0.09. The largest semantic score of 0.09 is thus never as large as the smallest distance score of 0.10. The total score is thus weighted in favor of distances scores, and the distance scores are never overruled by the semantic scores.

TABLE 2

| Location | Distance Score | Semantic Score | Total Score |
|---|---|---|---|
| 1 | 0.90 | 0.01 | 0.91 |
| 2 | 0.80 | 0.08 | 0.88 |
| 3 | 0.80 | 0.02 | 0.82 |
| 4 | 0.80 | 0.01 | 0.81 |
| 5 | 0.70 | 0.04 | 0.74 |
| 6 | 0.70 | 0.03 | 0.73 |
| 7 | 0.70 | 0.01 | 0.71 |
| 8 | 0.60 | 0.09 | 0.69 |

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A system to categorize user queries, comprising:
   a processor;
   a storage device connected to the processor; and
   a set of instructions on the storage device and executable by the processor, the set of instructions including:
   a receiving component that receives a user query including a what-component and a where-component from a user computer system;
   a first classification component that analyzes and classifies the what-component of the original user query;
   a second classification component that analyzes and processes the where-component of the original user query, the second classification component determining whether the user query includes a geographic location and requests a geographic location from the user computer system if the user query does not include a geographic location; and
   a transmission component that sends the classification provided by the first classification component, the geographic location provided by the second classification component and the user query to a backend search engine.

2. The system of claim 1, wherein the first classification component classifies the what-component into a classification among a plurality of classifications and subclassifications.

3. The system of claim 1, wherein the user query that is sent to the backend search engine is comprised of the original user query sent to a transformation component to transform the original user query into a new query that will provide better search results than the original user query.

4. The system of claim 1, wherein the user query that is sent to the backend search engine is comprised of an unprocessed version of the user query that is received from the user computer system.

5. The system of claim 1, the set of instructions further comprising:
   a selection component extracting a search result from a data store based on the user query, classification and geographic location; and a transmission component transmitting the result back to the user computer system.

6. A method for categorizing user queries, comprising:

receiving a query and identifying a what-component and a where-component from a user computer system at a server computer system;

analyzing and classifying the what-component of the user query into a classification at the server computer system;

analyzing and processing the where-component of the original user query at the server computer system by determining whether the user query includes a geographic location and requesting a geographic location from the user computer system if the user query does not include a geographic location; and sending the classification of the what-component, the geographic location of the where-component, and the user query to a backend search engine of the server computer system.

7. The method of claim 6, wherein the what-component is classified into a classification among a plurality of classifications and subclassifications.

8. The method of claim 7, wherein the classification is selected from the group consisting of business names, business chain names, business categories, event names, and event categories.

9. The method of claim 6, wherein the user query that is sent to the backend search engine is comprised of the original user query sent to a transformation component to transform the original user query into a new query that will provide better search results than the original user query.

10. The method of claim 6, wherein the user query that is sent to the backend search engine is comprised of an unprocessed version of the user query that is received from the user computer system.

11. The method of claim 6, further comprising:

extracting a search result from a data store based on the user query classification and geographic location at the server computer system; and transmitting the result from the server computer system back to the user computer system.

12. A non-transitory computer-readable medium, having stored thereon a set of instructions which, when executed by at least one processor of at least one computer, executes a method for categorizing user queries comprising:

receiving a query and identifying a what-component and a where-component from a user computer system at a server computer system;

analyzing and classifying the what-component of the user query into a classification at a server computer system;

analyzing and processing the where-component of the original user query at a server computer system by determining whether the user query includes a geographic location and requesting a geographic location from the user computer system if the user query does not include a geographic location; and sending the classification of the what-component, the geographic location of the where-component, and the user query to a backend search engine of the server computer system.

* * * * *